(12) United States Patent
Kobayashi et al.

(10) Patent No.: US 11,640,718 B2
(45) Date of Patent: May 2, 2023

(54) CAPTURING CAMERA

(71) Applicant: Panasonic i-PRO Sensing Solutions Co., Ltd., Fukuoka (JP)

(72) Inventors: Yuma Kobayashi, Fukuoka (JP); Tetsuo Tanaka, Fukuoka (JP); Toshiaki Ito, Fukuoka (JP); Shinichi Murakami, Fukuoka (JP); Michinori Kishimoto, Fukuoka (JP); Hiroshi Mitani, Osaka (JP); Jyouji Wada, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 0 days.

(21) Appl. No.: 17/400,805

(22) Filed: Aug. 12, 2021

(65) Prior Publication Data

US 2021/0370847 A1 Dec. 2, 2021

Related U.S. Application Data

(62) Division of application No. 16/523,604, filed on Jul. 26, 2019, now Pat. No. 11,117,529.

(30) Foreign Application Priority Data

Sep. 28, 2018 (JP) .............................. JP2018-185882

(51) Int. Cl.
*B60R 11/04* (2006.01)
*H04N 5/225* (2006.01)
(Continued)

(52) U.S. Cl.
CPC ............ *B60R 11/04* (2013.01); *G06V 20/588* (2022.01); *G06V 40/161* (2022.01);
(Continued)

(58) Field of Classification Search
CPC .............. B60R 11/04; B60R 2300/103; B60R 2300/106; B60R 2300/8053;
(Continued)

(56) References Cited

U.S. PATENT DOCUMENTS 6,650,765 B1    11/2003 Alves
11,290,646 B2 *  3/2022 Zhao .................. H04N 5/23229
(Continued)

FOREIGN PATENT DOCUMENTS

| JP | 2002-031763 | 1/2002 |
| JP | 2011-002718 | 1/2011 |
| KR | 2020126690  | 4/2019 |

*Primary Examiner* — Jae N Noh
(74) *Attorney, Agent, or Firm* — Greenblum & Bernstein, P.L.C.

(57) ABSTRACT

A capturing device has a lens block that includes a lens for focusing light from a subject during a daytime, the subject includes a vehicle. The capturing device further includes an image sensor that captures an image based on light from the subject focused by the lens, and a processor that generates a face image of an occupant riding in the vehicle based on a first number of captured imaged of the subject which are captured by the image sensor at different times. The processor generates the face image of the occupant further based on a second number of captured images in which a luminance value of a region of interest is equal to or smaller than a threshold value among the first number of captured images of the subject.

15 Claims, 36 Drawing Sheets

(51) Int. Cl.
*G06V 20/56* (2022.01)
*G06V 40/16* (2022.01)

(52) U.S. Cl.
CPC ......... *H04N 5/2254* (2013.01); *H04N 5/2256* (2013.01); *B60R 2300/103* (2013.01); *B60R 2300/106* (2013.01); *B60R 2300/8053* (2013.01)

(58) Field of Classification Search
CPC .. G06V 40/161; G06V 20/588; H04N 5/2254; H04N 5/2256
See application file for complete search history.

(56) References Cited

U.S. PATENT DOCUMENTS

| | | | | |
|---|---|---|---|---|
| 2008/0310726 | A1* | 12/2008 | Kawada | G06V 40/164 382/190 |
| 2014/0009796 | A1* | 1/2014 | Kajiwara | H04N 1/6013 358/1.18 |
| 2014/0285635 | A1* | 9/2014 | Ju | H04N 13/106 348/47 |
| 2020/0104566 | A1 | 4/2020 | Yamada | |
| 2021/0347298 | A1* | 11/2021 | Balch | B60Q 3/72 |

* cited by examiner

|  | DAYTIME MODE | NIGHT MODE |
|---|---|---|
| FRONT FILTER SWITCHING MODULE | POLARIZATION FILTER | BAND PASS FILTER |
| IN-LENS FILTER SWITCHING MODULE | IR CUT FILTER | BASE GLASS |
| ILLUMINATION LED | TURN OFF | TURN ON |

| | θ w TABLE (WINDOW GLASS ANGLE OF VEHICLE) | | | |
|---|---|---|---|---|
| VEHICLE TYPE | SEDAN | SUV | SMALL CAR | BUS |
| θ w | 25° | 35° | 70° | 85° |

Tb1

| | θ cc CALCULATION EXAMPLE | | |
|---|---|---|---|
| | SEDAN | SUV | SMALL CAR |
| θ cc1 | 8.5 | 6.8 | 5.7 |
| θ cc2 | 19.2 | 15.6 | 13.1 |

Tb2

CAPTURING CAMERA

CROSS-REFERENCE TO RELATED APPLICATIONS

This application is a Divisional of U.S. patent application Ser. No. 16/523,604, filed on Jul. 26, 2019, which claims the benefit of Japanese Application No. 2018-185882, filed on Sep. 28, 2018. The disclosure of each of these documents, including the specification, drawings, and claims, is incorporated herein by reference in its entirety.

BACKGROUND OF THE INVENTION

1. Field of the Invention

The present disclosure relates to a capturing camera for capturing a person riding in a vehicle.

2. Background Art

In the related art, there is known a camera which simultaneously captures a face image of a driver in a vehicle traveling on a toll collection lane of a tollgate of a toll road such as an expressway and a license plate of the vehicle (see, for example, JP-A-2011-2718). In JP-A-2011-2718, a polarization filter that transmits only light having one direction is provided on the light emitting side of an illumination device that emits illuminating light to the field of view including the windshield and the license plate of the vehicle, and a polarization filter that passes only light having a direction different from the polarization filter on the illumination side is provided on the imaging surface side of a camera that captures an image in the same field of view.

However, in JP-A-2011-2718, the polarization filter on the light emitting side of the illumination device and the polarization filter on the imaging surface side of the camera are fixedly disposed. Therefore, depending on a vehicle type of vehicle captured, a predetermined direction in which light can pass through the polarizing filter may not always be suitable at a time of capturing vehicle. In this case, there is a problem that the suppression of harmful light (for example, sunlight) entering the camera is not sufficient and the image quality of a captured image of a face of a person riding in the vehicle may not be good.

SUMMARY OF THE INVENTION

The present disclosure is devised in view of the above-described situation in the related art, and an object of the present disclosure is to provide a capturing camera that adaptively reduces an influence of a harmful light when capturing a face of a person riding in a vehicle in response to a vehicle type of the vehicle as a subject and suppresses a deterioration of the image quality of a captured image.

The present disclosure provides a capturing camera having a lens block that includes a lens for focusing light from a vehicle as a subject, an image sensor that captures an image based on light from the vehicle focused by the lens, a filter unit that rotatably supports a polarization filter which limits the light from the vehicle received by the image sensor, a sensor configured to detect a daytime mode or a night mode, a processor configured to dispose the polarization filter on a front side of the image sensor in the daytime mode, and dispose a band pass filter on the front side of the image sensor in the night mode, and an illuminator configured to irradiate the subject with IR light in the night mode. The filter unit supports the polarization filter and the band pass filter that transmits the IR light so as to be switchable between the polarization filter and the band pass filter.

According to the present disclosure, it is possible to adaptively reduces an influence of a harmful tight when capturing a face of a person riding in a vehicle in response to a vehicle type of the vehicle as a subject and suppresses a deterioration of the image quality of a captured image.

BRIEF DESCRIPTION OF THE DRAWINGS

FIG. 17 is a view showing an example of registered contents of a table in which a window glass angle and a detection angle are registered for each vehicle type.

Figure 1:
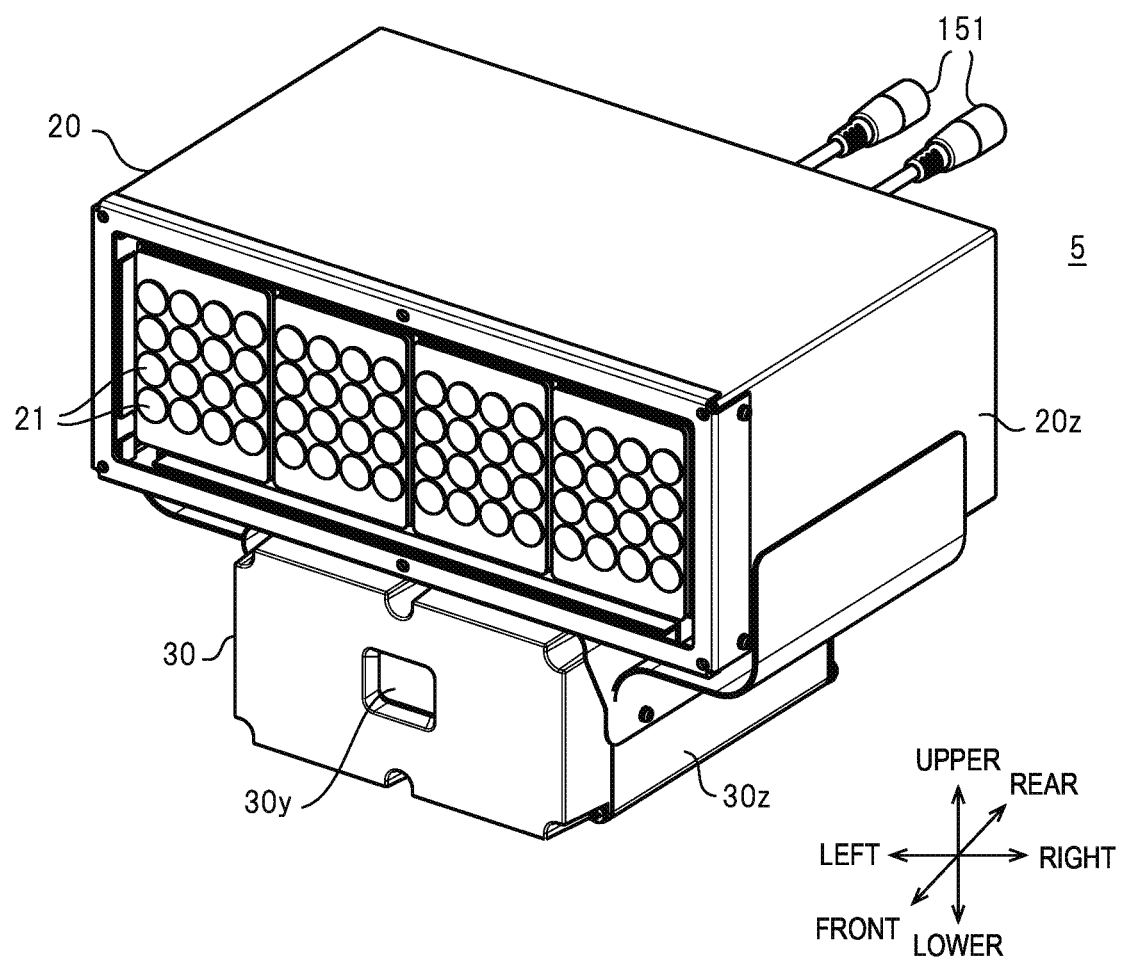
FIG. 1 is a perspective view showing the appearance of a camera apparatus according to Embodiment 1.

DETAILED DESCRIPTION OF THE EXEMPLARY EMBODIMENT (Process Leading to Configuration of Embodiment 1)

In the related art, in order to specify a person (for example, a driver) riding in a vehicle, it has been performed that a camera apparatus equipped with an image sensor images the face of a driver in the vehicle as a subject of the camera apparatus. The image sensor has high sensitivity in the wavelength range of Red Green Blue (RGB) light and also has high sensitivity in the wavelength range of near infrared light (that is, Infrared Ray (IR) light). Therefore, it is considered that it is necessary to block the IR light with the IR cut filter such that the RGB image captured by the image sensor is not blurred, during the daytime. On the other hand, the driver's face seen through the window glass of the vehicle becomes dark, at night, so it is considered that it is necessary to remove the IR filter from the optical axis of the optical system disposed in the camera apparatus, when irradiating IR light to illuminate the driver's face.

Therefore, Embodiment 1 describes an example of a camera apparatus capable of easily inserting and removing the IR cut filter such that the IR cut filter is disposed on the optical axis of the optical system in the daytime, and the IR cut filter is removed from the optical axis of the optical system at night.

Further, when imaging the face of the driver in the vehicle through the window glass, in order to reduce ambient light reflected by the window glass, a polarization filter is disposed on the optical axis of the camera apparatus. The polarization filter has a characteristic of transmitting light having linear polarization parallel to the polarization axis and blocking light having linear polarization orthogonal to the polarization axis. It becomes possible to block the ambient light with the polarization filter and image only the person's face transmitted through the window glass, by aligning the polarization axis of the polarization filter such that the polarization direction is orthogonal to the ambient light that is linearly polarized by being reflected by the window glass.

However, for example, when a camera apparatus installed at a side of a road, such as a road shoulder, images traveling vehicles from an oblique direction, even if the distances from the camera apparatus to the vehicles are the same, the polarization angles of the polarization filter are different depending on the lanes in which the vehicles travel. Therefore, when imaging vehicles traveling in different lanes with one camera apparatus, it is difficult to image both driver's faces clearly. Further, even in the same lane, the appropriate polarization angle is different depending on the vehicle type. Therefore, the driver's face may not be clearly imaged, depending on the vehicle type, as in the case of the lane.

Therefore, in Embodiment 1, an example of a camera apparatus capable of clearly capturing the driver's face regardless of the type of vehicle as a subject and the lane in which the vehicle travels will be described.

Hereinafter, an embodiment specifically disclosing the configuration and operation of a camera apparatus according to the present disclosure will be described in detail with reference to the drawings as appropriate. However, a detailed description more than necessary may be omitted. For example, detailed descriptions of already well-known matters and duplicate descriptions of substantially identical components may be omitted in some cases. This is to avoid the following description from being unnecessarily redundant and to facilitate the understanding of those skilled in the art. In addition, the accompanying drawings and the following description are provided in order to help those skilled in the art fully understand the present disclosure, and are not intended to limit the subject described in claims.

Embodiment 1

The camera apparatus 5 according to Embodiment 1 uses, for example, a vehicle VC (see FIG. 18) as a subject, clearly images the face of a person (for example, a driver) riding in the vehicle, and generates and acquires a captured image (captured video) of the face of the person.

FIG. 1 is a perspective view showing the appearance of a camera apparatus 5 according to Embodiment 1. The camera apparatus 5 as an aspect of a capturing camera according to the present disclosure is configured by arranging a camera body 30 and a light emitting diode (LED) body 20 so as to overlap in two stages in the vertical direction. In the present specification, the directions of front and rear, upper and lower, and left and right regarding the description of the camera apparatus 5 follow the arrows shown in FIG. 1.

The LED body 20 (one aspect of the illumination unit) on the upper side has a substantially rectangular or substantially cubic box-shaped housing 20z. For example, 4*16 (=64) illumination LEDs 21 are disposed on the front surface of the housing 20z at equal intervals so as to allow irradiation. * (Asterisk) indicates a multiplication operator. The illumination LED 21 as one aspect of the light source of the camera apparatus 5 irradiates Infrared Ray (IR) of wide band and short wavelength (for example, wavelength of 850 nm) as illuminating light.

In addition, instead of the LED body 20, a laser light body (not shown) including one or a plurality of laser diodes capable of irradiating laser light may be disposed, as one aspect of the illumination body capable of emitting illuminating light. In this case, laser light of narrow band and short wavelength (for example, 850 nm) is emitted from one or a plurality of laser diodes disposed in the laser light body.

The camera body 30 on the lower side has a box-shaped housing 30z having a smaller volume than the LED body 20. A window 30y to which light from a subject (for example, a vehicle) of the camera apparatus 5 can be incident is formed in a substantially central portion of the front surface of the housing 30z. A connector (not shown) to which a video output cable 151 for transmitting a captured image captured by the camera apparatus 5 is disposed on the back side (that is, the rear side) of the housing 30z. The video output cable 151 is connected to a communication device (not shown) such as a router that is communicably connected to a network NW to be described later.

Figure 2:
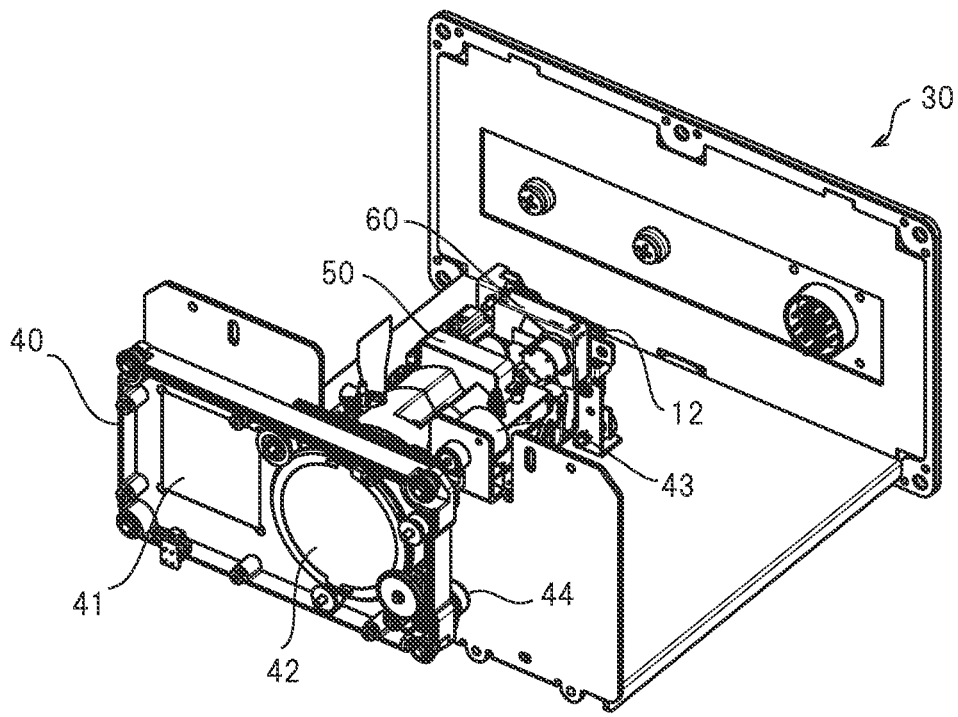
FIG. 2 is a perspective view showing the internal structure of a camera body.

FIG. 2 is a perspective view showing the internal structure of the camera body 30. Various optical components (one aspect of the optical system) and electronic components are disposed in the housing 30z of the camera body 30. A front filter switching module 40 is disposed on the inner front side of the housing 30z. Behind the front filter switching module 40, a lens block 50, an in-lens filter switching module 60, an image sensor 12 and the like are disposed toward the rear surface.

The lens block 50 includes a focus lens (one aspect of a lens) that forms an optical image of a subject on the imaging surface of the image sensor 12. The lens block 50 may include, in addition to the focus lens, a zoom lens capable of zooming from telephoto to wide angle.

The in-lens filter switching module 60 is disposed on the rear side of the lens block 50 and on the front side of the image sensor 12. The in-lens filter switching module 60 switchably disposes the above-described IR cut filter (not shown) and base glass (not shown), and alternately performs switching between the IR cut filter and the base glass to be disposed on the optical axis of the optical system (hereinafter, abbreviated as "optical axis").

The in-lens filter switching module 60 disposes the IR cut filter on the optical axis in the daytime mode set for the daytime, for example. Thus, in the daytime mode, since the RGB light from which the component of the IR band is blocked is received by the image sensor 12, a visible light image with good image quality can be obtained.

On the other hand, the in-lens filter switching module 60 disposes the base glass on the optical axis in the night mode set for the night, for example. Thus, in the night mode, since incident light from which the component of the IR band is not blocked by the IR cut filter and passes through the base glass is received by the image sensor 12, an IR image with a constant brightness (in other words, not too dark) is obtained based on the received incident light.

The image sensor 12 is an image sensor capable of capturing high-definition images of 2K, 4K, 8K, and the like, and is formed of, for example, a solid-state image sensor such as a charge coupled device (CCD) or a complementary metal oxide semiconductor (CMOS). The solid-state image sensor generates an electrical signal corresponding to a captured image, based on photoelectric conversion of an optical image formed on the imaging surface. Further, the image sensor 12 may include an amplifier for amplifying an electric signal output from the solid-state image sensor, and a gain adjusting unit capable of adjusting the gain (sensitivity) of the amplifier. In addition, the output of the image sensor 12 is input to the processor 10 (see FIG. 10) and is subjected to a predetermined signal process, and then data of a captured image (captured video) is generated.

The front filter switching module 40 filter unit (one aspect of the filter unit) alternately switches a band pass filter 41 and a polarization filter 42 (for example, slides them in the left and right directions) to dispose the band pass filter 41 or the polarization filter 42 on the optical axis. Since the front filter switching module 40 is disposed closer to the subject side (front side) on the optical axis with respect to the lens block 50, mechanical adjustment (for example, maintenance) of the front filter switching module 40 becomes easy.

Figure 3:
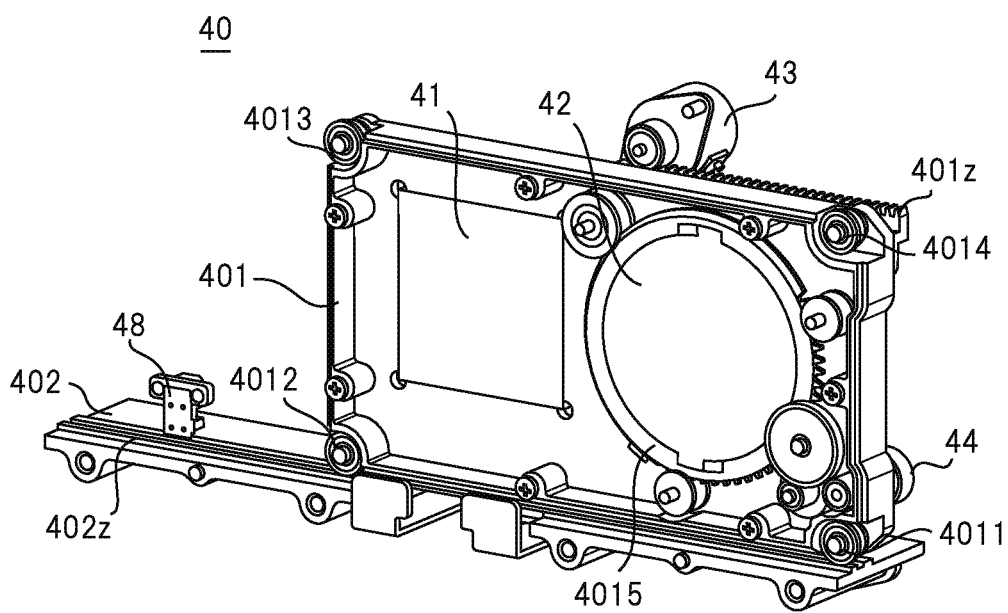
FIG. 3 is a perspective view showing the structure of the front side of a front filter switching module.
Figure 4:
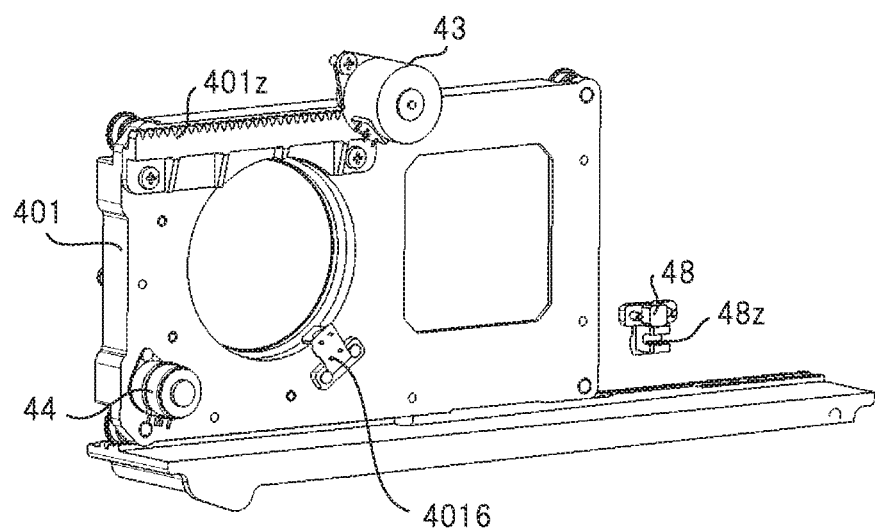
FIG. 4 is a perspective view showing the structure of the back side (rear side) of the front filter switching module.
Figure 5:
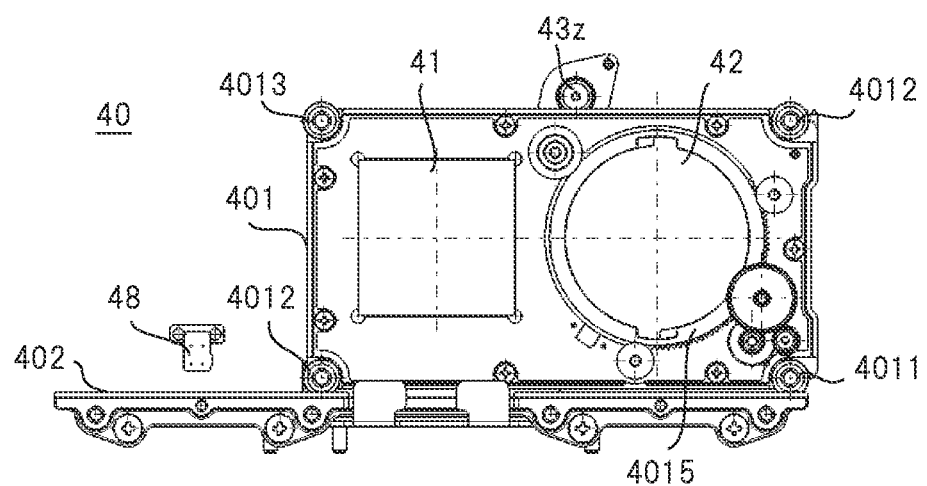
FIG. 5 is a front view showing the structure of the front filter switching module.
Figure 6:
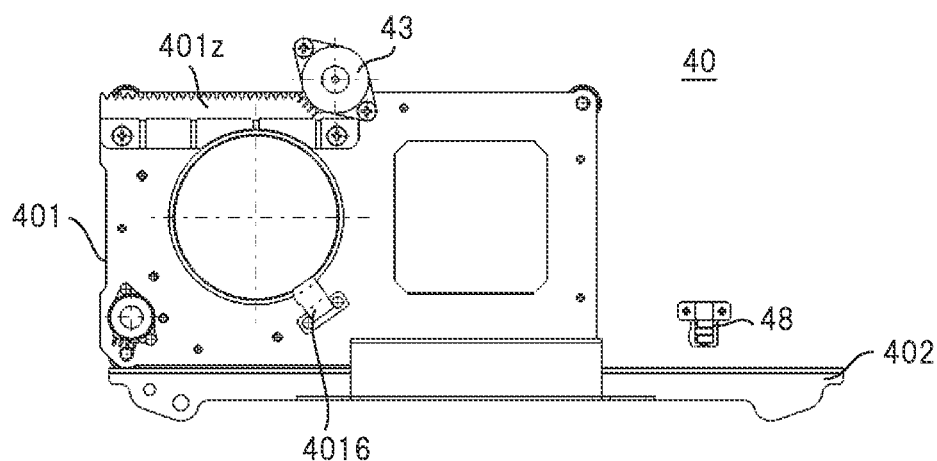
FIG. 6 is a rear view showing the structure of the front filter switching module.
Figure 7:
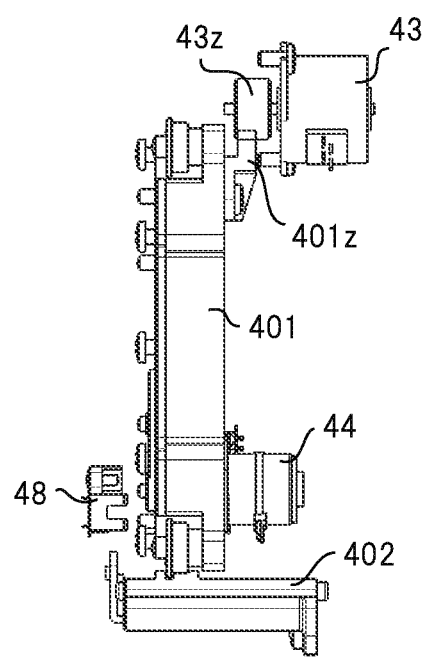
FIG. 7 is a side view showing the structure of the front filter switching module.

FIG. 3 is a perspective view showing the structure of the front side of the front filter switching module 40. FIG. 4 is a perspective view showing the structure of the back side (rear side) of the front filter switching module 40. FIG. 5 is a front view showing the structure of the front filter switching module 40. FIG. 6 is a rear view showing the structure of the front filter switching module 40. FIG. 7 is a side view showing the structure of the front filter switching module 40.

The front filter switching module 40 includes a rectangular frame 401 which is a movable member, a front filter switching module slide guide rail 402, a front filter switching module motor 43, and a polarization filter rotating motor 44. The front filter switching module slide guide rail 402 supports the rectangular frame 401 slidably in the left-right direction. The front filter switching module motor 43 supplies a driving force for sliding the rectangular frame 401 in the left-right direction. The polarization filter rotating motor 44 supplies a driving force for rotating the polarization filter 42 along a two-dimensional plane in the vertical and horizontal directions.

On the bottom surface on the rear side of the rectangular frame 401, a band pass filter 41 is disposed on the left side as viewed from the front side, and the polarization filter 42 is disposed on the right side. The polarization filter 42 is fitted to a ring member 4015 rotatably attached to a substantially circular or circular hole, formed in the rectangular frame 401. The ring member 4015 is rotationally driven by the driving force from the polarization filter rotating motor 44 through a gear.

A polarization filter rotation origin sensor 4016 is disposed on the outer periphery of the rear side of the circular hole formed in the rectangular frame 401 (see FIG. 4). The polarization filter rotation origin sensor 4016 is a reflection type photosensor capable of emitting light to the outer periphery of the ring member 4015, for example, and detecting the presence or absence of an origin marker (not shown) formed on the ring member 4015 by its reflected light. When the ring member 4015 is rotationally driven by the polarization filter rotation motor 44, the polarization filter rotation origin sensor 4016 detects the rotation origin of the ring member 4015. The amount of rotation after the detection of the origin corresponds to the rotation angle of the polarization filter 42 (polarization angle θpl described later).

Gears 4011, 4012, 4013, and 4014 are pivotally supported at four corners of the rectangular frame 401. The lower two gears 4011, 4012 are engaged with the rack 402z laid on the upper surface of the front filter switching module slide guide rail 402, and makes the rectangular frame 401 slidable in the left-right direction.

A rack 401z is provided on the upper back of the rectangular frame 401. The front filter switching module motor 43 has a main shaft on which a gear 43z engaged with the rack 401z is supported, and is attached to the housing 30z. When the front filter switching module motor 43 rotates, the gear 43z (see FIG. 7) supported on the main shaft rotates, the rack 401z is moved, and the rectangular frame 401 is slid in the left-right direction. Thus, the band pass filter 41 and the polarization filter 42 fitted to the rectangular frame 401 are slidable to the position on the optical axis and the retracted position, respectively.

Near the end of the front filter switching module slide guide rail 402, a front filter switching module origin sensor 48 is attached. The front filter switching module origin sensor 48 is formed of a photo interrupter having a slit 48z (see FIG. 4). When a protrusion (not shown) formed on the rectangular frame 401 passes inside the slit 48z, the optical path of the photo interrupter is blocked. The processor 10 detects, as the origin of the rectangular frame 401, the position at which the interruption of the optical path of the photo interrupter is detected.

Figure 8:
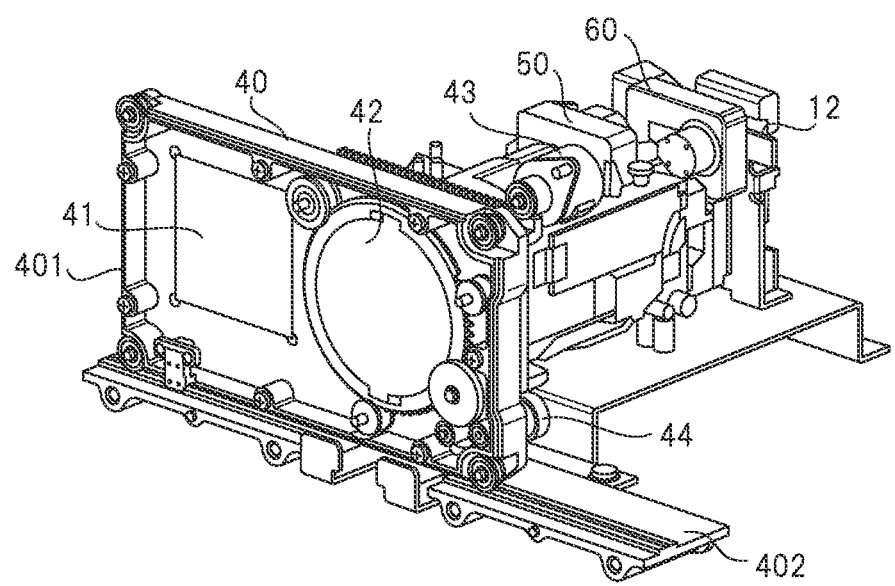
FIG. 8 is a perspective view showing the structure of the front filter switching module in a case where a polarization filter is moved to a position on an optical axis in a daytime mode.

FIG. 8 is a perspective view showing the structure of the front filter switching module 40 in a case where the polarization filter 42 is moved to a position on the optical axis in a daytime mode. In the daytime mode, the image sensor 12 images incident light transmitted through the polarization filter 42, the focus lens in the lens block 50, and the IR cut filter in the in-lens filter switching module 60. The polarization axis is rotated by the polarization filter rotating motor 44, so the polarization filter 42 blocks the reflected light reflected by the window glass (for example, the windshield of the vehicle) or the like. In addition, since the IR cut filter blocks IR light, the image sensor 12 can capture a clear RGB image.

Figure 9:
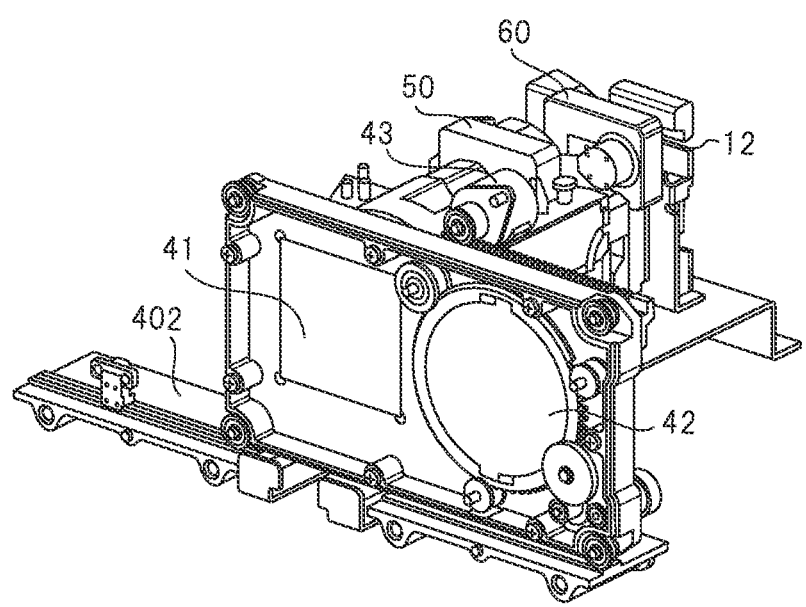
FIG. 9 is a perspective view showing the structure of the front filter switching module in a case where a band pass filter is moved to a position on the optical axis in a night mode.

FIG. 9 is a perspective view showing the structure of the front filter switching module 40 in a case where the band pass filter 41 is moved to a position on the optical axis in a night mode. In the night mode, the image sensor 12 images incident light transmitted through the band pass filter 41, the focus lens in the lens block 50, and the raw class in the in-lens filter switching module 60. At night, the band pass filter 41 passes IR light emitted by the LED body 20, while blocking light included in the wavelength band of the headlight emitted from the headlamp at the front end of the vehicle body of the vehicle. In addition, since the base glass can transmit IR light, the image sensor 12 can adaptively and brightly image the face of the driver in the vehicle illuminated by the IR light, which is reflected through the window glass (for example, the windshield of the vehicle) even at night.

Figure 10:
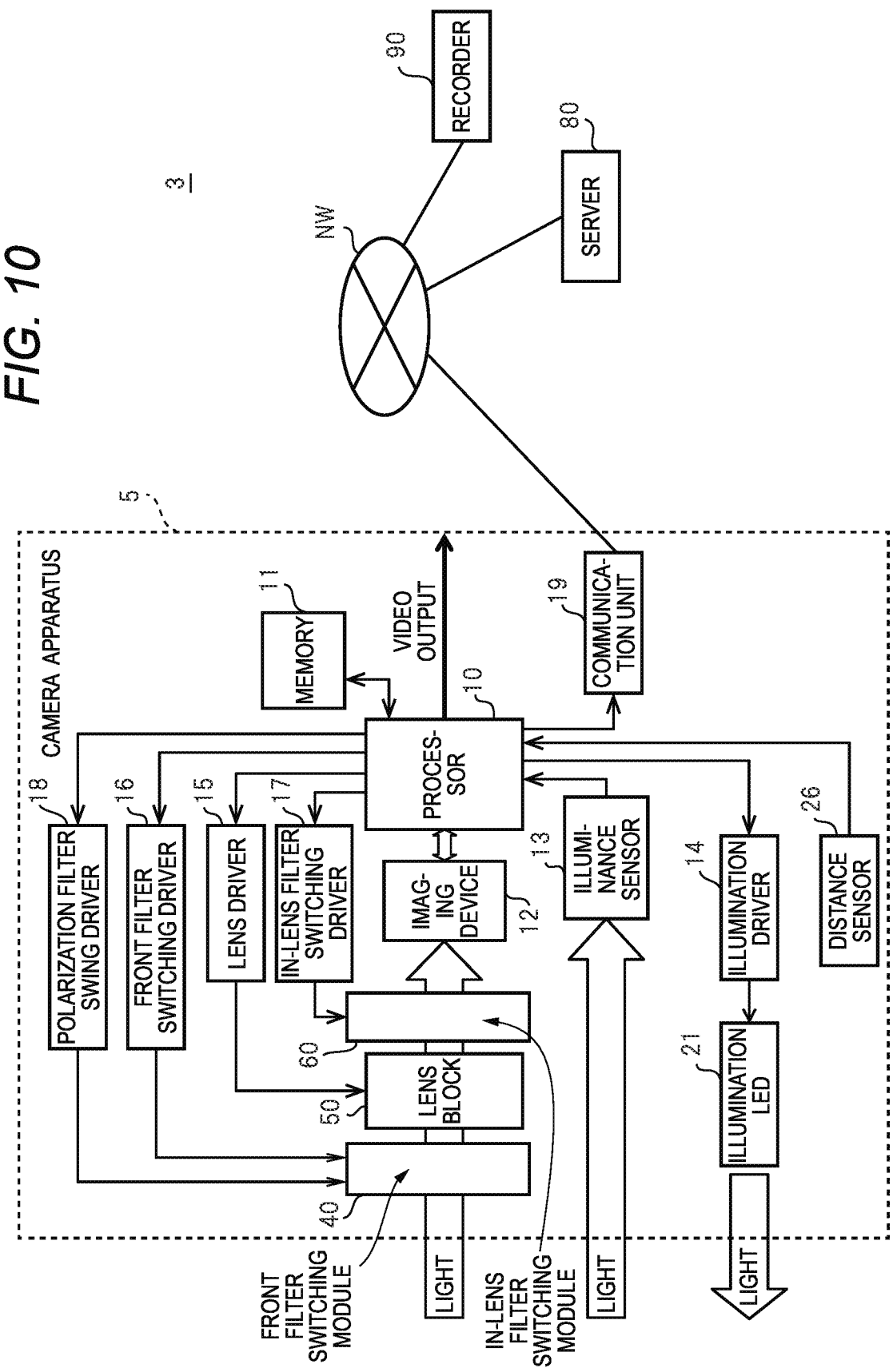
FIG. 10 is a block diagram showing an example of the configuration of an imaging system including an example of a hardware configuration of the camera apparatus 5 according to Embodiment 1.

FIG. 10 is a block diagram showing an example of the configuration of the imaging system 3 including an example of the hardware configuration of the camera apparatus 5 according to Embodiment 1. The imaging system 3 is configured to include a camera apparatus 5, a server 80, and a recorder 90. The camera apparatus 5, the server 80 and the recorder 90 are communicably connected through the network NW. Although only one camera apparatus 5 is illustrated in FIG. 10, a plurality of camera apparatuses 5 may be connected to the network NW.

The camera apparatus 5 is configured to include a processor 10, a memory 11, an image sensor 12, an illuminance sensor 13, an illumination driver 14, a lens driver 15, a front filter switching driver 16, an in-lens filter switching driver 17, and a polarization filter swing driver 18, a communication unit 19, and a distance sensor 26.

The processor 10 is configured by using, for example, a central processing unit (CPU), a digital signal processor (DSP), or a field programmable gate array (FPGA). The processor 10 functions as a controller that controls the overall operation of the camera apparatus 5, and performs a control process for controlling the operation of each unit of the camera apparatus 5, a data input and output process between respective units of the camera apparatus 5, a data operation (calculation) process, and a data storage process. The processor 10 operates according to the program and data stored in the memory 11. The processor 10 uses the memory 11 at the time of operation, and temporarily stores data or information generated or acquired by the processor 10 in the memory 11.

The memory 11 is configured by using, for example, a random access memory (RAM) and a read only memory (ROM), and temporarily stores programs and data necessary for executing the operation of the camera apparatus 5, data or information generated during operation. The RAM is, for example, a working memory used in the operation of the camera apparatus 5. The ROM stores and holds in advance a program and data for controlling the camera apparatus 5, for example.

The illuminance sensor 13 (one aspect of the sensor) detects the illuminance of the environment around the camera apparatus 5. For the illuminance sensor 13, for example, a photodiode or a phototransistor is used. The illuminance sensor 13 is attached to the front of the housing 30z of the camera body 30 so as to be able to detect the illuminance of the environment in the direction in which the vehicle as the subject of the camera apparatus 5 is present. The illuminance information (specifically, data of illuminance value) detected by the illuminance sensor 13 is input to the processor 10 and is used by the processor 10 to determine whether the current time is night or daytime.

When the illuminance information is higher than the predetermined threshold (in other words, the surrounding is bright), the processor 10 makes a determination as morning or daytime, and sets the daytime mode for causing the camera apparatus 5 to execute daytime processing. Further, when the illuminance information is lower than the predetermined threshold (in other words, the surrounding is dark), the processor 10 makes a determination as night or evening, and sets the night mode for causing the camera apparatus 5 to execute night time processing. Information (for example, a flag) indicating the set daytime mode or night mode is temporarily stored, for example, in the memory 11.

The communication unit 19 can communicate with the server 80 or the recorder 90 as one aspect of an external device through a network NW such as a wired local area network (LAN) or a wireless LAN.

The recorder 90 (one aspect of the external device) receives and accumulates data of a captured video transmitted from the camera apparatus 5.

The server 80 (one aspect of the external device) receives data of the captured video transmitted from the camera apparatus 5, and performs various processes such as video analysis or video synthesis. Data of the captured video processed by the server 80 may be transmitted from the server 80 to the recorder 90 and accumulated in the recorder 90.

The distance sensor 26 is a sensor that measures the distance from the camera apparatus 5 to an object (for example, a vehicle as a subject). The distance sensor 26 emits, for example, infrared light, laser light or ultrasonic waves, and calculates the distance by the time difference until the reflected light is detected using a Time Of Flight (TOF) method. In addition, instead of using the distance sensor 26, the image sensor 12 may be used to measure the distance to an object (for example, a vehicle as a subject). For example, the processor 10 displays the correspondence between the distance registered in advance and the size ratio, based on the size ratio of the vehicle image included in the captured image captured by the image sensor 12, and refers to a table (not shown) stored in the memory 11 or the like to derive the distance to the vehicle.

The illumination driver 14 is configured using a switching circuit or the like for switching on and off of the plurality of illumination LEDs 21. The illumination driver 14 switches the plurality of illumination LEDs 21 on or off in accordance with a control instruction from the processor 10. In addition, the illumination driver 14 may further include a variable amplification circuit or the like that can adjust the light emission amount of the illumination LED 21. In this case, the illumination driver 14 can adjust light by adjusting the light emission amount of the illumination LED 21 in accordance with the control instruction from the processor 10.

The lens driver 15 is configured using an electric circuit for adjusting the positions of various lenses LZ (see FIG. 11) in the lens block 50. The lens driver 15 adjusts the position of the focus lens in the lens block 50 in accordance with a control instruction from the processor 10. In a case where the lens block 50 incorporates a zoom lens, the lens driver 15 may adjust the magnification of the zoom lens in accordance with a control instruction from the processor 10.

The in-lens filter switching driver 17 is configured using an electric circuit for driving the in-lens filter switching module 60. The in-lens filter switching driver 17 drives the in-lens filter switching module 60 according to a control instruction from the processor 10, and disposes either an IR cut filter or a base glass on the optical axis.

The front filter switching driver 16 is configured using an electric circuit for driving the front filter switching module motor 43. The front filter switching driver 16 drives the front filter switching module motor 43 according to a control instruction from the processor 10, and disposes the band pass filter 41 or the polarization filter 42 on the optical axis op (see FIG. 11).

Figure 11:
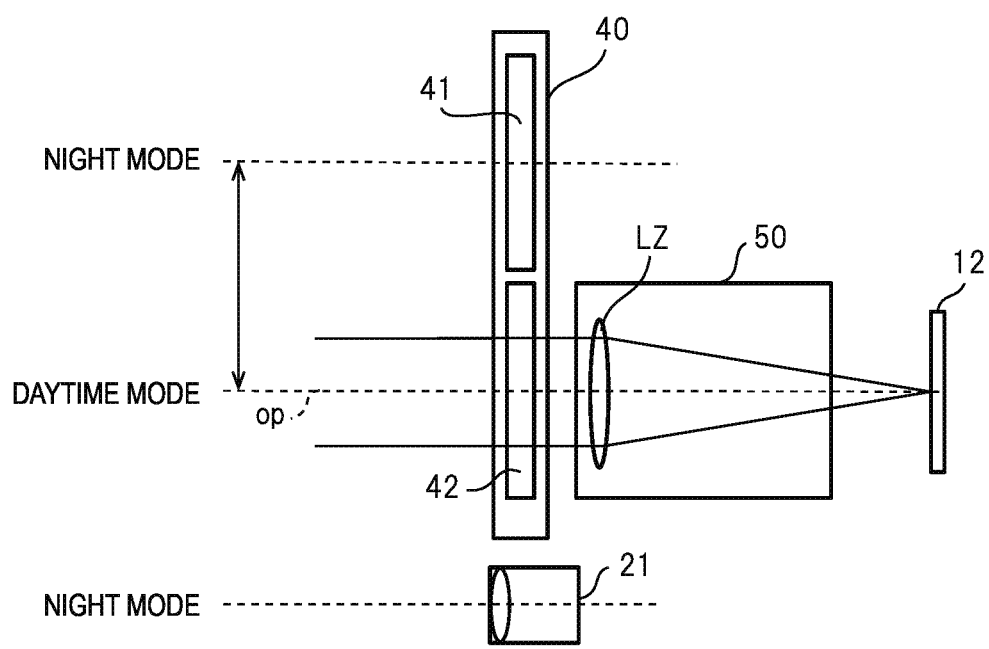
FIG. 11 is a view showing an example of the optical arrangement of the front filter switching module.

FIG. 11 is a view showing an example of the optical arrangement of the front filter switching module 40. The front filter switching module 40 is slidable by the front filter switching driver 16 in a direction orthogonal to the optical axis op (specifically, the left-right direction in FIG. 1). In the daytime mode, the front filter switching module 40 slides the rectangular frame 401 such that the polarization filter 42 is positioned on the front of the lens block 50, in order to reduce the harmful light (for example, reflected light from window glass such as a windshield of a vehicle). On the other hand, in the night mode, the front filter switching module 40 slides the rectangular frame 401 such that the band pass filter 41 is positioned on the front of the lens block 50 in order to reduce the light intensity of the headlight from the vehicle.

The rectangular frame 401 is movable within a mechanical movable range (that is, a mechanical stroke) in a direction (specifically, the left and right direction in FIG. 1) orthogonal to the optical axis op. When the rotation of the front filter switching module motor 43 is accelerated after the front filter switching module motor 43 is started, the angular velocity of the front filter switching module motor 43 is gradually increased to reach a constant angular velocity. In this case, the rectangular frame 401 shifts to a movable range (that is, soft stroke) at a constant speed after acceleration.

On the other hand, when the rotation of the front filter switching module motor 43 is decelerated, the angular velocity of the front filter switching module motor 43 is gradually decreased to 0 (zero). The rectangular frame 401 moves at a reduced speed from a constant speed. The range in which the rectangular frame 401 can move at a constant speed (that is, the soft stroke) can be arbitrarily adjusted by the torque of the front filter switching module motor 43. Further, the position of the polarization filter 42 or the band pass filter 41 with respect to the optical axis op is adjusted by the distance of the rectangular frame 401 from the origin detected by the front filter switching module origin sensor 48.

The polarization filter swing driver 18 is configured using an electric circuit for driving the polarization filter rotating motor 44. The polarization filter swing driver 18 drives the polarization filter rotating motor 44 according to the control instruction from the processor 10, and rotates the polarization axis of the polarization filter 42 disposed on the optical axis op by a predetermined angle (that is, the polarization angle $\theta pl$) around the optical axis op. The tilt of the polarization axis of the polarization filter 42 limits the amount of light to be transmitted through the polarization filter 42.

The polarization filter 42 is rotatable within a mechanical rotation range (that is, mechanical stroke). When the rotation of the polarization filter rotating motor 44 is accelerated after the polarization filter rotating motor 44 is started, the angular velocity of the polarization filter rotating motor 44 is gradually increased to reach a constant angular velocity. In this case, the polarization filter 42 shifts to a rotatable range (that is, soft stroke) at a constant speed after acceleration.

On the other hand, when the rotation of the polarization filter rotating motor 44 is decelerated, the angular velocity of the polarization filter rotating motor 44 is gradually decreased to 0 (zero). The polarization filter 42 rotates at a reduced speed from a constant speed. The range in which the polarization filter 42 can rotate at a constant speed (that is, the soft stroke) can be arbitrarily adjusted by the torque of the polarization filter rotating motor 44. Further, the angle (polarization angle) of the polarization axis of the polarization filter 42 is adjusted by the amount of rotation of the polarization filter 42 from the origin detected by the polarization filter rotation origin sensor 4016.

Next, various operations of the camera apparatus 5 according to Embodiment 1 will be described in order.

Hereinafter, an example in which the processor 10 of the camera apparatus 5 mainly performs each process described later will be described. The processor 10 may transmit to the external device (for example, the server 80) through the communication unit 19 an instruction for causing the server 80 to execute each process on the data of the captured image captured by the image sensor 12.

Figure 12:
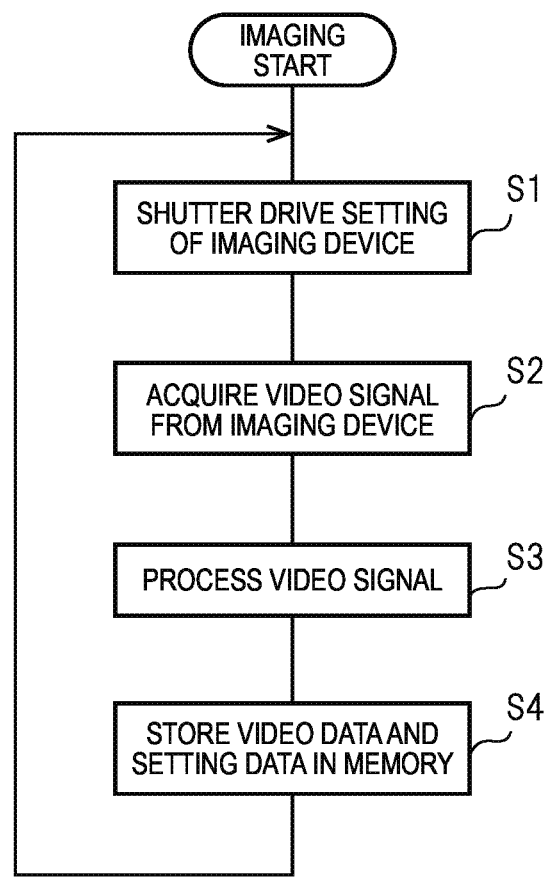
FIG. 12 is a flowchart showing an imaging operation procedure of the camera apparatus.

FIG. 12 is a flowchart showing an imaging operation procedure of the camera apparatus 5.

The process shown in FIG. 12 is repeatedly performed, for example, from the time the power of the camera apparatus 5 is turned on and started until the power is turned off. The process shown in FIG. 12 may be set in advance to be performed at predetermined time intervals or at predetermined times.

In FIG. 12, the processor 10 performs shutter drive setting (for example, setting of an exposure time for switching on or off of the electronic shutter) of the image sensor 12 (S1). For example, the processor 10 sets the first exposure time shorter than the predetermined time when imaging odd-numbered frames, and sets the second exposure time longer than the predetermined time when imaging even-numbered frames. Further, the processor 10 may alternately switch and set the first exposure time and the second exposure time at fixed time intervals.

The processor 10 acquires a video signal from the image sensor 12 (for example, an electrical signal corresponding to a captured video imaged by the image sensor 12) (S2).

The processor 10 performs predetermined signal processing on the video signal acquired in step S2 to generate video data (that is, data of a captured video) (S3). The predetermined signal processes described above include, for example, processes such as noise removal, white balance, and image compression, but the present disclosure is not limited to these processes.

The processor 10 accumulates the video data generated in step S3 and the setting data set in step S1 in the memory 11 in association with each other (S4). The setting data includes information such as an exposure time and an imaging date and time. Thereafter, the process of the processor 10 returns to step S1. That is, a process for imaging the next frame is performed.

Figure 13:
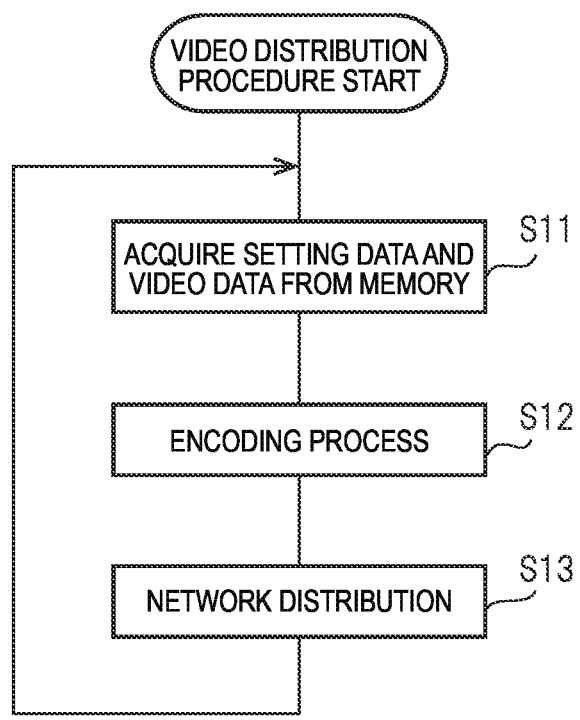
FIG. 13 is a flowchart showing a video distribution procedure.

FIG. 13 is a flowchart showing a video distribution procedure.

The process shown in FIG. 13 is repeatedly performed, for example, from the time the power of the camera apparatus 5 is turned on and started until the power is turned off. The process shown in FIG. 13 may be set in advance to be performed at predetermined time intervals or at predetermined times.

In FIG. 13, the processor 10 reads and acquires the video data and setting data accumulated in association with each other in the memory 11 (S11).

The processor 10 performs an encoding process suitable for the video data acquired in step S11 (more specifically, the exposure time at the time of capturing the video data) (S12). For example, when acquiring the face of the driver through a window glass such as a windshield of a vehicle as a clear face image, the processor 10 performs encoding at a low compression rate. The processor 10 performs encoding at a high compression rate, in a case of reducing the data amount of video data.

The processor 10 distributes the video data encoded in step S12 as a stream to the external device such as the server 80 or the recorder 90 through the communication unit 19 (S13). For example, in a case where the distribution destination of the video data is the recorder 90, the recorder 90 accumulates the video data. In a case where the distribution destination of the video data is the server 80, the server 80 executes various processes (a display process, an image analysis process, and the like) on the video data distributed from the camera apparatus 5. Thereafter, the process of the processor 10 returns to step S11.

Figure 14:
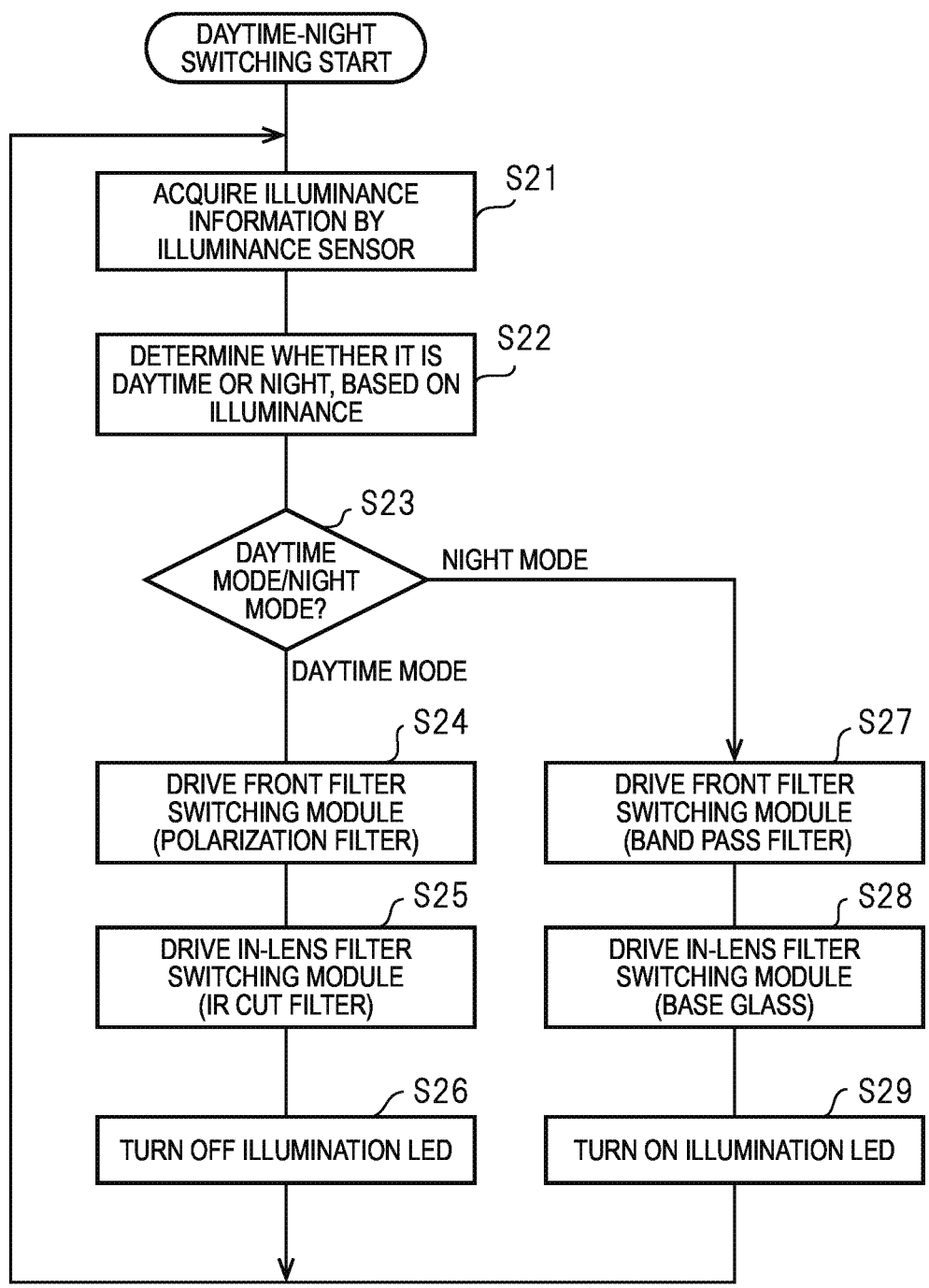
FIG. 14 is a flowchart showing a daytime-night switching operation procedure.

FIG. 14 is a flowchart showing a daytime-night switching operation procedure.

The process shown in FIG. 14 is repeatedly performed, for example, from the time the power of the camera apparatus 5 is turned on and started until the power is turned off. The process shown in FIG. 14 may be set in advance to be performed at predetermined time intervals or at predetermined times.

Figures 15, 16:
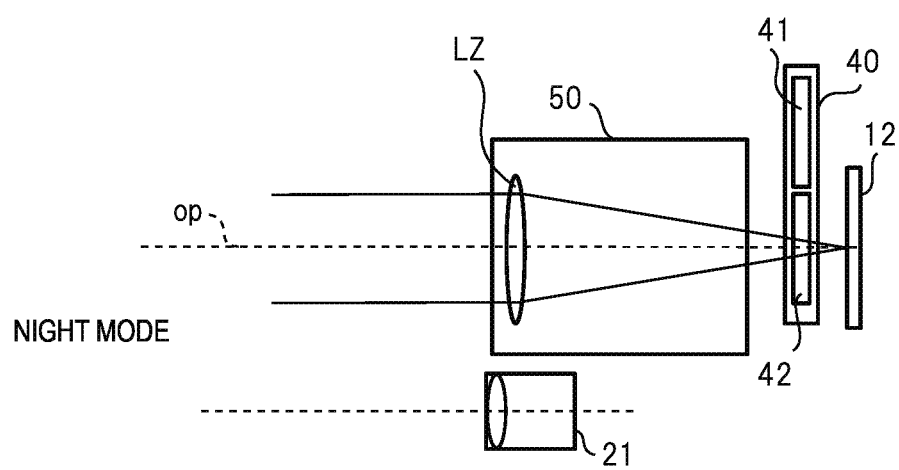
FIG. 15 is a diagram showing an example of registered contents of a table in which settings of the daytime mode and the night mode are registered.
FIG. 16 is a view showing another optical arrangement of the front filter switching module.

FIG. 15 is a diagram showing an example of registered contents of a table Tb0 in which settings of the daytime mode and the night mode are registered. The table Tb0 is registered, for example, in the memory 11 in advance. In the table Tb0, in the daytime mode, in the front filter switching module 40, instruction information for disposing the polarization filter 42 on the optical axis is registered. Further, in the in-lens filter switching module 60, instruction information for disposing the IR cut filter on the optical axis is registered. Further, instruction information for turning off the illumination LED 21 is registered.

On the other hand, in the night mode, in the front filter switching module 40, instruction information for disposing the band pass filter 41 on the optical axis is registered. Further, in the in-lens filter switching module 60, instruction information for disposing the base glass on the optical axis is registered. In addition, instruction information for lighting the illumination LED 21 is registered. The daytime-night switching operation shown in FIG. 14 is performed based on the registered contents of the table Tb0.

In FIG. 14, the processor 10 acquires illuminance information of the environment around the camera apparatus 5 detected by the illuminance sensor 13 (S21). The processor 10 determines whether the present time is daytime (for example, morning or daytime) or night (for example, evening or night), based on the illuminance information detected by the illuminance sensor 13 (S22).

The processor 10 determines whether the operation mode of the camera apparatus 5 is set to the daytime mode or the night mode, based on the determination result regarding daytime or night (S23). For example, the memory 11 may store and hold a threshold related to a predetermined illuminance. If the luminance is higher than the threshold, it may be determined as the daytime mode, and if the luminance is lower than the threshold, it may be determined as the night mode.

In the daytime mode, the processor 10 generates a control instruction for executing a daytime mode process, based on the table Tb0 shown in FIG. 15, sends the control instruction to the front filter switching driver 16, and drives the front filter switching module 40 through the front filter switching driver 16 (S24). In the daytime mode, the polarization filter 42 is moved to be positioned on the optical axis. Further, the processor 10 sends similarly the control instruction described above to the polarization filter swing driver 18, and drives the polarization filter rotating motor 44 to rotate the polarization filter 42 through the polarization filter swing driver 18. The details of the operation of rotating the polarization filter 42 will be described later.

Further, the processor 10 similarly sends the control instruction for the daytime mode described above to the in-lens filter switching driver 17, and drives the in-lens filter switching module 60 through the in-lens filter switching driver 17 (S25). In the daytime mode, in order to make the RGB image captured by the image sensor 12 clear, the in-lens filter switching module 60 moves such that the IR cut filter is positioned on the optical axis.

Further, the processor 10 similarly sends the control command for the daytime mode described above to the illumination driver 14, and turns off the plurality of illumination LEDs 21 through the illumination driver 14 (S26). Thereafter, the process of the processor 10 returns to step S21.

On the other hand, in the case of the night mode, the processor 10 generates a control instruction for executing a night mode process, based on the table Tb0 shown in FIG. 15, sends the control instruction to the front filter switching driver 16, and drives the front filter switching module 40 through the front filter switching driver 16 (S27). In the night mode, the band pass filter 41 is moved to be positioned on the optical axis.

Further, the processor 10 similarly sends the control instruction for the night mode described above to the in-lens filter switching driver 17, and drives the in-lens filter switching module 60 through the in-lens filter switching driver 17 (S28). In the night mode, in the in-lens filter switching module 60, the base glass is moved so as to be positioned on the optical axis so as not to block the IR light incident on the camera apparatus 5.

The processor 10 similarly sends the above-described control instruction for the night mode to the illumination driver 14, and turns on the plurality of illumination LEDs 21 through the illumination driver 14 (S29). The plurality of illumination LEDs 21 emit IR light toward a subject (for example, a vehicle) of the camera apparatus 5. Thereafter, the process of the processor 10 returns to step S21.

(Another Example of Optical Arrangement of Front Filter Switching Module)

FIG. 16 is a view showing another optical arrangement of the front filter switching module 40. For example, in the optical arrangement shown in FIG. 11, the front filter switching module 40 is disposed on the front side of the lens block 50. However, the front filter switching module 40 may be disposed on the rear side of the lens block 50 and on the front side of the image sensor 12.

Even in the optical arrangement shown in FIG. 16, the same effect as the optical arrangement shown in FIG. 11 can be obtained. Further, the front filter switching module 40 is disposed on the rear side of the lens block 50 and on the front side of the image sensor 12. Therefore, the lens block 50 is disposed on the front side of the front filter switching module 40, and for example, replacement of the lens in the lens block 50 is easy.

As described above, the camera apparatus 5 according to Embodiment 1 includes the illuminance sensor 13 that detects the daytime mode. Thus, the camera apparatus 5 can easily insert and remove the IR cut filter on the optical axis. In a case where the daytime mode is detected, the processor 10 captures an image of the vehicle on which the driver is riding, and generates a face image of the driver. In addition, the lens block 50 switchably supports the use of the IR cut filter. The processor 10 disposes the IR cut filter on the front side of the image sensor 12 in the daytime mode. Thus, in a case where the camera apparatus 5 captures an image of the driver's face in the vehicle during the daytime, the IR cut filter is disposed on the optical axis, so it is possible to block the IR light, and a clear RGB image can be obtained by the image sensor 12. In addition, in a case where the camera apparatus 5 irradiates IR light at night and captures an image of the face of the driver in the vehicle, the IR cut filter is removed from the optical axis, and the IR light passes through the base glass, so a bright image including the illuminated driver's face is obtained.

The camera apparatus 5 further includes an illuminance sensor 13 that detects a daytime mode or a night mode, and an LED body 20 that irradiates the vehicle VC (see FIG. 18) with IR light in the night mode. The front filter switching module 40 switchably supports the polarization filter 42 and the band pass filter 41 that transmits IR light. The processor 10 disposes the polarization filter 42 on the front side of the image sensor 12 in the daytime mode, and disposes the band pass filter 41 on the front side of the image sensor 12 in the night mode. Thus, the camera apparatus 5 can image the face of the driver with high accuracy by suppressing the incidence of the reflected light from the window glass such as the windshield of the vehicle during the daytime. In addition, since the camera apparatus 5 can block light other than IR light through the band pass filter 41 at night, it is possible to capture an IR image in which darkness is suppressed based on the IR light received by the image sensor 12.

(Rotation of Polarization Filter)

For example, in a case of imaging the face of a driver in a vehicle through a window glass of the vehicle such as a windshield, it is required to reduce ambient light reflected by the window glass. When disposing the polarization filter 42 on the optical axis of the camera apparatus 5 in the daytime mode, the camera apparatus 5 can adaptively rotate the polarization filter 42 such that the driver's face can be clearly imaged regardless of the lane in which the vehicle travels or vehicle type.

FIG. 17 is a diagram showing an example of registered contents of the tables Tb1, Tb2 in which the window glass angle θw and the detection angle θcc are registered for each vehicle type. The window glass angle θw corresponding to the vehicle type is registered in the table Tb1. The window glass angle θw (for example, the windshield angle) is a fixed value determined by the vehicle type. As an example, the window glass angles θw of a sedan, a sport utility vehicle (SUV), a small car, and a bus are 25 degrees, 35 degrees, 70 degrees, and 85 degrees, respectively. As these fixed values, for example, calculated values obtained in advance by simulation or actual measurement may be used.

The detected angle θcc corresponding to the vehicle type and the lane is registered in the table Tb2. As an example of the detection angle θcc, the detection angle θcc1 of the lane RL1 on the front side (see FIG. 19) viewed from the installation location of the camera apparatus 5 and the detection angle θcc2 of the lane RL2 on the front side (see FIG. 19) viewed from the installation location of the camera apparatus 5 are shown. In addition, a sedan, an SUV, and a small car are shown as examples of vehicle type.

The detection angles θcc1 of a sedan, an SUV, and a small car in the lane RL1 on the front side are 8.5 degrees, 6.8 degrees, and 5.7 degrees, respectively. The detection angles θcc2 of a sedan, an SUV, and a small car in the lane RL2 on the back side are 19.2 degrees, 15.6 degrees, and 13.1 degrees, respectively. As these values, for example, calculated values obtained in advance by simulation or actual measurement may be used. When detecting the vehicle VC, in a case where the camera apparatus 5 determines the lane in which the vehicle VC travels and the vehicle type, and acquires information on each of the lane and vehicle type, it refers to the table Tb2 to acquire the detection angle θcc of the vehicle VC. The table Tb1 and the table Tb2 are stored, for example, in the memory 11.

Figure 18:
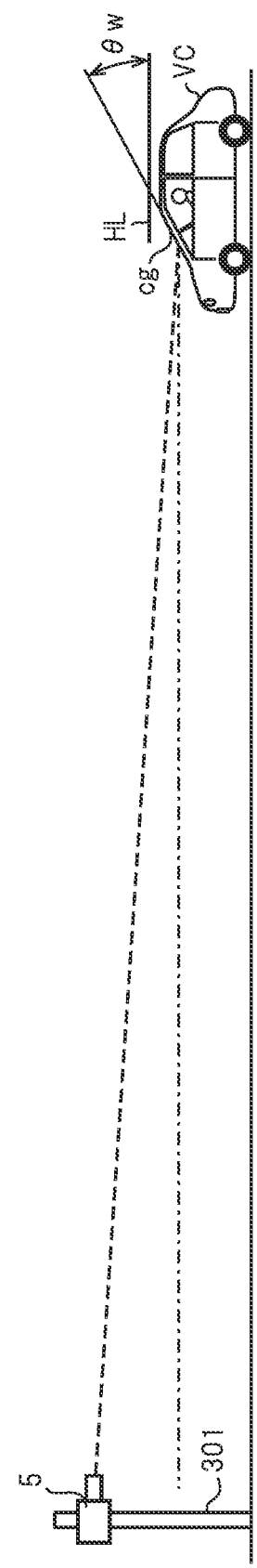
FIG. 18 is a diagram showing the window glass angle of vehicle window glass.

FIG. 18 is a diagram showing the window glass angle θw of the window glass cg of the vehicle VC. In FIG. 18, the camera apparatus 5 is fixedly attached to the upper portion of the pole 301 installed on the road shoulder such as a sidewalk so as to be overlook and image the vehicle VC. The window glass angle θw is represented by an inclination angle from a horizontal line HL (for example, corresponds to the ground) of the vehicle body of the vehicle VC.

Figure 19:
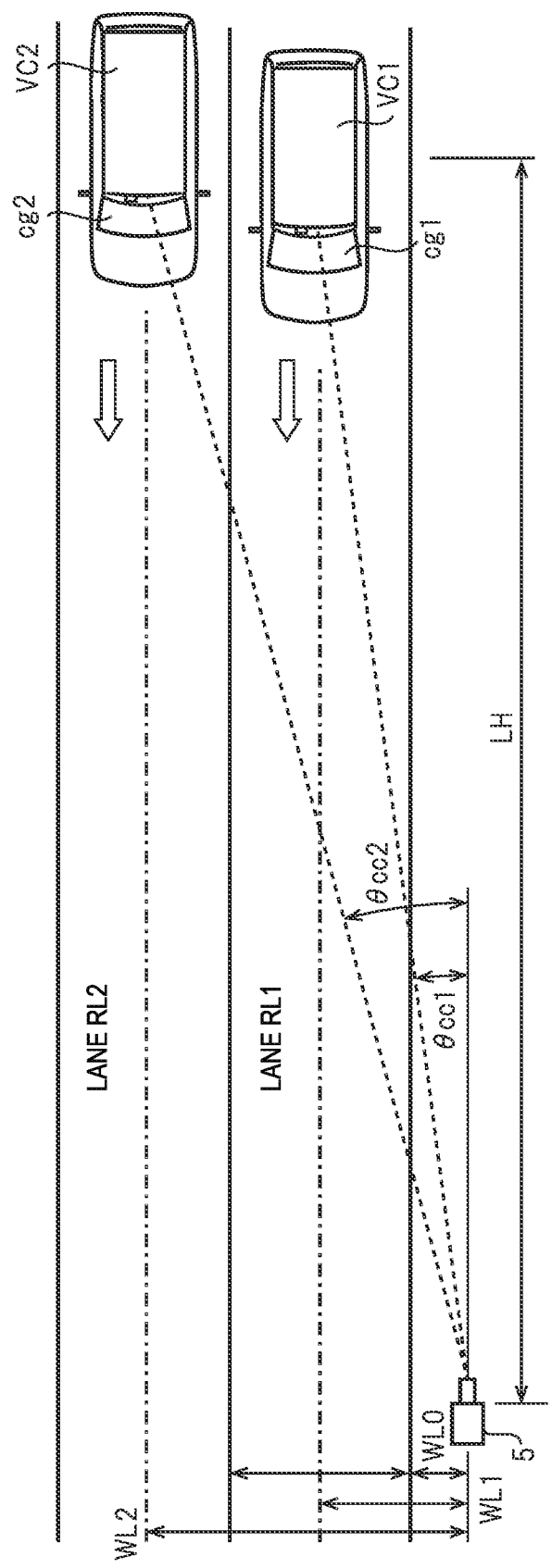
FIG. 19 is a diagram showing detection angles corresponding to traveling directions of respective vehicles, in a case where the camera apparatus respectively images the vehicles traveling in lanes.

FIG. 19 is a diagram showing detection angles θcc1, θcc2 corresponding to the traveling directions of the vehicles VC1, VC2, in a case where the camera apparatus 5 images the vehicles VC1, VC2 traveling on the lanes RL1, RL2, respectively. In order to make the explanation easy to understand, it is assumed that the vehicles VC1, VC2 travel in the centers of the lanes RL1, RL2, respectively. Here, in order to make the description easy to understand, the window glasses cg1, cg2 are used as the windshields of the vehicles VC1, VC2, respectively.

The horizontal distance LH from the camera apparatus 5 to the vehicle VC1 or VC2 is, for example, 20 to 30 m. Each road width of the lanes RL1, RL2 is 4 m, for example. The distance WL0 from the camera apparatus 5 to the end of the lane RL1 is, for example, 1 m. The distance WL1 from the camera apparatus 5 to the center of the lane RL1 is, for example, 3 m. The distance WL2 from the camera apparatus 5 to the center of the lane RL2 is, for example, 7 m.

The detection angle θcc1 is an angle of a horizontal component formed by a line extending from the camera apparatus 5 to a central upper portion of the window glass cg1 of the vehicle VC1 and a traveling line from the camera apparatus 5 to the lane RL1. Similarly, the detection angle θcc2 is an angle of a horizontal component formed by a line extending from the camera apparatus 5 to a central upper portion of the window glass cg2 of the vehicle VC2 and a traveling line of from the camera apparatus 5 to the lane RL2.

Figure 20:
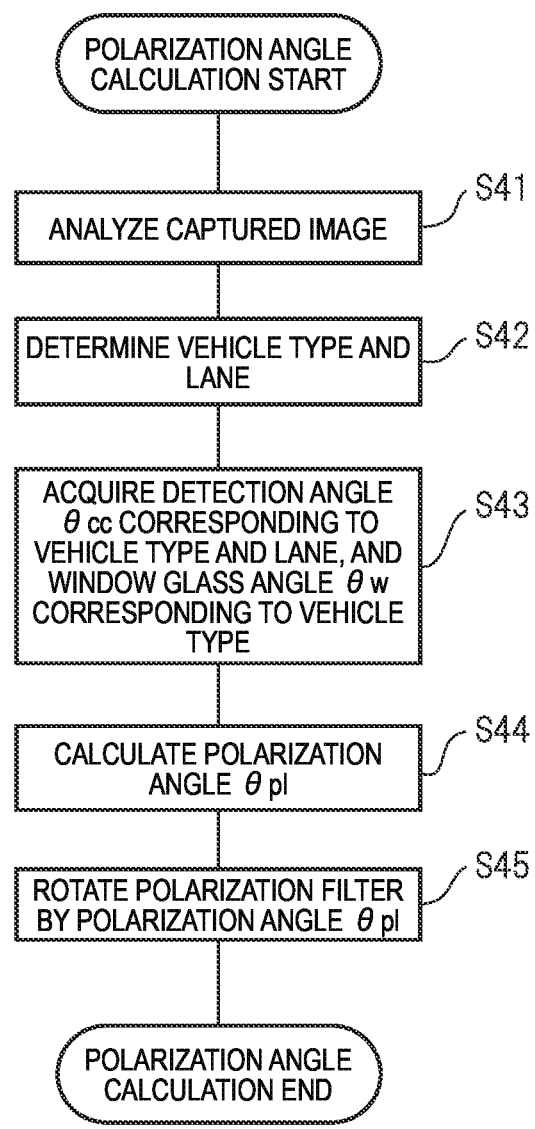
FIG. 20 is a flowchart showing a calculation procedure of the polarization angle of the polarization filter in a case where the camera apparatus detects a vehicle.

FIG. 20 is a flowchart showing a calculation procedure of the polarization angle of the polarization filter 42 in a case where the camera apparatus 5 detects a vehicle VC.

For example, in the daytime mode, when the polarization filter 42 is disposed on the optical axis by the switching operation of the front filter switching module 40 (see step S24 in FIG. 14), the process shown in FIG. 20 is executed when the vehicle VC traveling on a road is detected by the analysis of the captured video by the processor 10.

First, as an example of vehicle detection, the processor 10 registers a typical vehicle image corresponding to each vehicle type in the memory 11 as a reference image (that is, a template), and performs template matching between the captured image frame constituting a captured image captured by the image sensor 12 and the reference image. The processor 10 detects a vehicle traveling in the lane on the road in a case where the degree of similarity of feature points in a frame of a captured image is equal to or greater than a predetermined threshold. The vehicle detection method is not limited to the template matching method described above. A vehicle detection sensor for irradiating the vehicle with microwaves or infrared light and detecting the presence or absence of the vehicle by its reflection may be attached near or inside the camera apparatus 5, and the camera apparatus 5 may perform detection by receiving the detection signal from the vehicle detection sensor.

In FIG. 20, the processor 10 analyzes a captured image frame constituting the captured image captured by the image sensor 12 and stored in the memory 11 (S41). As a result of analysis, the processor 10 determines the vehicle type and lane position of the vehicle VC included in the frame of the captured image (S42).

Here, the determination of the vehicle type is performed in the same manner as in the case of the vehicle detection. For example, the processor 10 registers a vehicle image for each vehicle type in the memory 11 as a reference image (that is, a template), and performs template matching between the captured image frame constituting a captured image captured by the image sensor 12 and the reference image. The processor 10 specifies the vehicle type of the vehicle VC, in a case where the degree of similarity of feature points in a frame of a captured image is equal to or greater than a predetermined threshold. Further, the lane determination is performed, for example, by the processor 10 recognizing one center line and two side lines on the road included in the frame of the captured image, and specifying which side of two side lines across the center line, on which the vehicle VC is positioned.

After step S42, the processor 10 refers to the tables Tb1 and Tb2 to acquire the detection angle θcc corresponding to the vehicle type and the lane, and the window glass angle θw corresponding to the vehicle type (S43). As described above, the processor 10 determines the vehicle types of the vehicles VC1, VC2 and the lanes RL1, RL2 in which the vehicles VC1, VC2 travel. The processor 10 refers to the table Tb2 based on the determination results of the vehicle types of the vehicles VC1, VC2 and the lanes RL1, RL2, and acquires a detection angle corresponding to the vehicle type. Thus, the camera apparatus 5 can easily obtain the detection angles θcc1, θcc2 of the detected vehicles VC1, VC2.

The processor 10 calculates a rotation angle (hereinafter "polarization angle θpl") to which the polarization filter 42 is to be rotated according to the detected vehicle, by using Expression (1), based on the window glass angle θw and the detection angle θcc (S44). The polarization angle θpl is equal to, for example, Δθ1, Δθ2 shown in FIG. 21 described later, and is an optimal angle of the polarization axis of the polarization filter 42.

$$\theta pl = \theta w \times \sin(\theta cc) \quad (1)$$

The processor 10 generates a control instruction for instructing rotation of the polarization angle θpl calculated by Expression (1) and sends the control instruction to the polarization filter swing driver 18, and rotates the polarization axis of the polarization filter 42 by the polarization angle θpl (S45). Thereafter, the process of the processor 10 ends.

As described above, the camera apparatus 5 includes the lens block 50 including the lens LZ (for example, a focus lens) that focuses the light from the vehicle VC as the subject. The camera apparatus 5 has an image sensor 12 that captures an image based on the light from the vehicle VC focused by the focus lens. The camera apparatus 5 has a front filter switching module 40 that rotatably supports a polarization filter 42 that limits light from the vehicle VC received by the image sensor 12. The camera apparatus 5 includes a processor 10 that determines a vehicle type of the vehicle VC, based on a captured image of the vehicle VC captured by the image sensor 12. The processor 10 rotates the polarization filter 42 by the rotation angle (for example, the polarization angle θpl) corresponding to the vehicle type, according to the determined vehicle type.

Thus, when imaging the face of the driver in the vehicle VC, the camera apparatus 5 prevents the reflected light from the window glass cg from entering as much as possible even if the lane of the road in which the vehicle VC travels and the type are different. Therefore, the driver's face image captured by the image sensor 12 becomes clear. As described above, since the camera apparatus 5 can adaptively reduce the influence of harmful light when capturing the face of a person in a vehicle according to the type of the vehicle VC, it is possible to suppress the degradation of the image quality of the captured image.

Further, the processor 10 derives a detection angle θcc indicating a direction in which the vehicle VC viewed from the camera apparatus 5 is detected, based on the captured image of the vehicle VC, and derives the rotation angle (polarization angle θpl), based on the window glass angle θw formed by a window glass corresponding to the vehicle type and the ground and the detection angle θcc. Thus, the processor 10 can accurately and adaptively calculate the rotation angle (that is, the polarization angle θpl) of the polarization filter 42 corresponding to the vehicle type and the lane of the vehicle VC.

In addition, the camera apparatus 5 includes the memory 11 that stores the table Tb1 in which the vehicle type is associated with the window glass angle θw. Thus, the processor 10 can easily acquire the window glass angle θw without calculating the window glass geometrically (in other words, without requiring the processing load of the calculation).

(A Picture of Both the Driver's Face and the Face of the Passenger Sitting in the Front Passenger Seat)

When imaging the inside of the vehicle VC, it is required to clearly image the face of the passenger sitting in the front passenger seat as well as the face of the driver sitting in the driver's seat. However, in a case where the polarization angle of the polarization filter is adjusted to only the driver's face through the window glass, the reflected light from the window glass on the front passenger seat side cannot be blocked sufficiently, and it may be difficult to see the face of the passenger sitting in the front passenger seat. The camera apparatus 5 can clearly image both the driver's face and the face of the passenger sitting in the front passenger seat.

Figure 21:
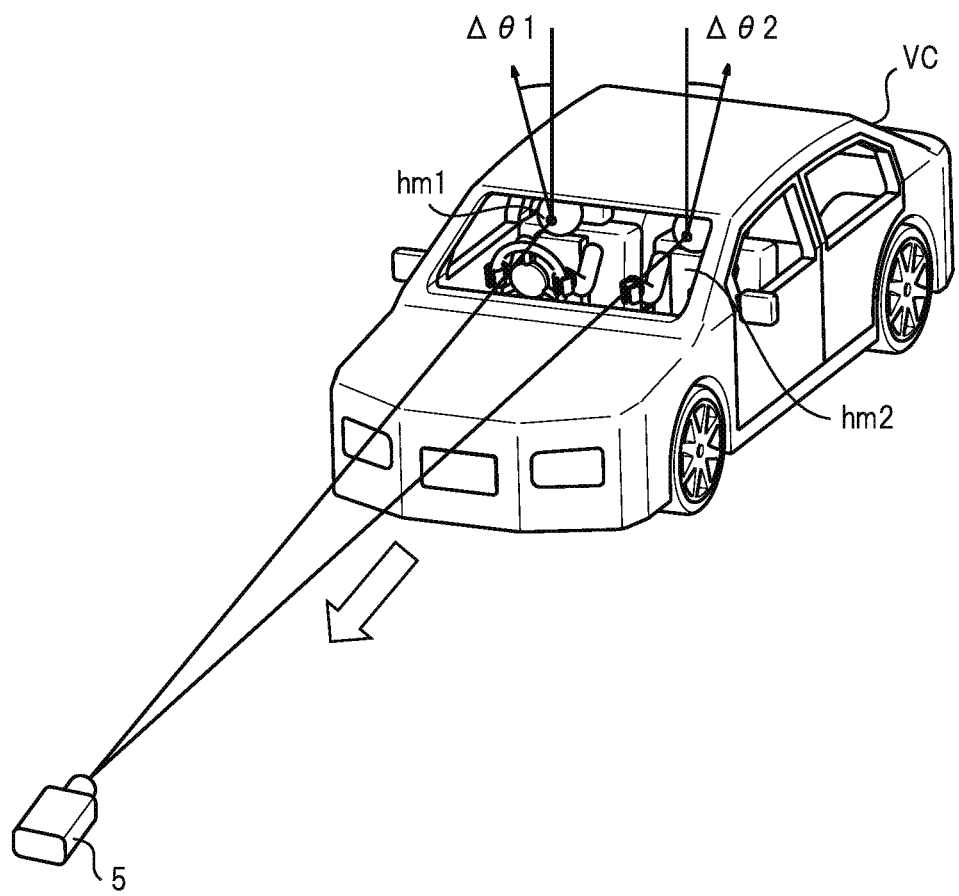
FIG. 21 is a perspective view for explaining the setting of the polarization angle of the polarization filter.
Figure 22:
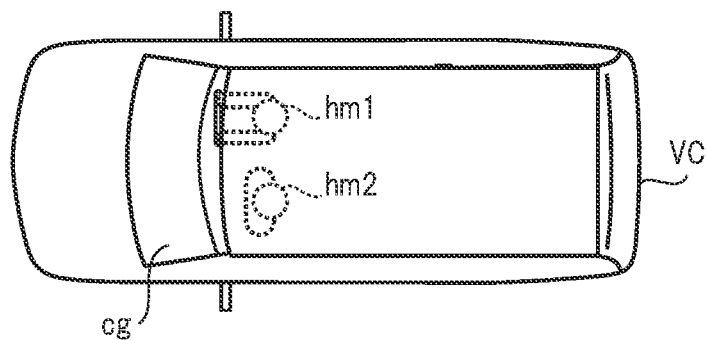
FIG. 22 is a plan view showing the shape of the window glass in a case where the vehicle is viewed from above.

FIG. 21 is a perspective view for explaining the setting of the polarization angle of the polarization filter 42. FIG. 22 is a plan view showing the shape of the window glass cg in a case where the vehicle VC is viewed from above. The window glass cg of the vehicle VC is assumed to be a part of a spherical surface having a radius of curvature of 5 m, for example. That is, the window glass cg such as the windshield is not formed into a plain plane, but has a spherical shape.

The camera apparatus 5 is installed in the traveling direction of the vehicle VC. The polarization angle θpl, which is the inclination of the polarization axis of the polarization filter 42 from the vertical direction, is set to the optimum polarization angle according to the face of the driver hm1 (one aspect of a first person) sitting in the driver's seat and the face of the passenger hm2 (one aspect of a second person) sitting in the front passenger seat. As shown in FIG. 21, in a case where the camera apparatus 5 images the vehicle VC from the front in the traveling direction, the polarization angles θpl in the face of the driver hm1 sitting in the driver's seat and the face of the passenger hm2 sitting in the front passenger seat are equal to each other in the opposite directions.

For example, in a case of imaging the face of the driver hm1, when the polarization angle of the polarization filter 42 is inclined to the left by Δθ1 from the vertical direction (vertical direction), a polarization angle is optimal for blocking the light reflected from the window glass cg. In addition, in a case where imaging the face of the passenger hm2 sitting in the front passenger seat, when the polarization angle of the polarization filter 42 is inclined to the right by Δθ2 from the vertical direction (vertical direction), a polarization angle is optimal for blocking the light reflected from the window glass cg. Accordingly, in order to clearly image both the face of the driver hm1 and the face of the passenger hm2 sitting in the front passenger seat, the polarization filter 42 can incorporate two polarization filters 421 (one aspect of the first polarization filter), 422 (one aspect of the second polarization filter). The polarization filter 42 may be configured to include only a single polarization filter (for example, the polarization filter 421).

Figure 23:
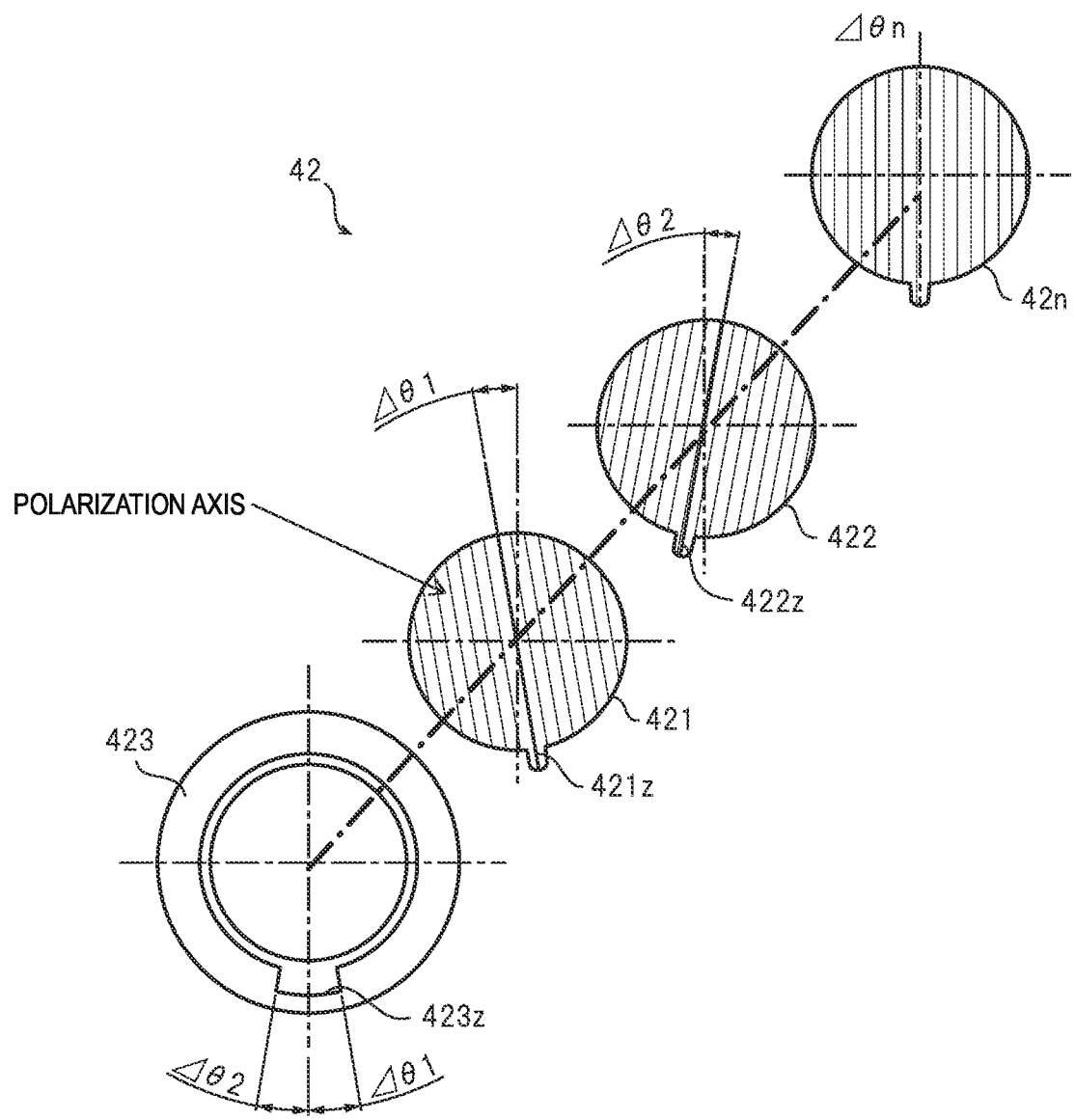
FIG. 23 is an exploded perspective view showing a configuration of a polarization filter in which two polarization filters are superimposed.
Figure 24:
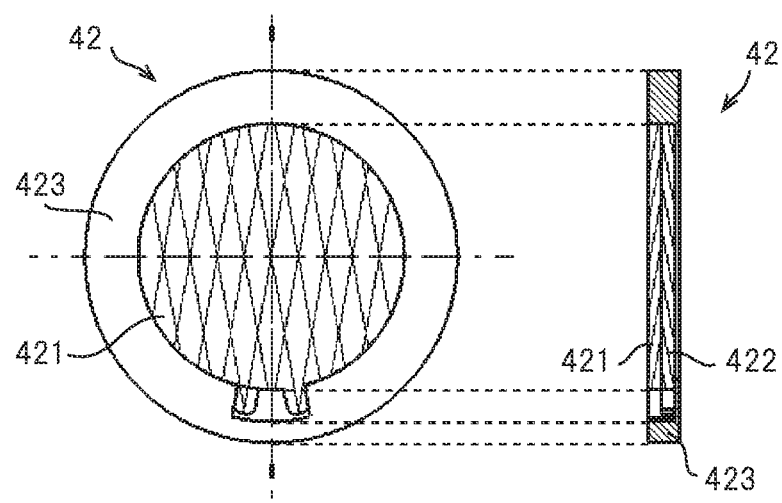
FIG. 24 is a diagram showing the appearance and cross section of the polarization filter.

FIG. 23 is an exploded perspective view showing a configuration of a polarization filter 42 in which two polarization filters 421, 422 are superimposed. FIG. 24 is a diagram showing the appearance and cross section of the polarization filter 42.

The polarization filter 42 has two polarization filters 421, 422 and a ring-shaped frame 423, and has a structure in which the two polarization filters 421, 422 are overlapped and are fitted to the inside the frame 423. Protrusions 421z, 422z are formed on the peripheral edge of the two polarization filters 421, 422, respectively. When the two polarization filters 421, 422 are fitted to the inside of the frame 423 at the inner peripheral edge of the frame 423, the protrusions 421z, 422z are accommodated, and the recess 423z that limits the rotation of the protrusions 421z, 422z is formed. The inner wall on the right side of the concave portion 423z in FIG. 23 is formed to be inclined by Δθ1 with respect to the polarization axis. The inner wall on the left side of the concave portion 423z in FIG. 23 is formed to be inclined by Δθ2 with respect to the polarization axis.

When the two polarization filters 421, 422 are fitted to the inside of the frame body 423, they are maintained state of being inclined at a predetermined angle. That is, in the polarization filter 421, the polarization axis is inclined to the left by Δθ1 from the vertical direction (vertical direction) such that a polarization angle θpl is optimal for imaging the driver's face. Further, in the polarization filter 422, the polarization axis is inclined to the right by Δθ2 from the vertical direction (vertical direction) such that a polarization angle θpl is optimal for imaging the face of the passenger sitting in the front passenger seat.

In a case of imaging through the polarization filter 42, the reflected light reflected by the window glass cg near the driver's face is blocked by the polarization filter 421. Further, the reflected light reflected by the window glass cg from the vicinity of the face of the passenger on the front passenger seat side is blocked by the polarization filter 422. Therefore, when imaging the front of the vehicle with the image sensor 12 through the polarization filter 42, a captured image in which both the driver's face and the face of the passenger sitting in the front passenger seat are both clear is obtained. In addition, of the polarization filters 421, 422 disposed along the optical axis direction, the polarization filter on the front side (in other words, the subject side) is made of an inorganic material and the polarization filter on the rear side (in other words, the imaging side) is made of an organic material, so it is possible to block ultraviolet light and to protect the deterioration of the organic polarization filter. This is because organic polarization filters are weak to ultraviolet light and easily deteriorated, while inorganic polarization filters are resistant to ultraviolet light and hard to deteriorate.

Figure 25:
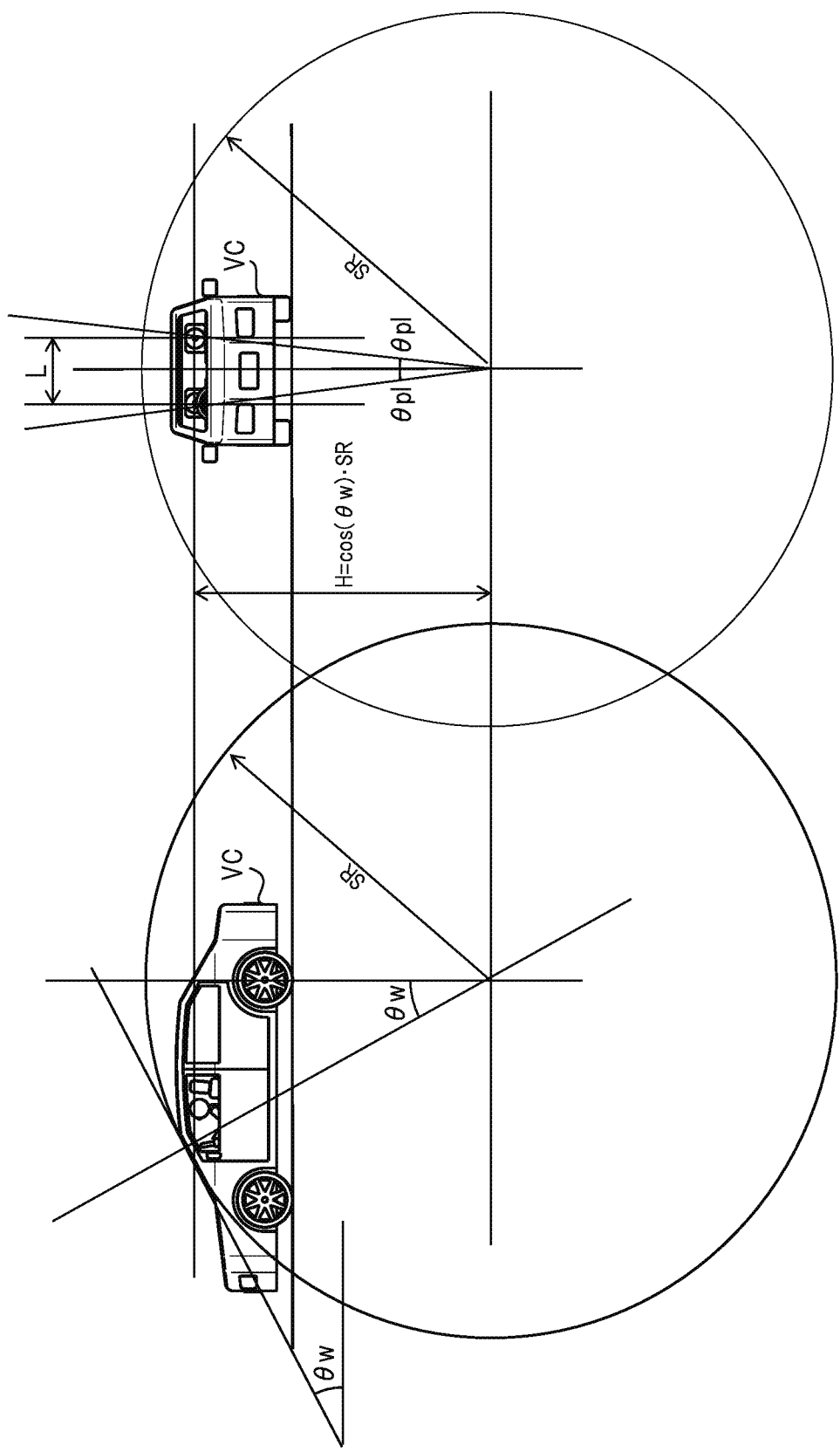
FIG. 25 is a diagram for explaining calculation of an optimum polarization angle.

FIG. 25 is a diagram for explaining calculation of an optimum polarization angle. As an example, the case where the window glass angle θw is 25 degrees is shown. The window glass cg forms a part of a spherical surface as described above. The radius of curvature SR of the spherical surface is, for example, 5000 mm (that is, 5 m). The distance between the driver's seat and the front passenger seat is, for example, 750 mm.

As shown in FIG. 25, the length H from the center of the curvature radius SR to the window glass cg is expressed by Expression (2).

$$H = SR \times \cos(\theta w) \quad (2)$$

Further, the optimum polarization angle of the polarization axis of the polarization filter 42 is expressed by Expression (3).

$$\theta pl = atn\left(\frac{\frac{L}{2}}{H}\right) = \arctan\left(\frac{L/2}{H}\right) \quad (3)$$

Therefore, the optimal polarization angle of the polarization angle Δpl is calculated, for example, as 4.7 degrees by Expression (3).

Here, although the polarization filter 42 having a structure in which two polarization filters 421, 422 are superimposed is shown, it may be a polarization filter having a structure in which n polarization filters are superimposed. For example, when the window glass cg has a specific part where light from the outside is reflected, n polarization filters may be superimposed so as to block the reflected light from this part. In addition, the case where the face of the passenger sitting in the front passenger seat and the driver's face are imaged is shown, but also in the case where the face of the passenger sitting in the back seat is simultaneously imaged, a polarization filter having a structure obtained by superimposing n polarization filters may be used.

As described above, the polarization filter 42 is configured such that a polarization filter 421 which is inclined at a first angle indicating the direction of the driver hm1 on the driver's seat side of the vehicle VC when viewed from the camera apparatus 5 and a polarization filter 422 which is inclined at a second angle indicating the direction of the passenger hm2 sitting on the front passenger seat side of the vehicle VC when viewed from the camera apparatus 5 are overlapped with reference to the vertical direction.

Thus, the camera apparatus 5 can block the reflected light from the window glass on the driver's seat side by adjusting the polarization angle of the polarization filter 42 to the window glass cg on the driver's seat side, and can block the reflected light from the window glass on the front passenger seat side by adjusting the polarization angle of the polarization filter to the window glass cg on the front passenger seat side. Therefore, the driver's face and the face of the passenger sitting in the front passenger seat can be clearly imaged together.

(Modification Example of Polarization Filter)

Figure 26:
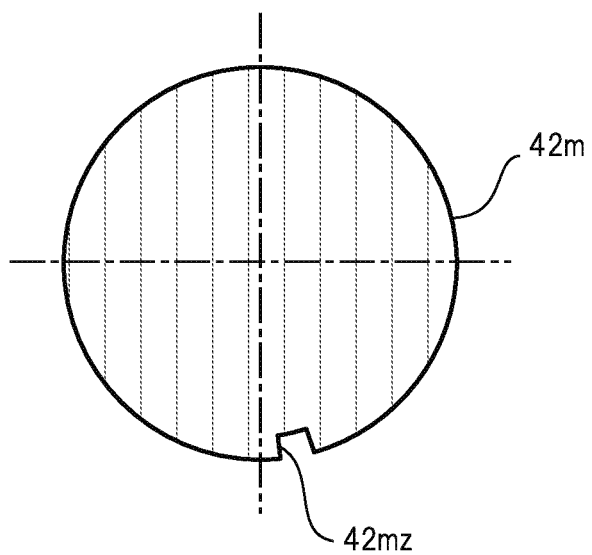
FIG. 26 is a front view showing a polarization filter of a modification example.

In the polarization filters 421, 422, protrusions 421z, 422z are formed as positioning portions, and positioning of the polarization filters 421, 422 is performed. FIG. 26 is a front view showing the polarization filter 42m of a modification example. In the outer peripheral edge of the polarization filter 42m, a recessed portion 42mz is formed as a positioning portion. On the other hand, on the inner side of the flame, a protrusion that engages with the recessed portion 42mz is formed. When the polarization filter 42m is fitted to the inside of the frame, the recessed portion 42mz of the polarization filter 42m engages with the protrusion of the frame, and the polarization filters 421, 422 are positioned. The positioning portion may be set without being coincident with the position on the polarization axis.

(Remove Shadows of Branches and Leaves)

In a case of imaging the face of the driver in the vehicle, if shadows of the branches and leaves of trees are reflected in the window glass, the driver's face and the shadows of branches and the like overlap each other in the captured image, and the driver's face is hard to see and blurs. The shadows reflected in the window glass include shadows of telegraph poles, electric wires, buildings, and the like, in addition to the above-described branches and leaves of trees. Even if shadows of the branches and leaves are reflected in the window glass, the camera apparatus 5 can clearly image the face of the driver in the vehicle.

Figure 27:
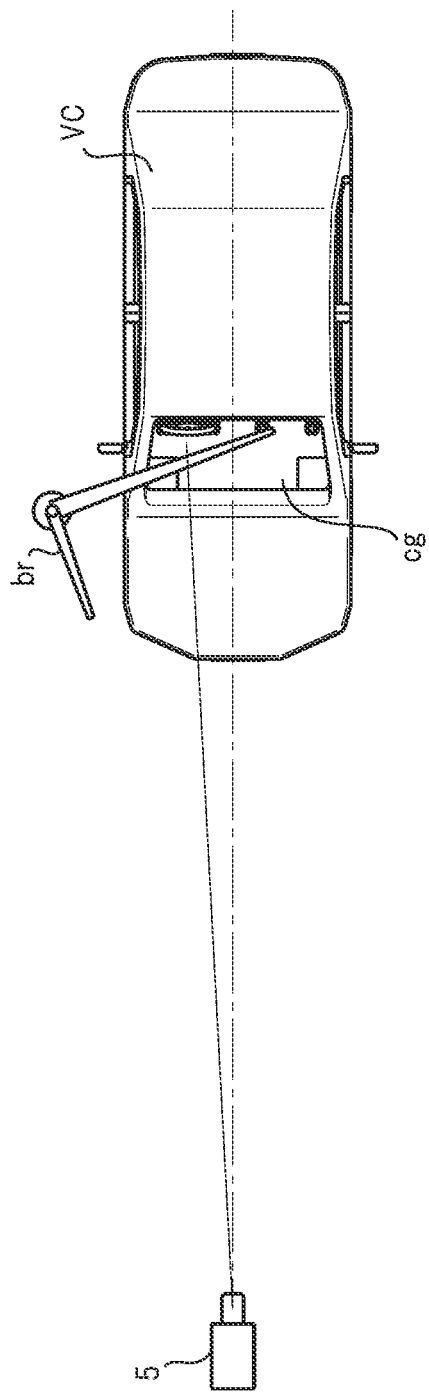
FIG. 27 is a plan view showing a situation in which the camera apparatus images a window glass portion of a stopped vehicle.

FIG. 27 is a plan view showing a situation in which the camera apparatus 5 images a window glass portion of a stopped vehicle VC. Shadows sd of branches and leaves br are reflected in the window glass cg of the stopped vehicle VC. In the captured image captured by the camera apparatus 5 through the window glass cg, the shadows sd of branches and leaves br are reflected so as to overlap with the face of the driver hm1 (one aspect of a person riding), so sufficient brightness is not obtained, and the face of the driver hm1 becomes hard to distinguish.

Figure 28:
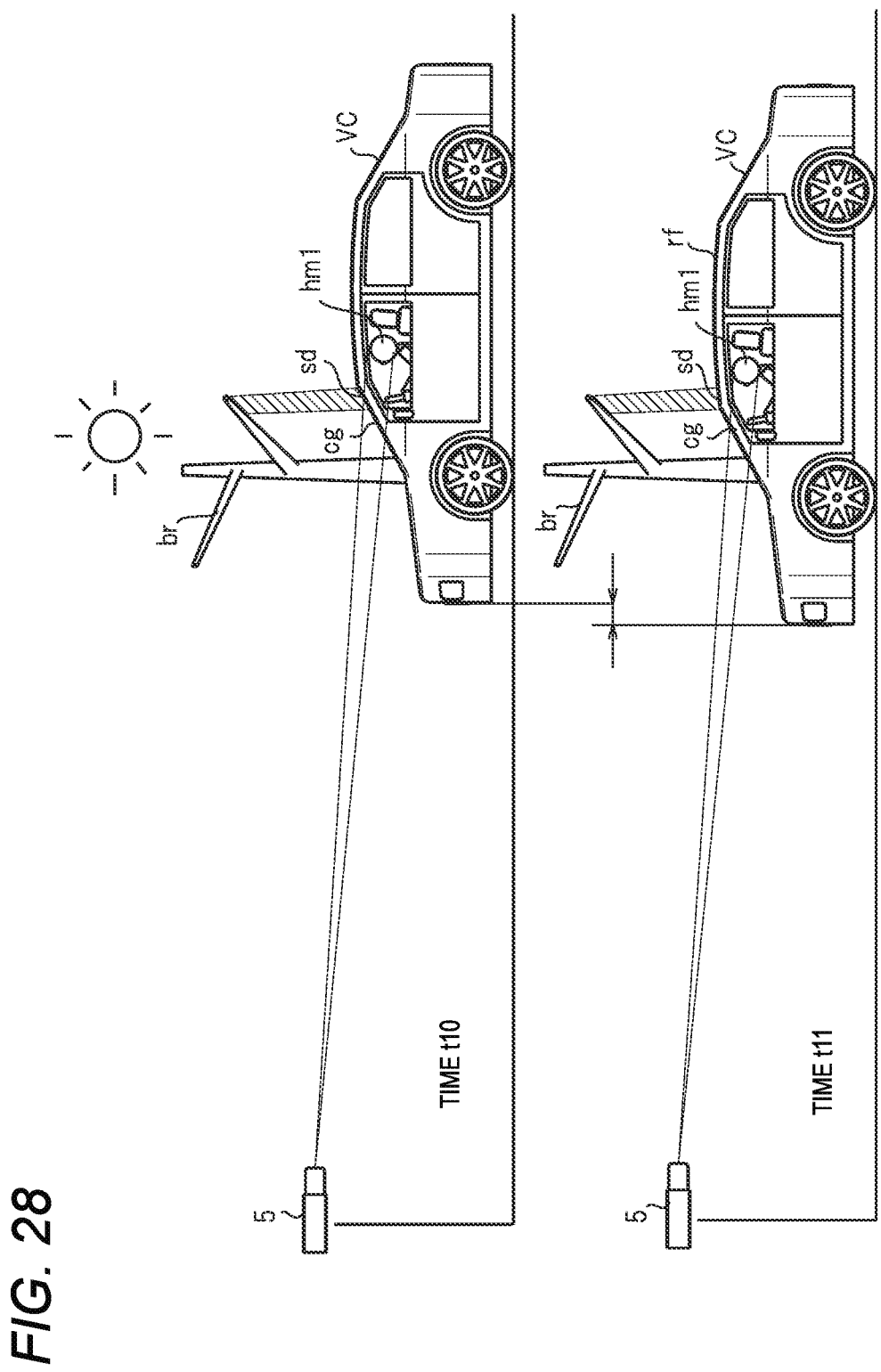
FIG. 28 is a side view showing a situation in which the camera apparatus continuously images the window glass portion of the traveling vehicle.

FIG. 28 is a side view showing a situation in which the camera apparatus 5 continuously images the window glass portion of the traveling vehicle VC. The subject is the traveling vehicle VC. At time t10, the branches br and the like are projected onto the upper portion of the window glass cg of the vehicle VC, and the shadow sd of the leaves br and the like is generated. Since the shadows sd of branches and leaves br are reflected so as to overlap with the face of the driver hm1 in the captured image captured by the camera apparatus 5 at this time, it is difficult to determine the face of the driver hm1. At time t11 after that, the shadow sd of the branch br, or the like is moved to the roof rf beyond the upper portion of the window glass cg. Since the shadows sd of branches and leaves br are reflected so as to overlap with the face of the driver hm1 in the image captured by the camera apparatus 5 at this time, sufficient brightness is obtained and the face of the driver hm1 becomes easy to distinguish.

Figure 29:
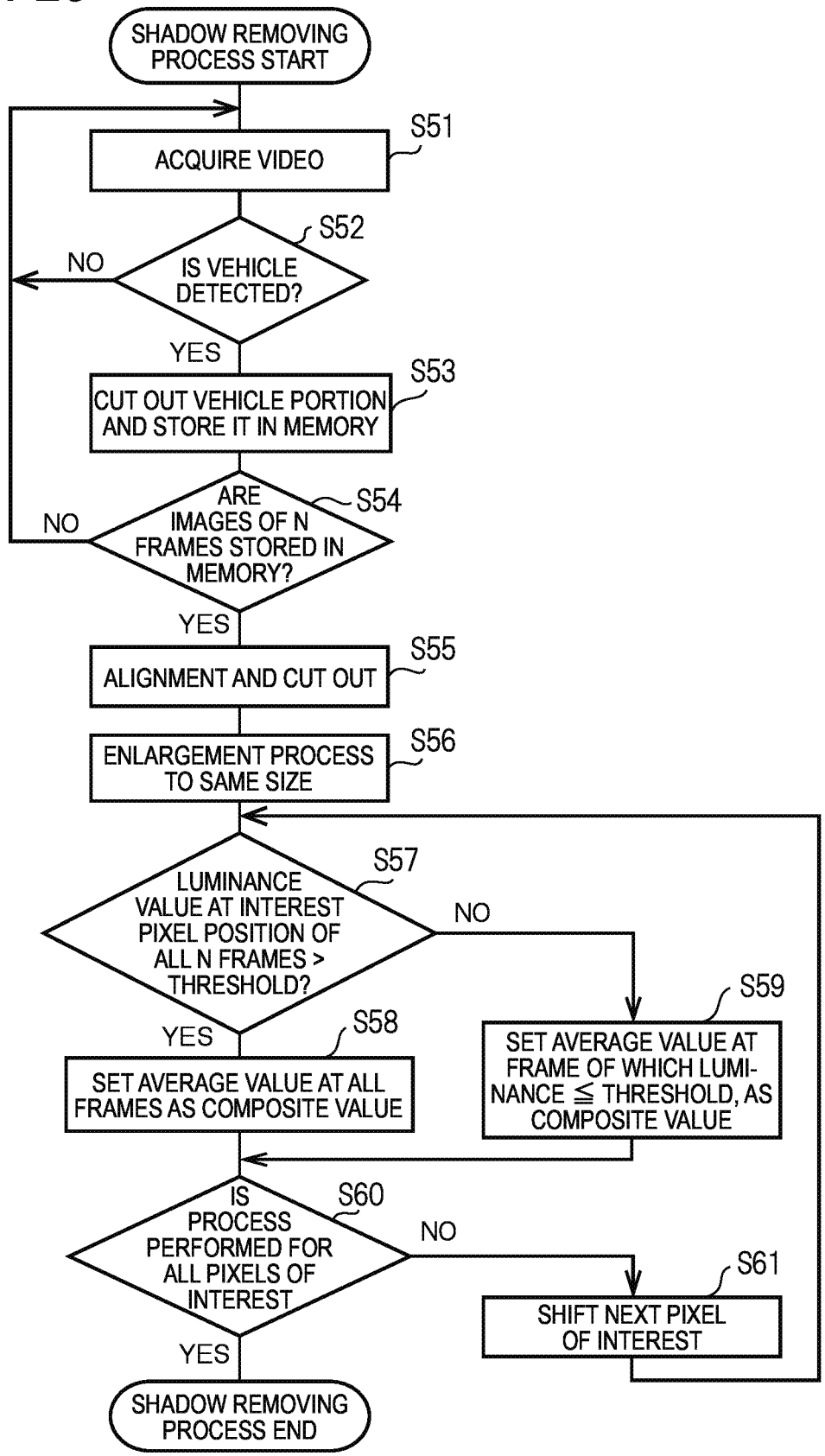
FIG. 29 is a flowchart showing a processing procedure for removing shadows of branches and leaves.

Here, a process of removing shadows of branches and leaves that are reflected on the window glass cg of the vehicle VC will be described. FIG. 29 is a flowchart showing a processing procedure for removing shadows of branches and leaves.

In FIG. 29, the processor 10 acquires a captured image captured by the image sensor 12 (S51). The processor 10 determines whether or not the vehicle VC is detected in each captured image frame constituting the captured image (S52). The detection of the vehicle is performed in the same manner as described above, and thus the detailed description is omitted here. In a case where the vehicle is not detected (NO in S52), the process of the processor 10 returns to step S51.

On the other hand, in a case where the vehicle is detected (YES in S52), the processor 10 cuts out (that is, extracts) the vehicle portion included in each captured image frame constituting the captured image, and stores data of an image of the vehicle portion (hereinafter referred to as "vehicle image") in the memory 11 (S53).

After step S53, the processor 10 determines whether or not vehicle images of N frames are accumulated in the memory 11 (S54). Here, the N is an arbitrary number of frames which is predetermined in the initial setting. For example, it is determined whether or not N=6, that is, six frames of vehicle images are accumulated in the memory 11. In a case where the vehicle images of N frames are not accumulated (NO in S54), the process of the processor 10 returns to step S51.

In a case where vehicle images of N frames are accumulated (YES in S54), the processor 10 performs alignment based on a predetermined position (for example, the position of a rearview mirror) in each of the vehicle images of N frames, and the image of the window glass portion (hereinafter referred to as "window glass image") is cut out (S55). Further, the processor 10 executes an enlargement process such that all N window glass images cut out are of the same size (S56). In a case where the N window glass images are changed to have the same size, a reduction process may be performed instead of the enlargement. For example, it may be sized to the middle sized window glass image, rather than being sized to the largest-sized window glass image among N frames.

The processor 10 determines whether or not the luminance value exceeds a predetermined threshold at the interest pixel position, for each of the window glass images of all N frames (S57). The interest pixel position is the interest pixel position in the window glass image. In addition, the predetermined threshold is an arbitrary value predetermined in the initial setting. As one example, the threshold is set to "128" which is an intermediate value in a case where the range of luminance is represented by the value of "0 to 255".

In a case where the luminance value at the interest pixel position of each of all N frames exceeds the predetermined threshold (YES in S57), the processor 10 calculates the average value of the luminance values at the interest pixel position of each of all N frames as a composite value (S58).

On the other hand, in a case where the luminance value at the interest pixel position of each of all N frames does not exceed the predetermined threshold (NO in S57), that is, in a case where there is even one frame whose luminance value is equal to or less than the predetermined threshold, the processor 10 calculates the average value of the luminance value at the interest pixel position in the frame of which luminance value at the interest pixel position is equal to or less than the predetermined threshold as a composite value (S59).

After the processes of steps S58 and S59, the processor 10 determines whether or not the process of step S58 or step S59 has been performed for all the interest pixel positions (S60). In a case where the process of step S58 or step S59 is not performed on all the interest pixel positions, the processor 10 shifts (sets) the interest pixel position to be subjected to the process of step S58 or step S59 to the next interest pixel position (S61). Thereafter, the process of the processor 10 returns to step S57. In a case where the process of step S58 or step S59 is executed for the positions of all pixels of interest in step S60 (YES in S60), the process of the processor 10 illustrated in FIG. 29 is ended.

Figure 30:
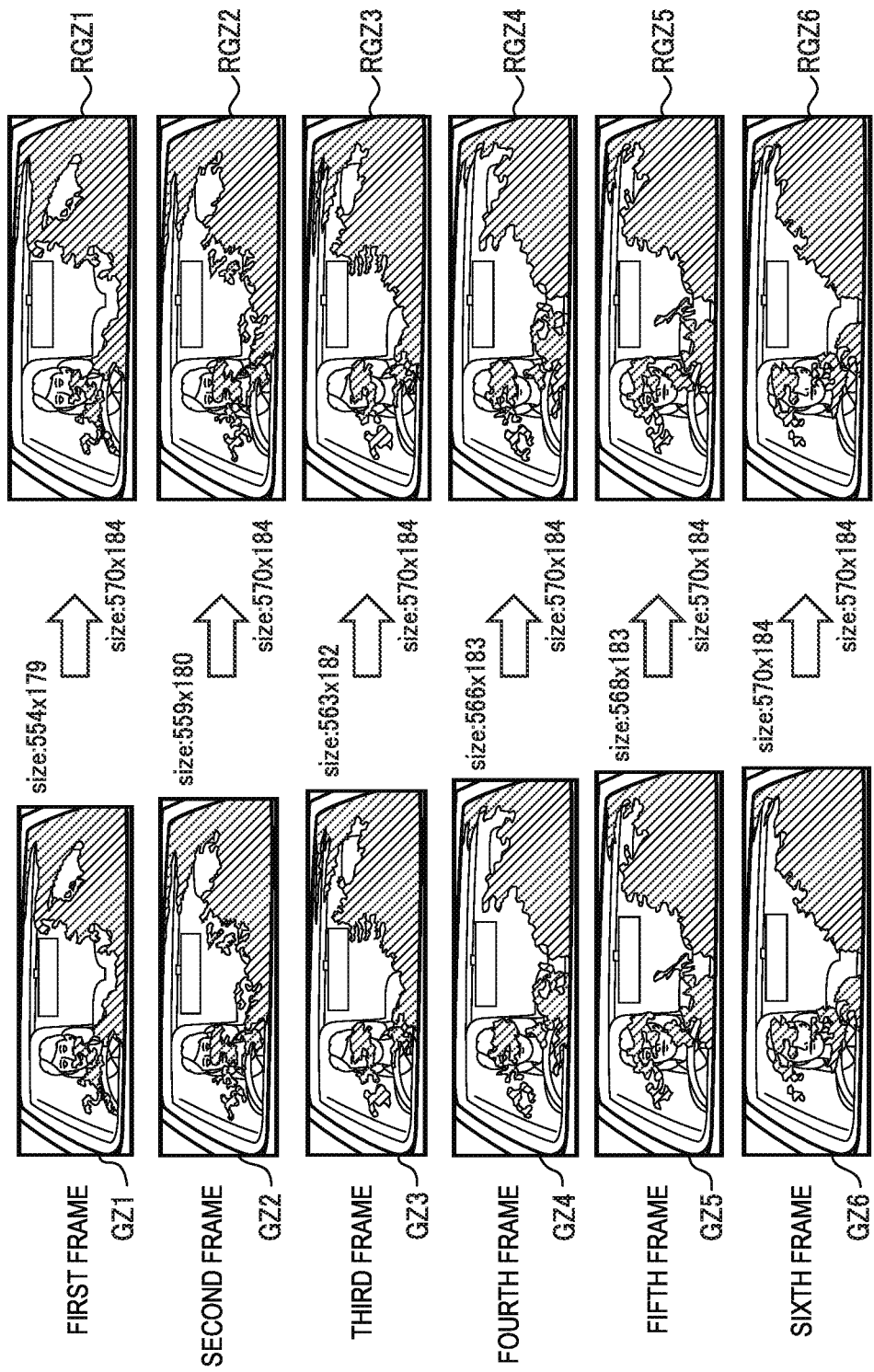
FIG. 30 is a diagram for explaining a process of enlarging each window glass image to the same size, with respect to window glass images of N frames of a traveling vehicle, which are imaged continuously.

FIG. 30 is a diagram for explaining a process of enlarging each window glass image to the same size, with respect to window glass images of N frames of a traveling vehicle, which are imaged continuously. As shown in FIG. 30, the size gradually increases, as the image goes to GZ6 from the window glass image GZ1 of the first frame. This is because the vehicle VC moves so as to gradually approach the camera apparatus 5.

The processor 10 performs an enlargement process on the window glass image GZ1 of the first frame to obtain an enlarged window glass image RGZ1. Here, the size of the window glass image GZ1 before enlargement is, for example, "554×179" pixels. The size of the enlarged window glass image RGZ1 is, for example, "570×184" pixels. The image size after enlargement coincides with the largest image size among the window glass images of N frames. That is, in FIG. 30, the "570×184" pixels which are the size of the window glass image GZ6 of the sixth frame is the image size after the enlargement process.

Similarly, the processor 10 performs the enlargement process on the window glass image GZ2 of the second frame to obtain an enlarged window glass image RGZ2. Here, the size of the window glass image GZ2 before enlargement is, for example, "559×180" pixels. The size of the enlarged window glass image RGZ2 is similarly "570×184" pixels.

Similarly, the processor 10 performs the enlargement process on the window glass image GZ3 of the third frame to obtain an enlarged window glass image RGZ3. Here, the size of the window glass image GZ3 before enlargement is, for example, "563×182" pixels. The size of the enlarged window glass image RGZ3 is similarly "570×184" pixels.

Similarly, the processor 10 performs the enlargement process on the window glass image GZ4 of the fourth frame to obtain an enlarged window glass image RGZ4. Here, the size of the window glass image GZ4 before enlargement is, for example, "566×183" pixels. The size of the enlarged window glass image RGZ4 is similarly "570×184" pixels.

Similarly, the processor 10 performs the enlargement process on the window glass image GZ5 of the fifth frame to obtain an enlarged window glass image RGZ5. Here, the size of the window glass image GZ5 before enlargement is, for example, "568×183" pixels. The size of the enlarged window glass image RGZ5 is similarly "570×184" pixels.

The processor 10 does not perform the enlargement process on the window glass image GZ6 of the sixth frame.

Figure 31:
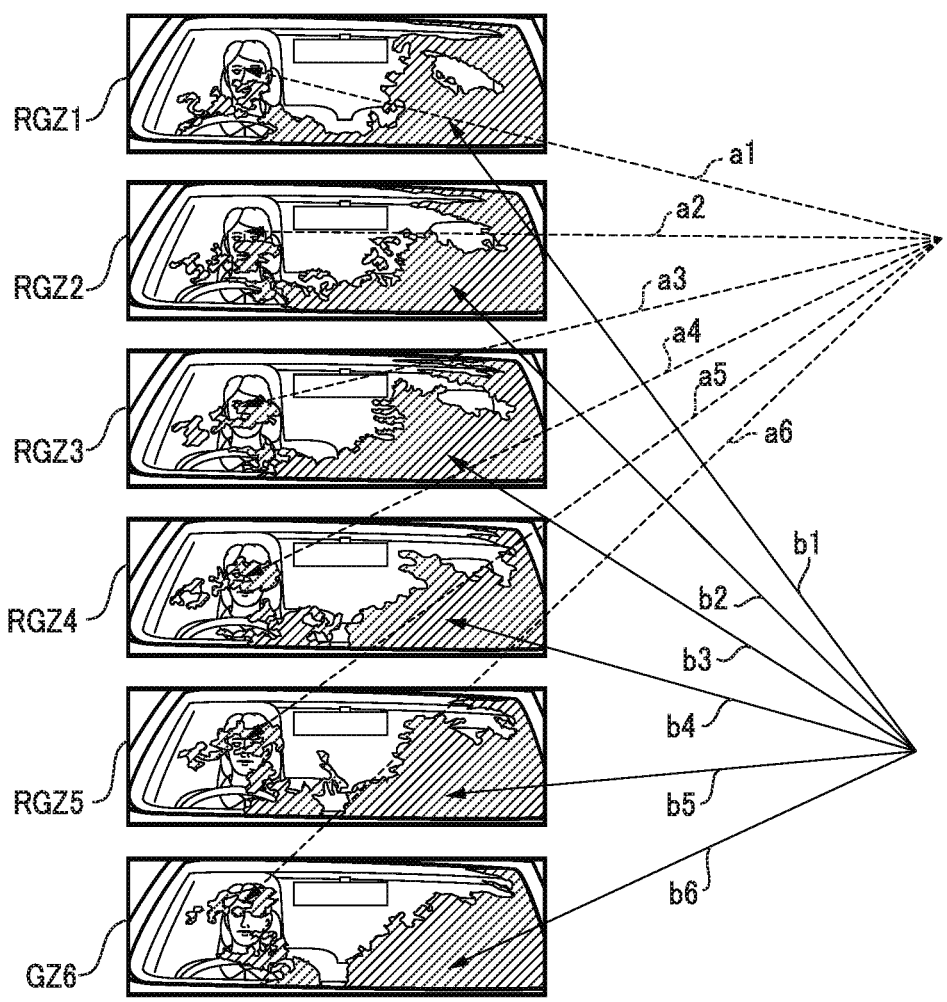
FIG. 31 is a diagram for explaining a process of combining window glass images of all six frames subjected to the enlargement process.

FIG. 31 is a diagram for explaining the process of combining the window glass images of all six frames subjected to the enlargement process.

For example, in a case where the interest pixel position is the position of eye of the driver, the window glass image in which the luminance value of the pixel of interest is less than or equal to the predetermined threshold is the window glass image RGZ1 of the first frame and the window glass image RGZ2 of the second fame, as shown by arrows a1 and a2. Therefore, with respect to the pixels of interest, the composite value of the pixel value of the pixel of interest of the window glass image RGZ1 and the pixel value of the pixel of interest of the window glass image RGZ2 is the pixel value of the composite image (see FIG. 32) (see step S59 in FIG. 29). That is, window glass images of four frames from the third frame to the sixth frame of which luminance value of the pixel of interest exceeds the predetermined threshold are not used to generate a composite image (see arrows a3, a4, a5, a6). This is to eliminate the influence of the shadow, in the window glass images of four frames (the third frame to the sixth frame) of which luminance value of the pixel of interest exceeds the predetermined threshold, for example, the shadows of the tree branches are reflected on the window glass cg and imaged brightly.

In addition, in a case where the position of pixel of interest is the positions of the window glass cg on the front passenger seat side, there is no window glass image in which the luminance of the pixel of interest is less than or equal to the predetermined threshold, as shown by arrows b1, b2, b3, b4, b5, b6. That is, the luminance value of the pixel of interest exceeds the predetermined threshold in all six frames. Therefore, with respect to the pixels of interest, the composite value of the pixel values of all the pixels of interest of the window glass images RGZ1 to RGZ5 and the window glass image GZ6 is the pixel value of the composite image (see FIG. 32). This is because in the window glass image of all six frames whose luminance value of the pixel of interest exceeds a predetermined threshold, for example, the shadows of the tree branches are not reflected on the window glass cg, so there is no need to exclude the influence of the shadows of the tree branches.

Figure 32:
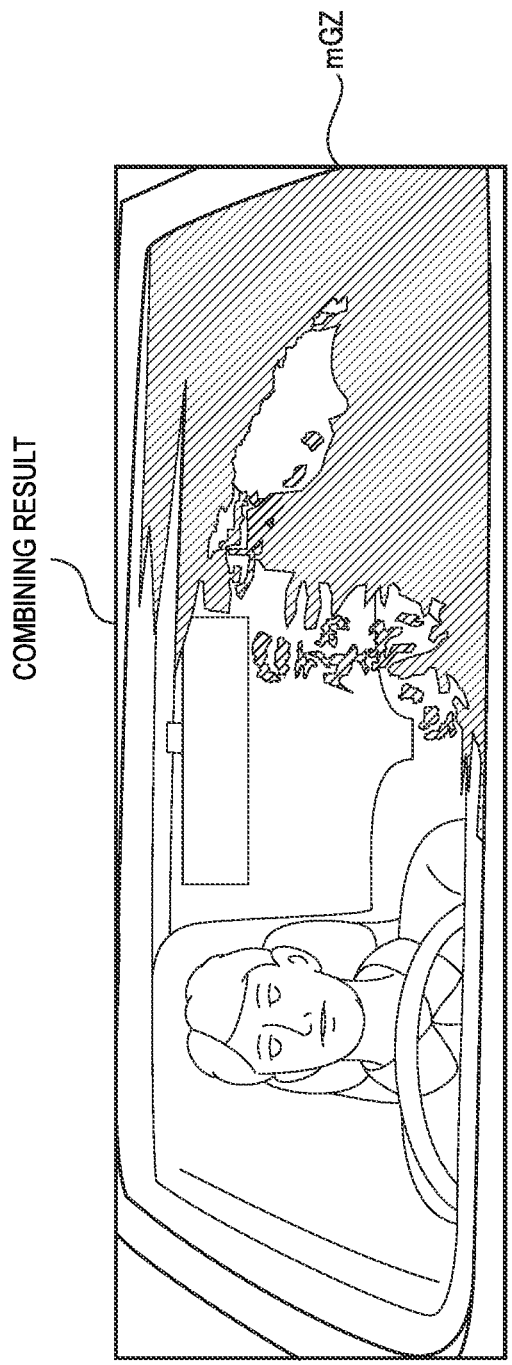
FIG. 32 is a view showing an example of a composite image obtained by combining window glass images for six frames.

FIG. 32 is a view showing an example of a composite image mGZ obtained by combining window glass images RGZ1 to RGZ5 of six frames and a window glass image GZ6. For the composite image mGZ, only pixels whose luminance value of the window glass image is less than or equal to a predetermined threshold are combined, so an image in a relatively dark region, in which the driver's face is captured (that is, it is not affected by the shadows of the branches of tree), becomes conspicuous and clear. Further, all the pixels whose luminance values of the window glass image exceed a predetermined threshold value are combined, so the image in a relatively bright region such as harmful light (for example, sunlight) reflected by the window glass cg is blurred.

That is, the camera apparatus 5 combines only the pixels whose luminance values of the window glass image are equal to or less than a predetermined threshold, so it is possible to generate a clear image by making the image in the relatively dark region in which the face of the driver hm1 is captured conspicuous. On the other hand, the camera apparatus 5 combines all the pixels whose luminance values of the window glass image exceed a predetermined threshold value, so it is possible to generate an image in which the image in a relatively bright region such as harmful light (for example, sunlight) reflected by the window glass cg is blurred. A part of the background except the driver's face is blurred to make the driver's face reflected in the composite image more conspicuous. Therefore, the camera apparatus 5 can clearly image the face of the driver in the vehicle VC even in the situation where the shadows of branches and the like are reflected in the window glass.

As described above, the camera apparatus 5 includes the lens block 50 including the lens LZ (for example, a focus lens) that focuses the light from the vehicle VC as the subject during the daytime. The camera apparatus 5 has an image sensor 12 that captures an image based on the light from the vehicle VC focused by the focus lens. The camera apparatus 5 includes the processor 10 that generates a face image of the driver hm1 in the vehicle VC, in which the influence of harmful light (for example, sunlight) in the daytime is suppressed, based on a plurality of captured images of the vehicle VC that differ in time, which are captured by the image sensor 12.

Thus, even in a case where the vehicle VC is positioned in a situation where, for example, the shadows of branches and the like of trees are reflected in the window glass cg, the camera apparatus 5 can generate a captured image in which the face of the driver in the vehicle VC is clearly imaged.

Further, the processor 10 extracts a vehicle image (one aspect of a predetermined region) including the face image of the driver hm1 in each captured image, derives, for each pixel constituting the extracted pixel image, an average value of captured images of the number of sheets for which the luminance value at the pixel is equal to or less than a predetermined threshold, and generates a face image by using the average value for each pixel. Thus, the camera apparatus 5 combines only the pixels of which luminance values of the vehicle image are equal to or less than a threshold, and can make the image in the relatively dark region, in which the driver's face is captured, conspicuous and a clear image.

Further, the processor 10 extracts a vehicle image including the face image of the driver hm1 in each captured image, derives, for each pixel constituting the extracted vehicle image, an average value of all vehicle images for which the luminance value at the pixel is larger than a threshold, and generates a face image by using the average value for each pixel. Thus, the camera device 5 combines all the pixels whose luminance values of the window glass image exceed a threshold value, so the image in a relatively bright region such as external light reflected by the window glass cg can be blurred. A part of the background except the driver's face is blurred to make the driver's face reflected in the composite image more conspicuous.

(Night Imaging)

Next, for example, in a case of emitting the IR light in the evening or at night and continuously imaging the face of the driver in the traveling vehicle VC, as the distance from the camera apparatus is farther away, the face of the driver in the vehicle VC is dark, and the image becoming brighter as it approaches is obtained. As a result, an image of uniform luminance value cannot be obtained, and the driver's face becomes hard to see. The camera apparatus 5 makes it possible to obtain the captured image of the face of the driver in the traveling vehicle VC with substantially uniform luminance value.

Figure 33:
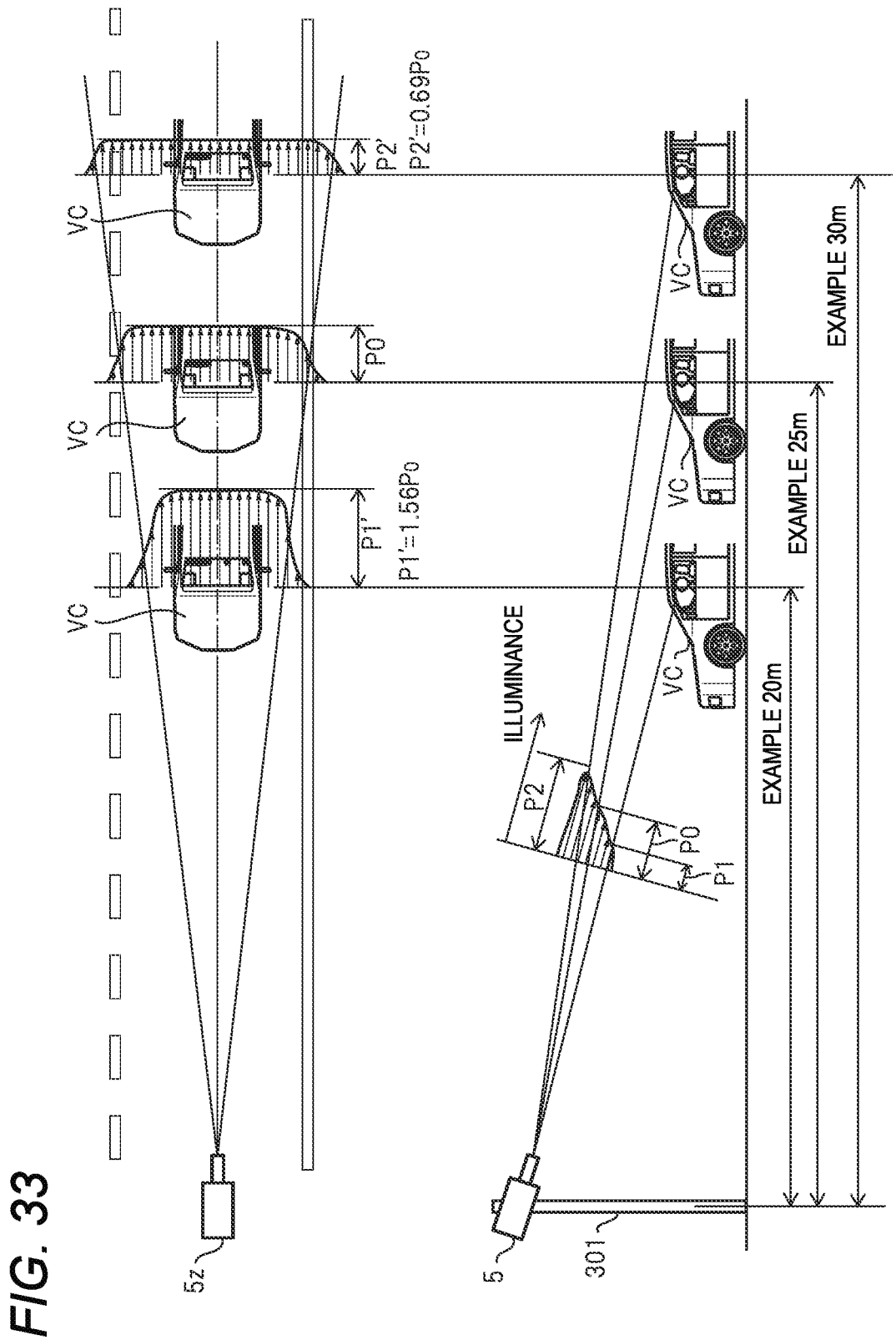
FIG. 33 is a diagram for explaining the principle that an illuminance of IR light changes in accordance with a distance from the camera apparatus.

FIG. 33 is a diagram for explaining the principle that an illuminance of IR light changes in accordance with a distance from the camera apparatus 5. The camera apparatus 5 is fixedly attached to the top of the pole 301, for example, so as to be able to overlook the road corresponding to the field of view. A plurality of illumination LEDs 21 are disposed on the front surface of the housing 20z of the LED body 20 mounted on the upper side of the camera apparatus 5. Each of the illumination LEDs 21 emits IR light to the vehicle VC traveling in the direction of the camera apparatus 5 according to a control instruction from the processor 10 in the night mode.

In the related art, in a case where IR light having uniform illuminance distribution without bias is emitted to a subject such as a vehicle, as the distance from the light source (for example, LED) of the IR light to the vehicle is shorter, the IR light is applied to the vehicle at a high illuminance. On the other hand, as the distance from the light source (for example, LED) of the IR light to the vehicle is longer, the IR light is emitted to the vehicle at a low illuminance.

Here, in the related configuration, a vehicle position (for example, 20 m) with a short distance to the camera apparatus 5z, a vehicle position (for example, 25 m) with an intermediate distance to the camera apparatus 5z, and a vehicle position (for example 30 m) with a long distance to the camera apparatus 5z are assumed. Assuming that the illuminance of the IR light is P0', with the intermediate vehicle position as a reference, in the short-distance vehicle position, the illuminance P1' of the R light is proportional to the square of the distance ratio to become as high as $P0' \times (25/20)^2$. That is, in the short-distance vehicle position, it becomes too bright. On the other hand, in the long-distance vehicle position, the illuminance P2' of the IR light becomes as low as $P0' \times (25/30)^2$. That is, in the long-distance vehicle position, it becomes too dark.

On the other hand, in the camera apparatus 5 according to Embodiment 1, the IR light emitted from each of the illumination LEDs 21 to the vehicle VC has a illuminance distribution in which the illuminance is low as the distance from the illumination LED 21 to the vehicle VC is short, and the illuminance is high as the distance from the illumination LED 21 to the vehicle VC is long.

Here, a vehicle position (for example, 20 m) with a short distance to the camera apparatus 5, a vehicle position (for example, 25 m) with an intermediate distance to the camera apparatus 5, and a vehicle position (for example 30 m) with a long distance to the camera apparatus 5 are assumed. Similarly, assuming that the illuminance of the IR light is the irradiation reference intensity P0, with the intermediate vehicle position as a reference, in the short-distance vehicle position, the illuminance P1 of the IR light is proportional to the square of the distance ratio to become as low as $P0 \times (20/25)^2$. On the other hand, in the long-distance vehicle position, the illuminance P2 of the IR light becomes as high as $P0 \times (30/25)^2$.

Figure 34:
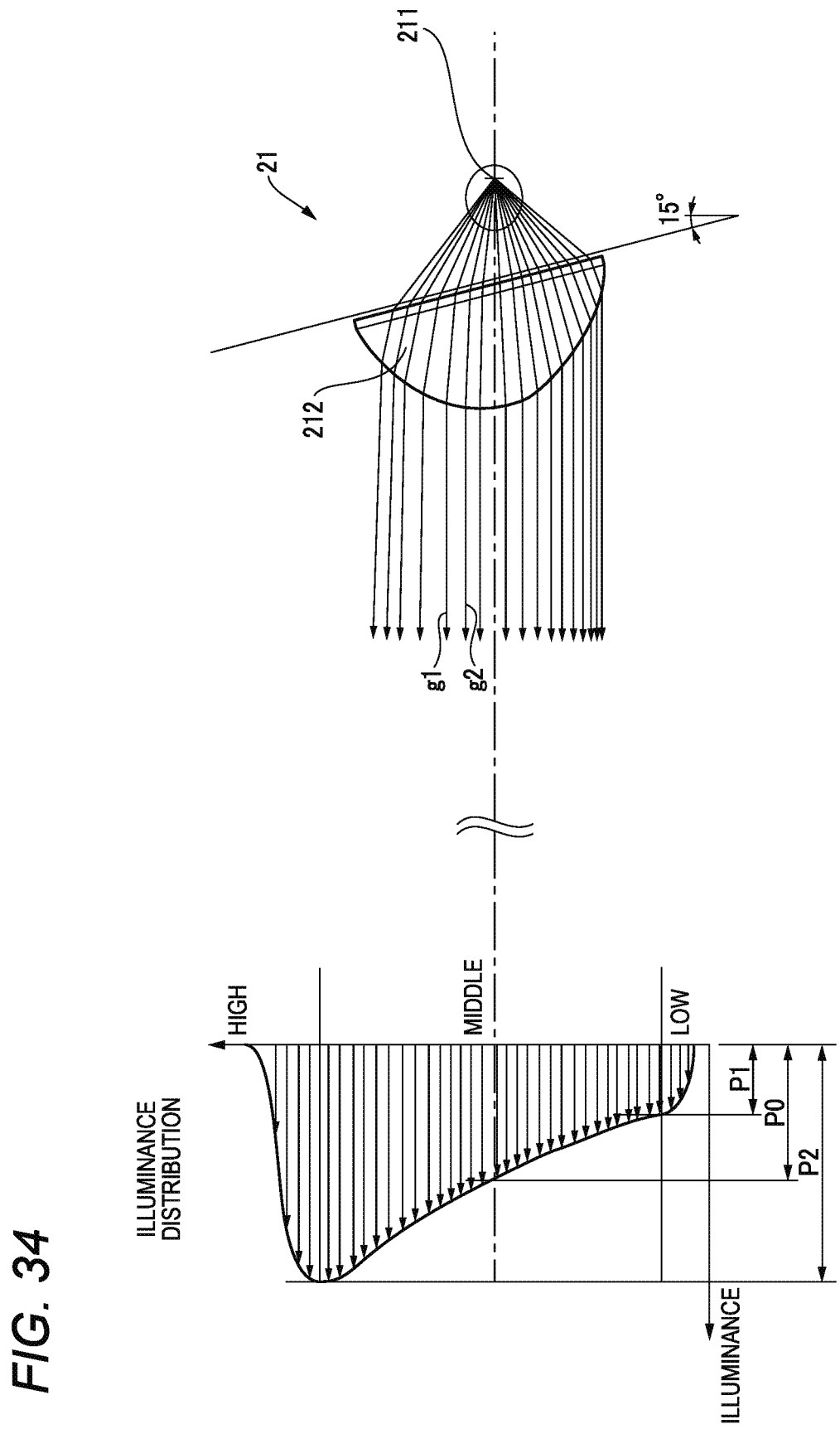
FIG. 34 is a diagram showing the configuration and illumination distribution of an illumination LED.

FIG. 34 is a diagram showing the configuration and illuminance distribution of the illumination LED 21. The illumination LED 21 includes, for example, an LED element 211 and a plano-convex lens 212. The LED element 211 emits IR light having a wavelength of, for example, 850 nm. The plano-convex lens 212 is disposed such that the upper side (see FIG. 1) is inclined to the front side with respect to the direction perpendicular to the central axis of the LED element 211. This inclination is set to, for example, 15 degrees. The IR light emitted from the LED element 211 and transmitted through the plano-convex lens 212 is emitted with an illuminance distribution biased to the direction perpendicular to the central axis of the LED element 211, as shown in FIG. 34.

Specifically, in the illuminance distribution of IR light from the LED element 211, with the illuminance of the IR light transmitted through the plano-convex lens 212 in the direction of the central axis of the LED element 211 as the irradiation reference intensity, as it goes to the upper side of FIG. 34 (see FIG. 1), the illuminance (irradiation intensity) becomes higher, and as it goes to the lower side of FIG. 34 (see FIG. 1), the illuminance (irradiation intensity) becomes lower. In FIG. 34, when the light beam emitted from the piano-convex lens 212 is viewed near the lens, the straight light beam q2 and the upward light beam q1 overlap each other and the light from below the lens looks strong, but at a distance (for example, a point where the vehicle VC is located), the upward light beam q1 becomes dominant and the upper illuminance (irradiation intensity) becomes high. Therefore, in a case where the illumination LED 21 emits light toward the traveling vehicle VC, the luminance is higher for the distant vehicle VC, and is lower for the approaching vehicle VC. Thus, the camera apparatus 5 can adaptively image the vehicle regardless of the length of the distance between the vehicle facing the camera apparatus 5 and the camera apparatus 5, so a highly accurate captured image of the face of the driver riding in the vehicle can be obtained.

As described above, in the camera apparatus 5, the illumination LED 21 emits IR light having a illuminance distribution in which, with the irradiation intensity of the camera apparatus 5 for a predetermined distance (for example, 25 m) as an irradiation reference intensity P0, the irradiation intensity (illuminance P2) for a position (for example, 30 m) farther than the predetermined distance is higher than the irradiation reference intensity P0 and the irradiation intensity (illuminance P1) at a position (for example, 20 m) closer than the predetermined distance is lower than the irradiation reference intensity P0. Thus, the camera apparatus 5 can adaptively image the vehicle VC at a substantially uniform illuminance regardless of the distance between the traveling vehicle VC and the camera apparatus 5. Accordingly, the face of the driver in the vehicle VC reflected in the captured image imaged by the camera apparatus 5 is easily seen.

As described above, the camera apparatus 5 according to Embodiment 1 includes the lens block 50 including the lens LZ that focuses the light from the vehicle as the subject. The camera apparatus 5 includes an image sensor 12 that captures an image based on the light from the vehicle VC focused by the lens LZ. The camera apparatus 5 has a filter unit (front filter switching module 40) that rotatably supports a polarization filter 42 that limits light from the vehicle VC received by the image sensor 12. The camera apparatus 5 includes a processor 10 that determines a vehicle type of the vehicle VC, based on a captured image of the vehicle VC captured by the image sensor 12. The processor 10 rotates the polarization filter 42 by the rotation angle corresponding to the vehicle type, according to the determined vehicle type.

Thus, when imaging the face of the driver in the vehicle VC, the camera apparatus 5 prevents the reflected light from the window glass cg from entering as much as possible even if the lane of the road in which the vehicle VC travels and the type are different. Therefore, the driver's face image captured by the image sensor 12 becomes clear. As described above, since the camera apparatus 5 can adaptively reduce the influence of harmful light when capturing the face of a person in a vehicle according to the type of the vehicle VC, it is possible to suppress the degradation of the image quality of the captured image.

Further, the processor 10 derives a detection angle θcc indicating a direction in which the vehicle VC viewed from the camera apparatus 5 is detected, based on the captured image of the vehicle VC, and derives the rotation angle (polarization angle θpl) based on the window glass angle θw formed by a windshield corresponding to the vehicle type and the ground and the detection angle θcc. Thus, the camera apparatus 5 can accurately and adaptively calculate the rotation angle (that is, the polarization angle θpl) of the polarization filter 42 corresponding to the vehicle type and the lane of the vehicle VC.

In addition, the camera apparatus 5 further includes a memory 11 that stores a table in which the vehicle type and the windshield angle are associated with each other. Thus, the camera apparatus 5 can easily acquire the window glass angle θw without calculating the window glass geometrically (in other words, without requiring the processing load of the calculation).

As described above, the polarization filter 42 is configured such that a first polarization filter (polarization filter 421) which is inclined at a first angle Δθ1 indicating the direction of the first person (for example, the driver) on the driver's seat side of the vehicle VC when viewed from the camera apparatus 5 and a second polarization filter (polarization filter 422) which is inclined at a second angle Δθ2 indicating the direction of the second person (for example, driver's acquaintance) on the front passenger seat side of the vehicle VC when viewed from the camera apparatus 5 are overlapped with reference to the vertical direction. Thus, the camera apparatus 5 can block the reflected light from the window glass on the driver's seat side by adjusting the polarization angle of the polarization filter 42 to the window glass cg on the driver's seat side, and can block the reflected light from the window glass on the front passenger seat side by adjusting the polarization angle of the polarization filter to the window glass cg on the front passenger seat side. Therefore, the driver's face and the face of the passenger sitting in the front passenger seat can be clearly imaged together.

Further, the filter unit (front filter switching module 40) is disposed on the front side of the lens block 50. Thus, incident light is effectively limited by the polarization filter 42 before light from the subject is incident on the lens block 50, so the image sensor 12 can receive incident light, with a simple configuration, without complicating the lens configuration in the lens block 50.

Further, the filter unit (front filter switching module 40) is disposed on the rear side of the lens block 50 and on the front side of the image sensor 12. Thus, the lens block 50 is disposed on the front side of the front filter switching module 40, and for example, replacement of the lens in the lens block 50 becomes easy.

Further, the camera apparatus 5 according Embodiment 1 includes the lens block 50 including the lens that focuses the light from the vehicle as the subject during the daytime. The camera apparatus 5 includes an image sensor 12 that captures an image based on the light from the vehicle VC focused by the lens LZ. The camera apparatus 5 includes the processor 10 that generates a face image of a person riding in the vehicle VC, in which the influence of harmful light in the daytime is suppressed, based on a plurality of captured images of the vehicle VC that differ in time, which are captured by the image sensor 12.

Thus, even in a case where the vehicle VC is positioned in a situation where, for example, the shadows of branches and the like of trees are reflected in the window glass cg, the camera apparatus 5 can generate a captured image in which the face of the driver in the vehicle VC is clearly imaged.

Further, the processor 10 extracts a predetermined region including a face image of a person in each captured image, derives, for each pixel constituting the extracted predetermined region, an average value of captured images of the number of sheets for which the luminance value at the pixel is equal to or less than a threshold, and generates a face image by using the average value for each pixel. Thus, the camera apparatus 5 combines only the pixels of which luminance values of the vehicle image are equal to or less than a threshold, and can make the image in the relatively dark region, in which the driver's face is captured, conspicuous and a clear image.

Further, the processor 10 extracts a predetermined region including a face image of a person in each captured image, derives, for each pixel constituting the extracted predetermined region in the captured image, the average value of all captured images for which the luminance value at the pixel is larger than a threshold, and generates a face image by using the average value for each pixel. Thus, the camera device 5 combines all the pixels whose luminance values of the window glass image exceed a threshold value, so the image in a relatively bright region such as external light reflected by the window glass cg can be blurred. A part of the background except the driver's face is blurred to make the driver's face reflected in the composite image more conspicuous.

Further, the camera apparatus 5 further includes an illuminance sensor 13 that detects a daytime mode. The processor 10 generates a face image when the daytime mode is detected. Thus, the camera apparatus 5 can easily insert and remove the IR cut filter on the optical axis. Further, in a case where the camera apparatus 5 captures an image of the driver's face in the vehicle during the daytime, the IR cut filter is disposed on the optical axis, so it is possible to block the IR light, and a clear RGB image can be obtained by the image sensor 12.

The camera apparatus 5 further includes an illuminance sensor 13 that detects a daytime mode or a night mode, and an illumination unit (illumination LED 21) that illuminates the subject with IR light in the night mode. The filter unit (front filter switching module 40) switchably supports the polarization filter 42 and the band pass filter 41 that transmits IR light. The processor 10 disposes the polarization filter 42 on the front side of the image sensor 12 in the daytime mode, and disposes the band pass filter 41 on the front side of the image sensor 12 in the night mode. Thus, the camera apparatus 5 can image the face of the driver with high accuracy by suppressing the incidence of the reflected light from the window glass such as the windshield of the vehicle during the daytime. In addition, since the camera apparatus 5 can block light other than IR light through the band pass filter 41 at night, it is possible to capture an IR image in which darkness is suppressed based on the IR light received by the image sensor 12.

In addition, the lens block 50 switchably supports the use of the IR cut filter. The processor 10 disposes the IR cut filter on the front side of the image sensor 12 in the daytime mode. Thus, in a case where the camera apparatus 5 captures an image of the driver's face in the vehicle during the daytime, the IR cut filter is disposed on the optical axis, so it is possible to block the IR light, and a clear RGB image can be obtained by the image sensor 12.

Further, the illumination unit (illumination LED 21) emits IR light having a illuminance distribution in which, with the irradiation intensity of the camera apparatus 5 for a predetermined distance as an irradiation reference intensity, the irradiation intensity for a position farther than the predetermined distance is higher than the irradiation reference intensity and the irradiation intensity for a position closer than the predetermined distance is lower than the irradiation reference intensity. Thus, the camera apparatus 5 can adaptively image the vehicle VC at a substantially uniform illuminance regardless of the distance between the traveling vehicle VC and the camera apparatus 5. Accordingly, the face of the driver in the vehicle VC reflected in the captured image imaged by the camera apparatus 5 is easily seen.

Further, the band pass filter 41 blocks light having a wavelength band of the headlight emitted from the vehicle VC. Thus, the camera apparatus 5 can adaptively and brightly image the face of the driver in the vehicle illuminated by the IR light, which is reflected through the window glass (for example, the windshield of the vehicle) even at night.

Further, the processor 10 determines the lane in which the vehicle VC travels, based on the captured image of the vehicle VC, and derives the detection angle corresponding to the determined vehicle type and lane. Thus, the camera apparatus 5 can easily obtain the detection angles θcc1, θcc2 of the detected vehicles VC1, VC2.

Further, among the first polarization filter (polarization filter 421) and the second polarization filter (polarization filter 422), the material on the subject side is made of inorganic material. Thus, the organic polarization filter is weak to ultraviolet light and tends to deteriorate, while the inorganic polarization filter is resistant to ultraviolet light and hard to deteriorate, so the inorganic polarization filter on the subject side (see the front side shown in FIG. 1) can block the ultraviolet light and protect the deterioration of the organic polarization filter.

(Process Leading to Configuration of Embodiment 2)

In the related art, it has been practiced to image both the face of the driver in the vehicle and the license plate of the vehicle with a camera, and associate the driver's face with the license plate of the vehicle. This is because the license plate of the vehicle is, of course, identification information of the vehicle. However, at night, the vehicle travels by lighting the headlights from a pair of headlamps respectively disposed on both sides of the license plate. Therefore, the license plate is brightly illuminated by the headlights which are diffusely reflected in the protective glass of the headlamp. The license plate is made of, for example, a metal plate, so it is glossy and well reflects emitted light. When the camera images both the driver's face and the license plate in such a night situation, the driver's face through the window glass becomes dark and the license plate becomes too bright. As a result, there has been a problem that the driver's face included in the captured image is blurred. In addition, there is also a problem that the license plate is blown out and the number cannot be read.

Therefore, in Embodiment 2, an example of a camera apparatus capable of clearly imaging both the face of the driver of the vehicle and the license plate of the vehicle, with respect to the vehicle traveling with the headlights turned on at night will be described.

Embodiment 2

The internal configuration of the camera apparatus according to Embodiment 2 has the same configuration as the internal configuration of the camera apparatus 5 according to Embodiment 1. Therefore, in the description of the camera apparatus according to Embodiment 2, the same components as those in the internal configuration of the camera apparatus 5 according to Embodiment 1 are denoted by the same reference numerals, so a description thereof will be simplified or omitted, and different contents will be described.

As in Embodiment 1, the camera apparatus 5 according to Embodiment 2, for example, with the vehicle VC (see FIG. 37) as a subject, clearly images both the face of a person (for example, a driver) riding in the vehicle VC and the license plate of the vehicle VC, and generates and acquires a captured image (captured video) of the face of the person and the license plate. That is, the image sensor 12 images both the face of the driver in the vehicle VC and the license plate, and generates a captured image including a driver's face image and a license plate image corresponding to the same vehicle VC. At the time of imaging using the image sensor 12, the processor 10 causes the image sensor 12 to perform an imaging operation under a plurality of imaging conditions.

Although described in Embodiment 1, examples of the imaging condition include making the exposure time longer than the exposure reference time, and making the exposure time shorter than the exposure reference time, than the standard exposure reference time.

Further, another imaging condition includes illuminating the vehicle VC by the illumination LED 21 at a biased illuminance distribution as described in Embodiment 1 to perform imaging.

Further, another imaging condition includes imaging the traveling vehicle VC at two imaging timings at a long distance and a short distance.

Further, another imaging condition includes performing imaging using an imaging element whose sensitivity is different for each area of the imaging surface.

Further, another imaging condition includes imaging an area surrounding a window glass of a vehicle image with high sensitivity. Further, it may be mentioned that the headlight light is dimmed, and imaging is performed at night.

Below, the operation example of the camera apparatus 5 in the case of using the various imaging conditions described above will be specifically described.

(Capturing Image of Long-Time Exposure and Short-Time Exposure)

Figure 35:
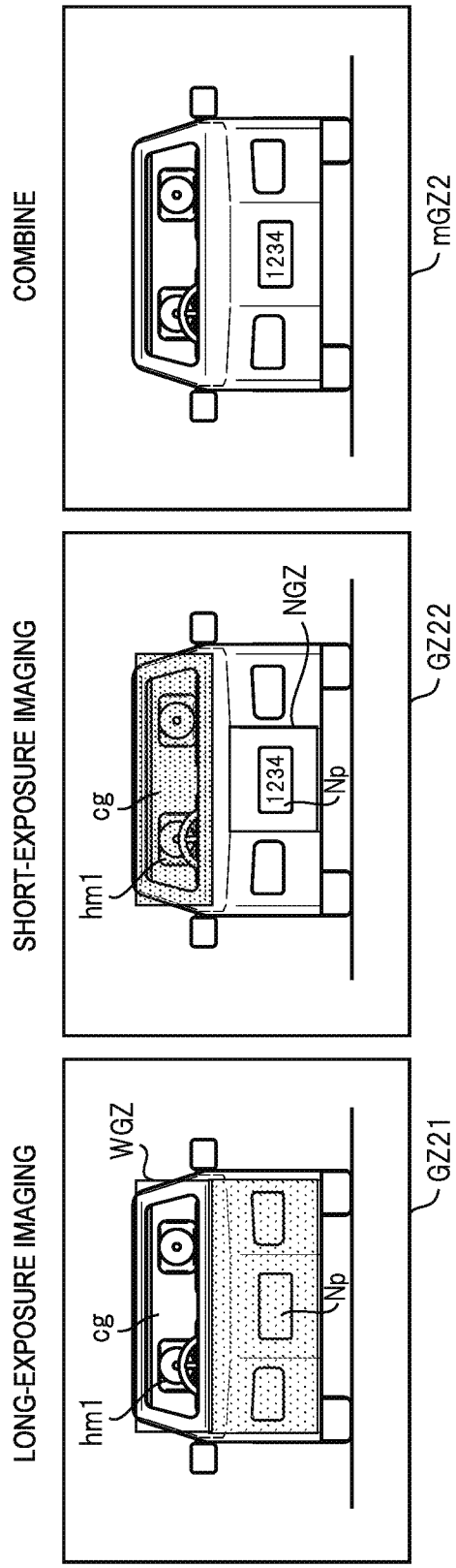
FIG. 35 is a diagram showing a process of combining a captured image by long-exposure imaging and a captured image by short-exposure imaging according to Embodiment 2 to generate a composite image.

FIG. 35 illustrates a process of combining a captured image by long-exposure imaging and a captured image by short-exposure imaging according to Embodiment 2 to generate a composite image. The processor 10 alternately captures a captured image GZ21 by long-exposure imaging and a captured image GZ22 by short-exposure imaging, based on setting data in, for example, step S1 in FIG. 12, and obtains captured images of two frames. The captured images of two frames are a captured image GZ21 and a captured image GZ22.

The captured image GZ21 is a bright and clear face image including the face of the driver hm1 through the window glass cg because it is captured in a state where a long exposure time is set.

On the other hand, the captured image GZ22 is a license plate image in which the number of the vehicle VC including the license plate Np having high glossiness can be read because it is captured in a state where a short exposure time is set.

In the captured image GZ21, even when the window glass portion and the face of the driver hm1 are dark, a bright image can be captured by prolonging the exposure time. However, in this case, the bright license plate Np portion is blown out. On the other hand, in the captured image GZ22, even if the license plate portion is bright, the number can be imaged in a legible manner without blown-out highlights, by shortening the exposure time. However, in this case, the window glass portion and the driver's face become dark.

The processor 10 temporarily stores the captured image GZ21 and the captured image GZ22 corresponding to the same vehicle in the memory 11. Further, the processor 10 records the captured image GZ21 and the captured image GZ22 temporarily stored in the memory 11 in the recorder 90 connected to the network NW through the communication unit 19. The recorder 90 accumulates the captured image GZ21 and the captured image GZ22 for each vehicle.

The processor 10 reads the captured image GZ21 and the captured image GZ22 temporarily accumulated in the memory 11 or accumulated in the recorder 90. The processor 10 cuts out the image WGZ of the window glass portion from the captured image GZ21 by long-time exposure, cuts out the image NGZ including the license plate Np from the captured image GZ22 by short-time exposure, and combines these cut out images to generate a composite image mGZ2. With regard to image portions other than the image WGZ and the image NGZ in the composite image mGZ2, any portion of the captured image GZ21 and the captured image GZ22 may be used, or the image portions may be blank.

In addition, the composition process is performed by the camera apparatus 5, but the camera apparatus 5 may transmit video data to the server 80 (external device) connected to the network NW and the server 80 may execute the composition process.

Figure 36:
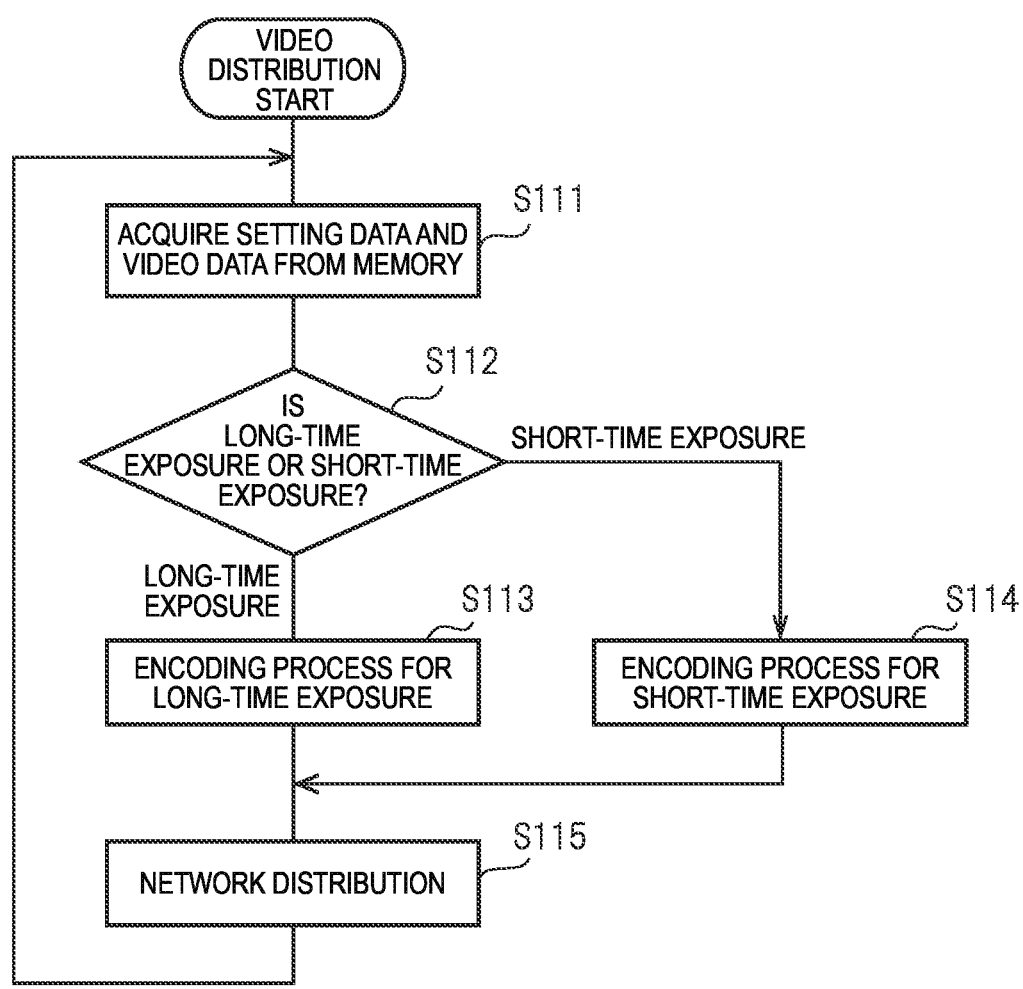
FIG. 36 is a flowchart showing a video distribution procedure.

FIG. 36 is a flowchart showing the video distribution procedure.

The process shown in FIG. 36 is repeatedly performed, for example, from the time the power of the camera apparatus 5 is turned on and started until the power is turned off. The process shown in FIG. 36 may be set in advance to be performed at predetermined time intervals or at predetermined times.

In FIG. 36, the processor 10 reads and acquires the video data and setting data accumulated in association with each other in the memory 11 (S111).

The processor 10 determines whether the video data acquired in step S111 is video data obtained by long-exposure imaging or video data obtained by short-exposure imaging (S112). This determination is performed based on, for example, the amount of data (data size). Since the data amount of video data due to long-time exposure is large and the data amount of video data due to short-time exposure is small, it is easy to perform this determination. In addition, in a case where the exposure time is included in the setting data associated with the video data, the processor 10 may make the determination using this setting data.

In a case of a long-time exposure, the processor 10 performs an encoding process suitable for video data obtained by long-exposure imaging (S113). For example, when acquiring the face of the driver hm1 through the window glass cg as a clear face image, the processor 10 performs the encoding process at a low compression rate. In order to reduce the amount of data, the encoding process may be performed at a high compression rate.

On the other hand, in a case of a short-time exposure, the processor 10 performs an encoding process suitable for video data obtained by short-exposure imaging (S114). For example, when acquiring a license plate image from which the number can be easily read, the processor 10 performs an encoding process at a low compression rate.

After the process of steps S113, S114, the processor 10 distributes the encoded video data to the server 80 through the communication unit 19 and the network NW (S115). When distributing video data, an operation of distributing video data obtained by long-exposure imaging for a fixed period and distributing video data obtained by short-exposure imaging for the next fixed period may be repeated. Further, distribution may be performed in the reverse order. Further, the video data obtained by long-exposure imaging and the video data obtained by short-exposure imaging may be alternately switched and distributed for every predetermined number of frames. For example, when switching and distributing in units of one frame, the odd-numbered frames may be used for video data obtained by long-exposure imaging, and the even-numbered frames may be used for video data obtained by short-exposure imaging. Note that the order may be reversed. Thereafter, the process of the processor 10 returns to step S111.

When the server 80 receives, from the camera apparatus 5, the video data obtained by long-exposure imaging and the video data obtained by short-exposure imaging, the server 80 combines these video data to generate a composite video.

As described above, the processor 10 acquires in time division an image (one aspect of the first captured image) obtained in a long exposure time by the image sensor 12 and an image (one aspect of the second captured image) obtained in a short exposure time by the image sensor 12. The processor 10 or the server 80 combines the face image extracted from the image obtained in the long exposure time and the license plate image extracted from the image obtained in the short exposure time, and generates a composite image of the face image and the license plate image corresponding to the same vehicle.

Therefore, the camera apparatus 5 combines the face image by long-exposure imaging and the license plate image by short-exposure imaging, so the face of the driver hm1 through the window glass cg can be clearly imaged, and a captured image in which the number of the license plate is captured legibly can be obtained.

Further, in the case where the captured image GZ21 and the captured image GZ22 temporarily stored in the memory 11 are recorded in the recorder 90, the processor 10 distributes the video data to the recorder 90 connected to the network NW through the communication unit 19, in the same procedure as the above procedure.

As described above, the camera apparatus 5 according to Embodiment 2 has the lens block 50 including the lens LZ (for example, a focus lens) for focusing light from the vehicle VC (one aspect of the subject) including the face of the driver hm1 (one aspect of a person) riding in the vehicle VC and the license plate Np of the vehicle VC. The camera apparatus 5 includes an image sensor 12 that performs an capturing process based on the light from the vehicle VC focused by the focus lens. The camera apparatus 5 includes the processor 10 that generates a face image of the driver hm1 riding in the vehicle VC corresponding to the same vehicle and a license plate image of the vehicle VC, based on the captured image of the vehicle VC generated by the capturing process. The processor 10 causes the image sensor 12 to perform an capturing process using a plurality of imaging conditions at the time of imaging based on the light from the vehicle VC.

Thus, the camera apparatus 5 can generate respective high-quality images of the face of the driver hm1 and the license plate Np, from the captured image of the vehicle VC including the face of the driver hm1 riding in a vehicle and the license plate Np of the vehicle, and support construction of data indicating a correspondence between the driver hm1 in the vehicle and the license plate. The person in the vehicle is not limited to the driver, and may be any passenger seated in the front passenger seat or the back seat.

Further, the processor 10 extracts a face image from the captured image of the vehicle VC generated by the capturing process of the long-time exposure (one aspect of the first imaging condition), and extracts a license plate image from the captured image of the vehicle VC generated by the capturing process of the short-time exposure (one aspect of the second imaging condition). Thus, the camera apparatus 5 can generate both a clear face image obtained in a state where a long exposure time suitable for imaging a face image is set, and a license plate image obtained in a state where a short exposure time suitable for imaging the license plate Np which is easily reflected due to its glossiness.

Further, in the long-exposure imaging, the exposure time in the image sensor 12 is long, and in the short-exposure imaging, the exposure time in the image sensor 12 is short. Thus, the camera apparatus 5 can capture a face image in which the face of the driver hm1 is bright, and can capture a license plate image having such a brightness that the license plate is not blown out.

Further, the camera apparatus 5 further includes a communication unit 19 that performs data communication with the recorder 90 and the server 80. The processor 10 causes the recorder 90 to record the face image and the license plate image corresponding to the same vehicle VC through the communication unit 19. Thus, the camera apparatus 5 can cause the external recorder 90 to accumulate data of a captured image in which the face image and the license plate image are associated with each other. Further, the camera apparatus 5 requests the external server 80 to perform image analysis or composition processing of the captured image, thereby reducing the processing load of the camera device 5.

Further, the processor 10 can transmit data to the server 80 through the communication unit 19. The server 80 performs various processes. For example, the server 80 performs image analysis to recognize a face image, and determines whether the face image of the driver hm1 matches the face image registered in advance. Further, the server 80 performs image analysis to interpret the number from the image of the license plate Np, and determines whether or not the number matches the number registered in advance. The server 80 can obtain the correspondence between the driver hm1 and the license plate Np.

Modification Example 1 of Embodiment 2

Figure 37:
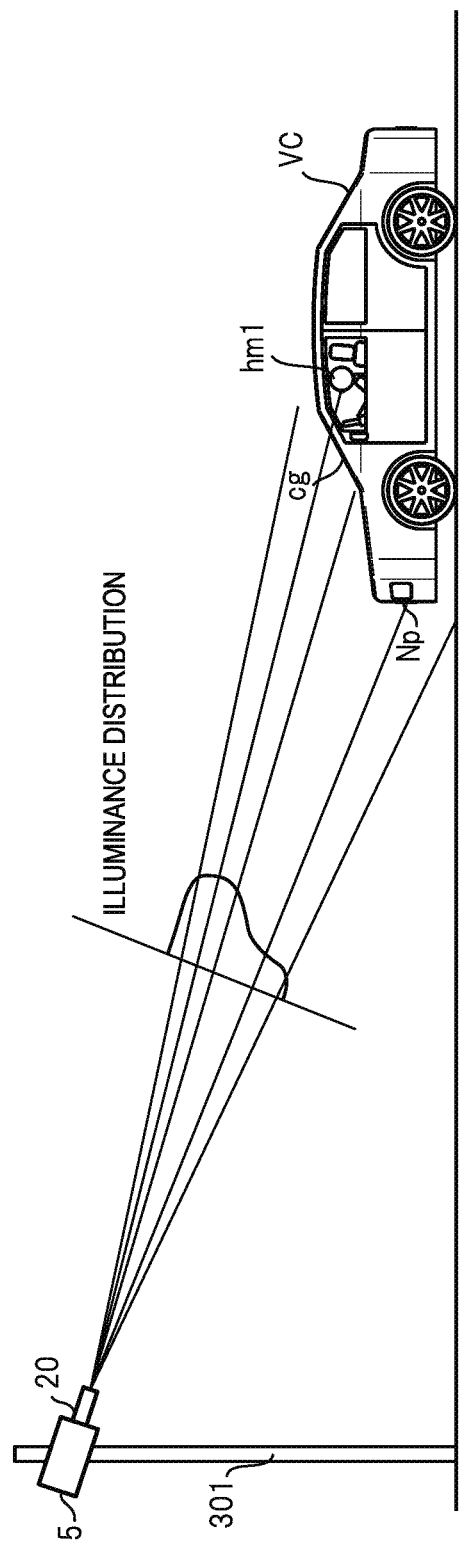
FIG. 37 is a diagram showing a situation in which the vehicle is illuminated by the illumination LED according to Modification Example 1 of Embodiment 2.

FIG. 37 is a diagram showing a situation in which the vehicle VC is illuminated by the illumination LED 21 according to Modification Example 1 of Embodiment 2. In order to make the description easy to understand, for example, the vehicle VC is stopped. Similarly to the camera apparatus 5 (see, for example, FIG. 34) according to Embodiment 1, the illumination LED 21 emits IR light having a biased illuminance distribution. That is, the upper part of the vehicle VC is irradiated with IR light with high illuminance. On the other hand, the lower part of the vehicle VC is irradiated with IR light with low illuminance.

As described above, the illumination LED 21 (illumination unit) emits IR light at an illuminance distribution in which the irradiation intensity of the IR light for the window glass cg (for example, the windshield) is higher than a predetermined irradiation reference intensity and the irradiation intensity of the IR light for the license plate Np is lower than the predetermined irradiation reference intensity.

Thus, in a case of imaging both the face of the driver hm1 through the window glass cg and the license plate Np, the camera apparatus 5 can image the face of the driver hm1 through the window glass cg brightly, and image the license plate Np, which tends to be imaged brightly, with reduced brightness. Therefore, the driver's face image included in the captured image becomes clear, and the number in the license plate becomes readable.

Further, the processor 10 temporarily stores in the memory 11, the face image of the driver hm1 included in the captured image and the license plate image of the license plate Np in association with each other. The processor 10 can read the face image data and the license plate image data temporarily stored in the memory 11 and can transmit the face image data and the license plate image data to the recorder 90 through the communication unit 19. The recorder 90 accumulates face image data of the driver hm1 and image data of the license plate Np. Further, the processor 10 can transmit data to the server 80 through the communication unit 19. The server 80 performs the same process as described above.

Modification Example 2 of Embodiment 2

Figure 38:
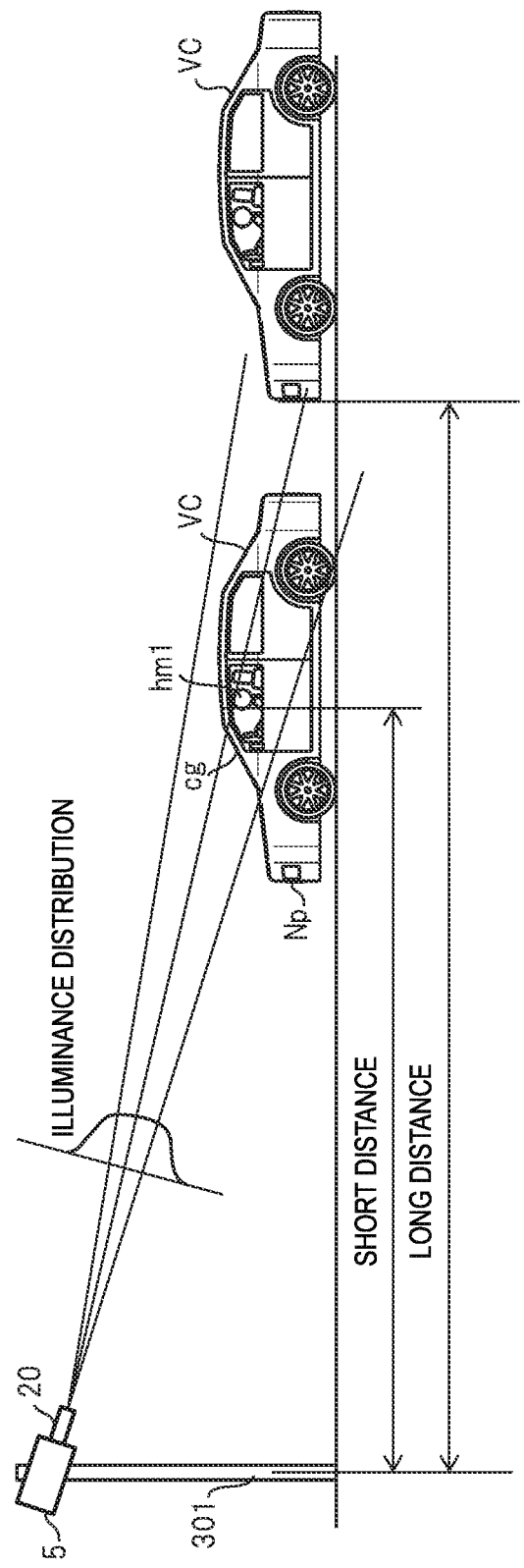
FIG. 38 is a diagram showing a situation in which the camera apparatus according to Modification Example 2 of Embodiment 2 captures an image at a distance.

FIG. 38 is a diagram showing a situation in which the camera apparatus 5 according to Modification Example 2 of Embodiment 2 captures an image at a distance. In order to make the description easy to understand, the vehicle VC is traveling in the direction of the camera apparatus 5. As shown in FIG. 38, the illumination LED 21 may emit IR light having a uniform illuminance distribution, as in the conventional illumination LED. However, in Modification Example 2 of Embodiment 2, similarly to the camera apparatus 5 (see, for example, FIG. 34) according to Embodiment 1, the illumination LED 21 emits IR light having a biased illuminance distribution. The processor 10 obtains information on the distance to the vehicle VC, based on the measurement result of the distance sensor 26.

As a result of the measurement by the distance sensor 26, in a case where the traveling vehicle VC is at a distance far from the camera apparatus 5, the IR light emitted from the illumination LED 21 becomes weak in inverse proportion to the square of the distance. The illumination LED 21 radiates IR light to the license plate Np with low illuminance. Thus, the camera apparatus 5 images the weakly illuminated license plate Np. Since the license plate Np is not too bright, the number included in the license plate image can be read.

Thereafter, as a result of the measurement by the distance sensor 26, in a case where the traveling vehicle VC approaches and a distance from the camera apparatus 5 becomes short, the IR light emitted from the illumination LED 21 becomes stronger in inverse proportion to the square of the distance. The illumination LED 21 irradiates IR light with high illuminance to the window glass cg and the face of the driver hm1 through the window glass. Therefore, the camera apparatus 5 images the face of the driver hm1 through the brightly lit window glass. Since the face of the driver hm1 does not become dark, the face image becomes clear.

As described above, the camera apparatus 5 according to Modification Example 2 of Embodiment 2 includes the distance sensor 26 capable of measuring the distance to the vehicle VC. The processor 10 causes the image sensor 12 to perform the capturing process of the license plate Np when the vehicle VC is located at a short distance (one aspect of a first predetermined distance) from the camera apparatus 5, based on the measurement result of the distance sensor 26. On the other hand, when the vehicle VC is located at a long distance (one aspect of a second predetermined distance) from the camera apparatus 5, the image sensor 12 executes the capturing process of the face of the driver hm1 (person).

Thus, the camera apparatus 5 can obtain a clear driver's face image and a license plate image from which the number is readable, for example, from images of two frames obtained by two imaging operations. Therefore, the driver's face can be easily associated with the license plate.

Modification Example 3 of Embodiment 2

Figure 39:
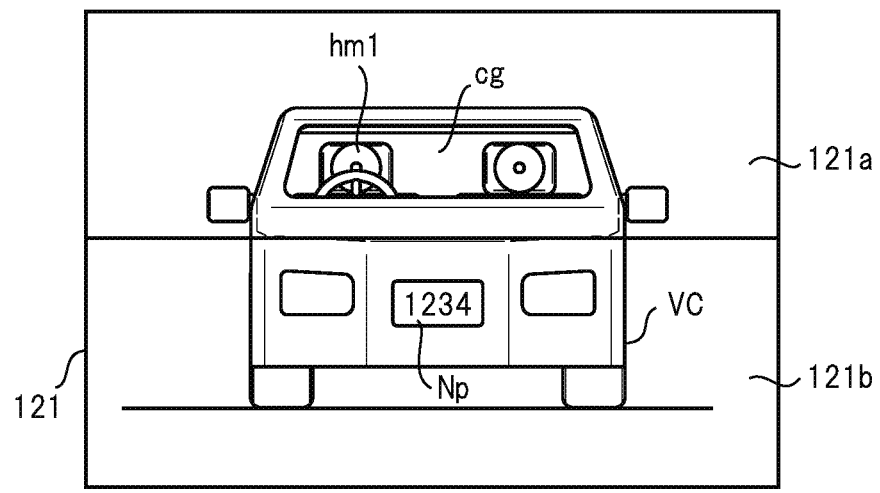
FIG. 39 is a diagram showing an imaging surface of an image sensor according to Modification Example 3 of Embodiment 2.

FIG. 39 is a diagram showing an imaging surface 121 of the image sensor 12 according to Modification Example 3 of Embodiment 2. The imaging surface 121 of the image sensor 12 may have different sensitivity distributions in the upper and lower portions in FIG. 39. As an example, the upper region 121*a* of the imaging surface 121 is a region with high ISO sensitivity. The lower region 121*b* of the imaging surface 121 is a region with low ISO sensitivity. The ISO sensitivity of the upper area 121*a* is, for example, twice as high as the ISO sensitivity of the lower area 121*b*. The ISO sensitivity represents the ability to convert light incident on the image sensor into an electrical signal. When the ISO sensitivity is doubled, a doubled electrical signal can be obtained as an output of the image sensor 12. Therefore, in the upper area 121*a* of the imaging surface 121, as compared with the lower area 121*b*, it is possible to capture an image brighter even if the subject is dark.

In FIG. 39, on the imaging surface 121, the front of the vehicle VC is captured. The window glass cg portion is included in the upper area 121*a* of the imaging surface 121. Since the ISO sensitivity of the upper area 121*a* is large, even if the window glass cg portion is somewhat dark, the driver's face through the window glass can be brightly imaged.

The license plate Np is included in the lower area 121*b* of the imaging surface 121. Since the ISO sensitivity of the lower area 121*b* is small, even if the license plate Np is brightly illuminated by the headlight light, the image sensor 12 can capture a license plate image without blown-out highlights.

In the camera apparatus 5 according to Modification Example 3 of Embodiment 2, the imaging surface 121 of the upper region 121a (first region) of the image sensor 12, on which the driver hm1 (person riding in the vehicle) in the vehicle VC appears, is composed of high sensitivity pixels. The imaging surface 121 of the lower region 121b (second region) of the image sensor 12 on which the license plate Np of the vehicle VC appears is composed of pixels with low sensitivity.

Thus, the camera apparatus 5 can image brightly the driver's face through the window glass and can image the license plate with reduced brightness. Therefore, a clear face image of the driver and a license plate image from which the number is readable can be obtained. Here, the high sensitivity area and the low sensitivity area are obtained by dividing the imaging surface into two in the vertical direction, but may be obtained by dividing the imaging surface into two in the oblique direction.

Modification Example 4 of Embodiment 2

Figure 40:
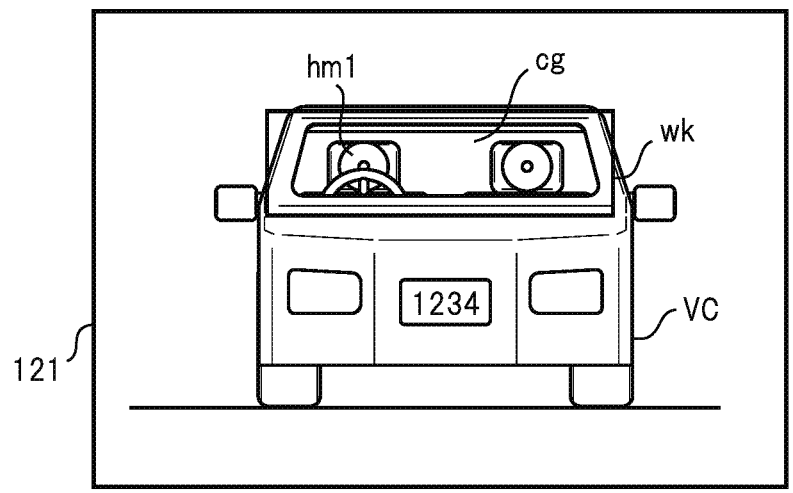
FIG. 40 is a diagram showing an imaging surface of an image sensor according to Modification Example 4 of Embodiment 2.

FIG. 40 is a diagram showing an imaging surface 121 of the image sensor 12 according to Modification Example 4 of Embodiment 2. The processor 10 performs image processing on a captured image displayed on the imaging surface 121 to detect a window glass cg portion. The processor 10 sets a rectangular frame wk surrounding the window glass cg portion, and performs processing of increasing the sensitivity of the pixels in the rectangular frame wk. The sensitivity of the pixel is increased by varying the gain of the charge signal amplified by the amplifier included in the image sensor 12 by the gain adjustment unit. Further, as an example of the process of increasing the sensitivity of pixels, the processor 10 may increase in a pseudo manner the sensitivity of pixel values at positions between adjacent pixels by image processing such as known linear interpolation.

Further, the processor 10 performs a process of reducing the sensitivity of the pixel, on the image (including the license plate) outside the rectangular frame wk. By reducing the sensitivity of the pixels, the brightness of the license plate image can be suppressed. In addition, in a case where the license plate is not too bright, the processor 10 may not perform the process of reducing the sensitivity of the pixel.

In the camera apparatus 5 according to Modification Example 4 of Embodiment 2, the processor 10 detects the window glass cg (windshield) of the vehicle VC based on the captured image of the vehicle VC, and raises the sensitivity of the pixel corresponding to the window glass cg in the detected captured image more than a predetermined value.

As described above, the camera apparatus 5 can brightly image the driver's face through the window glass by increasing the sensitivity of the pixels in the rectangular frame wk surrounding the window glass cg portion, and can image the license plate with reduced brightness. In addition, the processor may perform only one of the process of increasing the sensitivity of the pixels in the rectangular frame wk and the process of reducing the sensitivity of the image outside the rectangular frame wk, depending on the situation of the illuminance.

Modification Example 5 of Embodiment 2

In the night mode, the processor 10 switches the front filter switching module 40 such that the band pass filter 41 is located on the optical axis.

Figure 41:
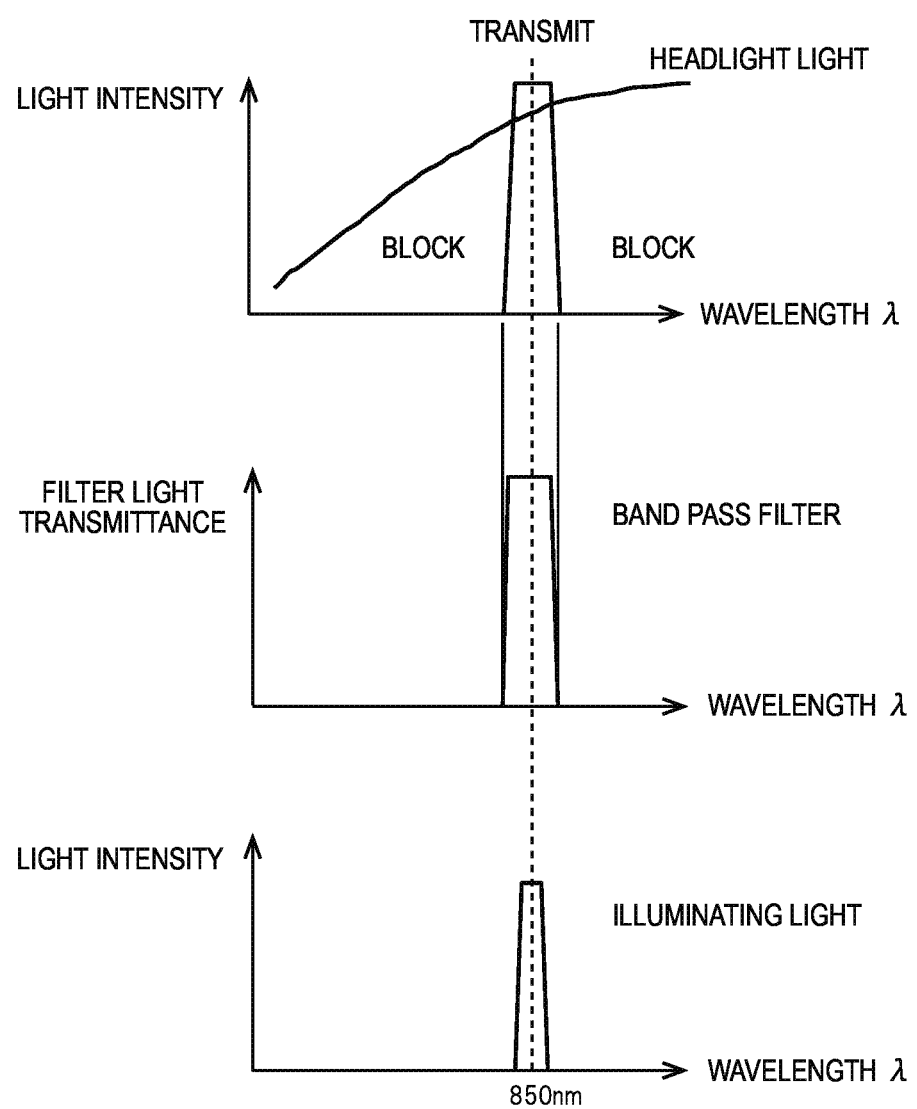
FIG. 41 is a graph for explaining light shielding of a headlight by a band pass filter according to Modification Example 5 of Embodiment 2.

FIG. 41 is a graph for explaining light shielding of headlight by the band pass filter 41 according to Modification Example 5 of Embodiment 2. The horizontal axis of each graph indicates the wavelength λ. FIG. 41 is a graph showing the light intensity of the headlight, the light transmittance of the band pass filter 41, and the light intensity of the IR light emitted from the illumination LED 21, with respect to the wavelength λ.

The IR light emitted from the illumination LED 21 has, for example, a wavelength band of a predetermined range centered on a wavelength of 850 nm (see FIG. 41). The headlight has a wide wavelength band and has a high irradiation intensity. The band pass filter 41 has a characteristic that the light transmittance at a wavelength of 850 nm is large, transmits the light of the substantially rectangular wavelength band shown in FIG. 41 (that is, the wavelength band equivalent to the IR light emitted from the illumination LED 21), but blocks (shields) light outside the wavelength band.

Figure 42:
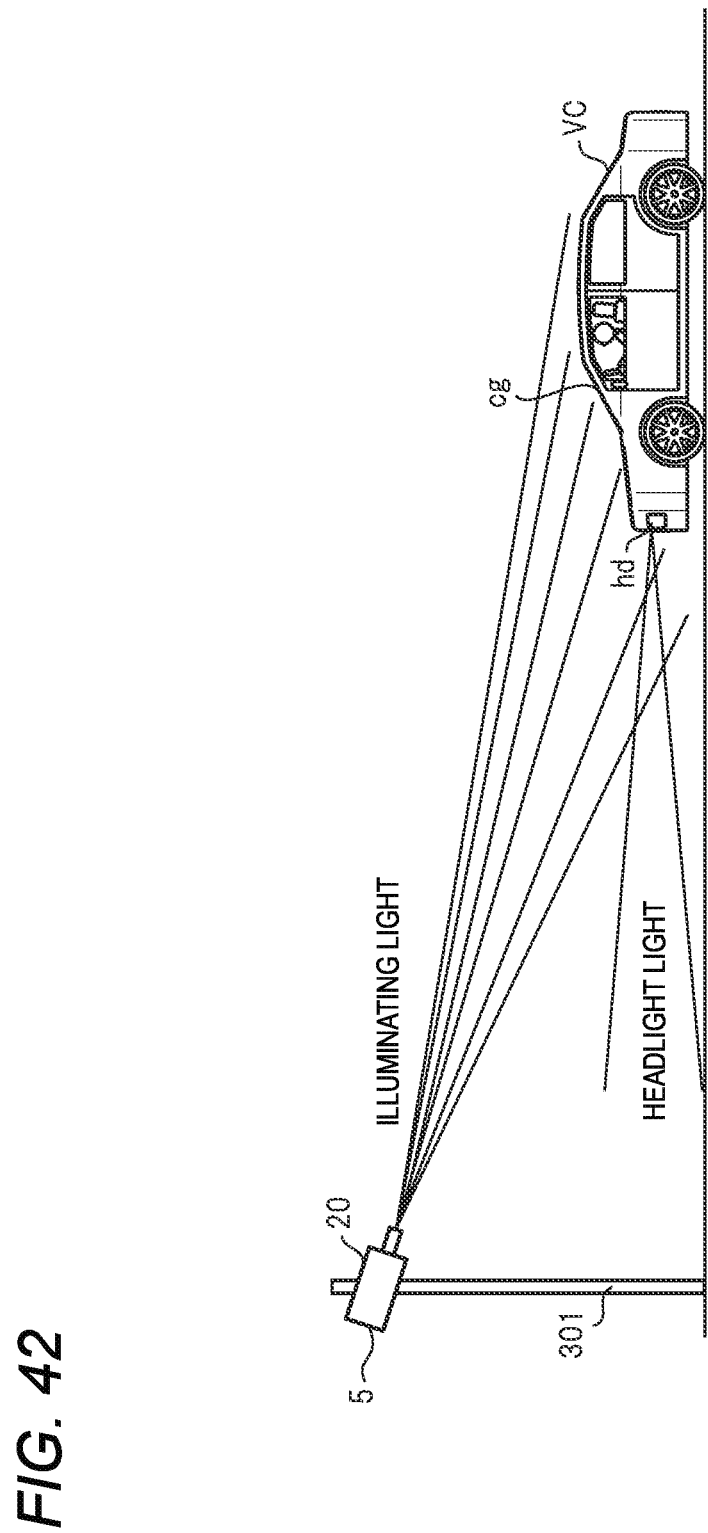
FIG. 42 is a diagram showing a situation in which the vehicle lighting the headlight at night is illuminated with IR light and imaged.

FIG. 42 is a diagram showing a situation in which the vehicle VC lighting the headlight hd at night is illuminated with IR light and imaged. The image sensor 12 of the camera apparatus 5 captures an optical image of the IR light transmitted through the band pass filter 41. The optical image of the IR light to be imaged is mainly due to reflected light reflected by the window glass cg portion (for example, including the driver's face through the window glass cg) and reflected light reflected by the license plate Np, among the IR light emitted by the illumination LED 21. The headlight hd is blocked by the band pass filter 41 except for the wavelength range of the IR light. Therefore, the headlight hd is hardly reflected in the captured image captured by the camera apparatus 5, and both the window glass cg portion (for example, including the driver's face through the window glass cg) of the vehicle VC and the license plate Np of the vehicle VC are reflected.

In the camera apparatus 5 according to Modification Example 5 of Embodiment 2, the band pass filter 41 blocks the light of the wavelength band except substantially the same wavelength band as the wavelength band of the IR light emitted from the illumination LED 21, among the wavelength bands of the headlight hd emitted from the vehicle VC. Thus, the camera apparatus 5 can eliminate an adverse effect (that is, a phenomenon in which the license plate Np becomes too bright and it becomes a blurred image) by the headlight hd having a high irradiation intensity, even when imaging the license plate Np of the vehicle VC in a dark time zone such as night, and capture an image including both the window glass cg portion of the vehicle VC (for example, including the driver's face through the window glass cg) and the license plate Np of the vehicle VC.

As described above, the camera apparatus 5 according to Embodiment 2 includes the lens block 50 including the lens LZ for focusing light from a subject including the face of a person riding in the vehicle VC and the license plate Np of the vehicle VC. The camera apparatus 5 includes an image sensor 12 that performs a capturing process based on the light from the subject focused by the lens LZ. The camera apparatus 5 includes the processor 10 that generates a face image of the person riding in the vehicle VC corresponding to the same vehicle VC and a license plate image of the vehicle VC, based on the captured image of the subject generated by the capturing process. The processor 10 causes the image sensor 12 to perform a capturing process using a plurality of imaging conditions at the time of imaging based on the light from a subject.

Thus, the camera apparatus 5 can generate respective high-quality images of the face of the driver hm1 and the license plate Np, from the captured image of the vehicle VC including the face of the driver hm1 riding in a vehicle and the license plate Np of the vehicle, and support construction of data indicating a correspondence between the driver hm1 in the vehicle and the license plate.

Further, the processor 10 extracts a face image from the captured image of the subject, generated by the capturing process of the first imaging condition, and extracts a license plate image from the captured image of the subject, generated by the capturing process of the second imaging condition. Thus, the camera apparatus 5 can generate both a clear face image obtained in a state where a long exposure time suitable for imaging a face image is set, and a license plate image obtained in a state where a short exposure time suitable for imaging the license plate Np which is easily reflected due to its glossiness.

Further, the first imaging condition is that the exposure time at the image sensor is longer than a predetermined value, and the second imaging condition is that the exposure time at the image sensor is short. Thus, the camera apparatus 5 can capture a face image in which the face of the driver hm1 is bright, and can capture a license plate image having such a brightness that the license plate is not blown out.

Further, the camera apparatus 5 further includes a communication unit 19 that performs data communication with an external device. The processor 10 causes the external device to record the face image and the license plate image corresponding to the same vehicle VC through the communication unit 19. For example, the server 80 performs image analysis to recognize a face image, and determines whether the face image of the driver hm1 matches the face image registered in advance. Further, the server 80 performs image analysis to interpret the number from the image of the license plate Np, and determines whether or not the number matches the number registered in advance. Thus, the server 80 can obtain the correspondence between the driver hm1 and the license plate Np.

Further, the processor 10 acquires in time division a first captured image obtained using a first imaging condition with a long exposure time at the image sensor 12 and a second captured image obtained using a second imaging condition with a short exposure time at the image sensor 12 in time division. The processor 10 combines the face image extracted from the first captured image and the license plate image extracted from the second captured image, and generates a composite image of the face image and the license plate image corresponding to the same vehicle VC. Thus, the camera apparatus 5 combines the face image by long-exposure imaging and the license plate image by short-exposure imaging, so the face of the driver hm1 through the window glass cg can be clearly imaged, and a captured image in which the number of the license plate is captured legibly can be obtained.

Further, the imaging surface of the first region of the image sensor 12, on which the person riding in the vehicle VC appears, is composed of pixels with high sensitivity. The imaging surface of second region of the image sensor 12 on which the license plate Np of the vehicle VC appears is composed of pixels with low sensitivity. Thus, the camera apparatus 5 can image brightly the driver's face through the window glass and can image the license plate Np with reduced brightness. Therefore, a clear face image of the driver hm1 and a license plate image from which the number is readable can be obtained.

The processor 10 detects a windshield of the vehicle VC, based on the captured image of the subject, and raises the sensitivity of the windshield in the detected captured image detected more than a predetermined value. Thus, the camera apparatus 5 can brightly image the driver's face through the window glass by increasing the sensitivity of the pixels in the rectangular frame wk surrounding the window glass cg, and can image the license plate with reduced brightness.

Further, the camera apparatus 5 further includes an illuminance sensor 13 that detects a daytime mode or a night mode. The camera apparatus 5 further includes an illumination unit (illumination LED 21) that illuminates the subject with IR light in the night mode. The camera apparatus 5 further includes a filter unit (front filter switching module 40) that is rotatably supported and switchably supports a polarization filter 42 that limits light from the subject received by the image sensor 12 and a band pass filter 41 that passes IR light. In the daytime mode, the processor 10 disposes the polarization filter 42 on the front side of the image sensor 12, determines a vehicle type of the vehicle VC by using a captured image based on light from the subject that has passed the polarization filter, and rotates the polarization filter 42 by the rotation angle (that is, the polarization angle $\theta$pl) corresponding to the vehicle type, according to the determined vehicle type. Thus, when imaging the face of the driver in the vehicle VC, the camera apparatus 5 prevents the reflected light from the window glass cg from entering as much as possible even if the lane of the road in which the vehicle VC travels and the type are different. Therefore, the driver's face image captured by the image sensor 12 becomes clear. As described above, since the camera apparatus 5 can adaptively reduce the influence of harmful light when capturing the face of a person in a vehicle according to the type of the vehicle VC, it is possible to suppress the degradation of the image quality of the captured image.

In addition, the lens block 50 switchably supports the use of the IR cut filter. The processor 10 disposes the IR cut filter on the front side of the image sensor 12, in the daytime mode. Thus, in a case where the camera apparatus 5 captures an image of the driver's face in the vehicle during the daytime, the IR cut filter is disposed on the optical axis, so it is possible to block the IR light, and a clear RGB image can be obtained by the image sensor 12.

Further, the processor 10, in the night mode, disposes the band pass filter 41 on the front side of the image sensor 12, and generates a face image of a person riding in the vehicle VC corresponding to the same vehicle VC and a license plate image of the vehicle VC, using a captured image based on light from the subject passing through the band pass filter 41 for the IR light emitted from the illumination unit (illumination LED 21). Thus, the camera apparatus 5 can eliminate an adverse effect (that is, a phenomenon in which the license plate Np becomes too bright and it becomes a blurred image) by the headlight hd having a high irradiation intensity, even when imaging the license plate Np of the vehicle VC in a dark time zone such as night, and capture an image including both the window glass cg portion of the vehicle VC (for example, including the driver's face through the window glass cg) and the license plate Np of the vehicle VC.

Further, the band pass filter 41 blocks light having a wavelength band of the headlight emitted from the vehicle VC. Thus, the camera apparatus 5 can adaptively and brightly image the face of the driver in the vehicle illuminated by the IR light, which is reflected through the window glass (for example, the windshield of the vehicle) even at night.

Further, the illumination unit (illumination LED 21) emits IR light having an illuminance distribution in which the irradiation intensity of the IR light for the face of the person hm1 is higher than a predetermined irradiation reference intensity and the irradiation intensity of the IR light for the license plate Np is lower than the predetermined irradiation reference intensity. Thus, in a case of imaging both the face of the driver hm1 through the window glass cg and the license plate Np, the camera apparatus 5 can image the face of the driver hm1 through the window glass cg brightly, and image the license plate Np, which tends to be imaged brightly, with reduced brightness. Therefore, the driver's face image included in the captured image becomes clear, and the number in the license plate becomes readable.

The camera apparatus 5 further includes a distance sensor 26 capable of measuring the distance from the camera apparatus 5 to the vehicle VC. Based on the measurement result of the distance sensor 26, the processor 10 causes the image sensor 12 to execute a capturing process of the license plate Np when the vehicle VC is positioned at a first predetermined distance from the camera apparatus 5, and the image sensor 12 to execute a capturing process of the face of the person when the vehicle VC is positioned at a second predetermined distance from the camera apparatus 5. Thus, the camera apparatus 5 can obtain a clear driver's face image and a license plate image from which the number is readable, for example, from images of two frames obtained by two imaging operations. Therefore, the driver's face can be easily associated with the license plate.

Further, the camera apparatus 5 further includes a communication unit 19 that performs data communication with an external device such as the server 80 or the recorder 90. The processor 10 transmits the face image and the license plate image corresponding to the same vehicle VC to the external device through the communication unit 19 such that the external device performs an image process on the face image and the license plate image. Thus, the camera apparatus 5 can cause the external recorder 90 to accumulate data of a captured image in which the face image and the license plate image are associated with each other. Further, the camera apparatus 5 requests the external server 80 to perform image analysis or composition processing of the captured image, thereby reducing the processing load of the camera device 5.

While various embodiments have been described with reference to the accompanying drawings, the present disclosure is not limited thereto. It is apparent to those skilled in the art that various changes, modifications, substitutions, additions, deletions, and equivalents are conceivable within the scope described in the claims, and it would be appreciated that those belong to the technical scope of the present disclosure. Further, within the scope not deviating from the gist of the disclosure, respective constituent elements in the above-described various embodiments may be arbitrarily combined.

The present disclosure is useful as a capturing camera that generates from a captured image of a subject including a face of a person riding in a vehicle and a license plate of the vehicle, respective high-quality images of the face of the person and the license plate, and supports construction of data indicating a correspondence between the person in the vehicle and the license plate of the vehicle.

The present application is based upon Japanese Patent Application (Patent Application No. 2018-185882) filed on Sep. 28, 2018, the contents of which are incorporated herein by reference.

What is claimed is:

1. A capturing device comprising:
a lens block that includes a lens for focusing light from a subject during a daytime, the subject including a vehicle;
an image sensor configured to capture an image based on the light from the subject focused by the lens; and
a processor configured to generate a face image of an occupant riding in the vehicle based on an M number of captured images of the subject which are captured by the image sensor at different times, the M number being an integer equal to or greater than 2,
wherein the processor generates the face image of the occupant further based on an N number of captured images, among the M number of captured images, in which a luminance value of a region of interest is equal to or smaller than a threshold value, the luminance value of the region of interest indicating an amount of shadow present, and the N number being an integer equal to or smaller than the M number,
wherein,
when the luminance value is equal to or smaller than the threshold value, set an average luminance value of the N number of captured images as a composite luminance value, and
when the luminance value is greater than threshold, set an average value of M number of captured images as the composite luminance value, and
wherein the processor generates the face image of the occupant using the composite luminance value.

2. The capturing device according to claim 1,
wherein the processor, for each pixel that constitutes the region of interest, derives an averaged value of the N number of captured images and generates the face image of the occupant based on the averaged value for the each pixel.

3. The capturing device according to claim 1,
a value of the M number is predetermined.

4. The capturing device according to claim 1,
wherein the processor generates the M number of window glass images cut out from window glass parts in the M number of captured images of the subject, respectively.

5. The capturing device according to claim 4,
wherein the processor enlarges or reduces each size of the M number of window glass images so that each of the M number of window glass images has a same size as one another.

6. The capturing device according to claim 1,
wherein the region of interest is a position of a face of the occupant in the vehicle.

7. The capturing device according to claim 1, further comprising:
a sensor configured to detect a daytime mode,
wherein the processor is configured to generate the face image of the occupant, when the sensor detects the daytime mode.

8. A capturing method comprising:
focusing light from a subject during a daytime, the subject including a vehicle;
capturing an image based on the light from the subject; and
generating a face image of an occupant riding in the vehicle based on an M number of captured images of the subject which are captured at different times, the M number being an integer equal to or greater than 2,
wherein the face image of the occupant is generated further based on an N number of captured images, among the M number of captured images, in which a luminance value of region of interest is equal to or smaller than a threshold value, the luminance value of the region of interest indicating an amount of shadow present, and the N number being an integer equal to or smaller than the M number, wherein,
  when the luminance value is equal to or smaller than the threshold value, set an average luminance value of the N number of captured images as a composite luminance value, and
  when the luminance value is greater than threshold, set an average value of M number of captured images as the composite luminance value, and
wherein the processor generates the face image of the occupant using the composite luminance value.

9. A capturing device comprising:
a lens block that includes a lens for focusing light from a subject during a daytime, the subject including a vehicle;
an image sensor configured to capture an image based on the light from the subject focused by the lens; and
a processor configured to generate a face image of an occupant riding in the vehicle based on an M number of captured images of the subject which are captured by the image sensor at different times, the M number being an integer equal to or greater than 2,
wherein the processor
  extracts a region of interest for each of the M number of captured images,
  derives, for each pixel that constitutes the region of interest extracted from each of the M number of captured images, a luminance value,
  when the luminance value of each of the M number of captured images is greater than a threshold value, derives an averaged luminance value for the M number of captured images, and sets the averaged luminance value for the M number of captured images as a composite luminance value,
  when the luminance value of N number of captured images, among the M number of captures images, is equal to or less than the threshold value, derives an averaged luminance value for the N number of captured images, and sets the averaged luminance value for the N number of captured images as the composite luminance value, and
  generates the face image of the occupant based on the composite luminance value for the each pixel.

10. The capturing device according to claim 9, a value of the M number is predetermined.

11. The capturing device according to claim 9, wherein the processor generates the M number of window glass images cut out from window glass parts in the M number of captured images of the subject, respectively.

12. The capturing device according to claim 11, wherein the processor enlarges or reduces each size of the M number of window glass images so that each of the M number of window glass images has a same size as one another.

13. The capturing device according to claim 9, wherein the region of interest is a position of a window glass on a front passenger seat side of the vehicle.

14. The capturing camera according to claim 9, further comprising:
a sensor configured to detect a daytime mode,
wherein the processor is configured to generate the face image, when the sensor detects the daytime mode.

15. The capturing device according to claim 1, wherein the N number of captured images are stored in a memory, and the processor aligns the N number of captured images stored in the memory, cuts out the region of interest included in each of the N number of captured images, and enlarges each region of interest cut out from the N number of captured images to a same size.

* * * * *